(12) United States Patent
Sharratt

(10) Patent No.: US 10,159,991 B2
(45) Date of Patent: *Dec. 25, 2018

(54) SHOWERHEAD WITH FILTER CARTRIDGE ASSEMBLY

(71) Applicant: Waxman Consumer Products Group Inc., Bedford Heights, OH (US)

(72) Inventor: Jason A. Sharratt, Wadsworth, OH (US)

(73) Assignee: Waxman Consumer Products Group Inc., Bedford Heights, OH (US)

( * ) Notice: Subject to any disclaimer, the term of this patent is extended or adjusted under 35 U.S.C. 154(b) by 185 days.

This patent is subject to a terminal disclaimer.

(21) Appl. No.: 15/044,047

(22) Filed: Feb. 15, 2016

(65) Prior Publication Data

US 2016/0236118 A1 Aug. 18, 2016

Related U.S. Application Data

(60) Provisional application No. 62/116,380, filed on Feb. 14, 2015, provisional application No. 62/135,050, filed on Mar. 18, 2015.

(51) Int. Cl.
*B05B 1/18* (2006.01)
*B05B 15/40* (2018.01)
(Continued)

(52) U.S. Cl.
CPC ............... *B05B 1/18* (2013.01); *B05B 15/40* (2018.02); *E03C 1/0408* (2013.01);
(Continued)

(58) Field of Classification Search
CPC .... E03C 1/0408; E03C 2201/40; C02F 1/281; C02F 1/283; C02F 1/003; C02F 1/002;
(Continued)

(56) References Cited

U.S. PATENT DOCUMENTS 4,244,526 A 1/1981 Arth
4,804,837 A 2/1989 Farley
(Continued)

OTHER PUBLICATIONS

Culligan Shower Filter Replacement Cartridge, part No. CUL WHR-140 found at URL: www.culligan-store.com/product_detail. asp?T1=CUL+WHR%2D140&; one (1) page; Applicant believes that the above product is prior art being on sale more than one year prior to the earliest claimed priority date of the subject application namely, Feb. 14, 2015.

(Continued)

*Primary Examiner* — David C Mellon
*Assistant Examiner* — Liam Royce
(74) *Attorney, Agent, or Firm* — Tarolli, Sundheim, Covell & Tummino LLP

(57) ABSTRACT

A showerhead assembly including a filter cartridge assembly having a replaceable filter cartridge. The showerhead assembly includes a water-directing and filtering assembly having a body portion and a face portion removably affixed to the body portion. The filter cartridge assembly includes a split filter cartridge housing and filter cartridge. A first part of the filter cartridge housing is disposed in the body portion and a second part is disposed in the face portion. The filter cartridge includes a casing and spaced apart first and second end walls, an inlet connector extending axially from the first end wall, and an outlet connector extending axially from the second end wall and being offset from the filter cartridge central axis. The second end wall includes a first recess extending linearly between a peripheral edge of the second end wall and the outlet connector outer surface and passing through the filter cartridge central axis.

24 Claims, 35 Drawing Sheets

(51) Int. Cl.
*E03C 1/04* (2006.01)
*C02F 1/28* (2006.01)

(52) U.S. Cl.
CPC ...... *B01D 2201/4076* (2013.01); *C02F 1/281* (2013.01); *C02F 1/283* (2013.01); *C02F 2307/06* (2013.01); *E03C 2201/40* (2013.01)

(58) Field of Classification Search
CPC .. C02F 2307/04; C02F 2307/06; B01D 35/30; B01D 35/02; B01D 27/08; B01D 2201/303; B01D 2201/4076; B05B 1/18
See application file for complete search history.

(56) References Cited

U.S. PATENT DOCUMENTS

| | | |
|---|---|---|
| 4,933,080 A | 6/1990 | Rundzaitis et al. |
| 5,028,007 A | 7/1991 | Wokal |
| 5,152,464 A | 10/1992 | Farley |
| 5,192,427 A | 3/1993 | Eger et al. |
| 5,213,688 A | 5/1993 | Robinson |
| 5,300,224 A | 4/1994 | Farley |
| 5,385,667 A * | 1/1995 | Steger ............... C02F 1/003 210/198.1 |
| D361,622 S | 8/1995 | Farley |
| D364,446 S | 11/1995 | Farley |
| 5,503,742 A | 4/1996 | Farley |
| 5,545,314 A | 8/1996 | Parise et al. |
| 5,549,822 A | 8/1996 | Ferguson |
| 5,766,466 A | 6/1998 | Peterson |
| 5,795,471 A | 8/1998 | Naito |
| D406,874 S | 3/1999 | Farley |
| D409,718 S | 5/1999 | Farley |
| 5,901,769 A | 5/1999 | Farley |
| 5,914,043 A | 6/1999 | Farley |
| 5,965,017 A | 10/1999 | Nelson et al. |
| D417,904 S | 12/1999 | Douglas |
| 6,006,374 A | 12/1999 | Winnett et al. |
| 6,016,977 A | 1/2000 | Farley |
| 6,056,875 A | 5/2000 | Farley |
| 6,063,294 A | 5/2000 | Martensson et al. |
| 6,096,197 A | 8/2000 | Hughes |
| 6,187,187 B1 | 2/2001 | Farley |
| 6,190,551 B1 | 2/2001 | Nelson et al. |
| D441,048 S | 4/2001 | Archer |
| 6,214,224 B1 | 4/2001 | Farley |
| 6,238,552 B1 * | 5/2001 | Shannon ............... C02F 1/003 210/282 |
| D444,536 S | 7/2001 | Farley |
| 6,267,887 B1 | 7/2001 | Hughes et al. |
| D446,841 S | 8/2001 | Sitva |
| 6,270,023 B1 | 8/2001 | Farley |
| 6,271,529 B1 | 8/2001 | Farley et al. |
| 6,297,510 B1 | 10/2001 | Farley |
| 6,321,777 B1 | 11/2001 | Wu |
| 6,325,930 B2 | 12/2001 | Farley |
| 6,343,388 B1 | 2/2002 | Lebrun |
| 6,422,484 B1 | 7/2002 | Sasaki et al. |
| D462,108 S | 8/2002 | Farley |
| D463,844 S | 10/2002 | Farley |
| 6,537,455 B2 | 3/2003 | Farley |
| 6,626,378 B2 | 9/2003 | Sasaki et al. |
| D483,438 S | 12/2003 | Farley |
| 6,732,957 B2 | 5/2004 | Kanaya et al. |
| 6,736,336 B2 | 5/2004 | Wong |
| 6,796,518 B2 | 9/2004 | Douglas et al. |
| 6,951,266 B2 | 10/2005 | Mueller et al. |
| 7,004,410 B2 | 2/2006 | Li |
| RE39,142 E | 6/2006 | Farley |
| 7,097,122 B1 | 8/2006 | Farley |
| 7,143,897 B1 | 12/2006 | Guzman et al. |
| 7,235,176 B1 | 6/2007 | Takagi et al. |
| 7,303,151 B2 | 12/2007 | Wu |
| 7,308,724 B2 | 12/2007 | Ho |
| 7,378,018 B2 | 5/2008 | Cheng |
| 7,468,127 B2 | 12/2008 | Hsu |
| 7,490,372 B2 | 2/2009 | Huang |
| 7,866,576 B1 | 1/2011 | Farley |
| D665,478 S | 8/2012 | Farley |
| D666,010 S | 8/2012 | Farley |
| D667,925 S | 9/2012 | Farley |
| D667,926 S | 9/2012 | Farley |
| 8,268,168 B2 | 9/2012 | Mang |
| 8,403,241 B2 | 3/2013 | Jung |
| 8,663,691 B2 | 3/2014 | Jeong |
| 9,410,309 B2 | 8/2016 | Sharratt et al. |
| 2001/0030154 A1 | 10/2001 | Lehrer et al. |
| 2001/0037970 A1 | 11/2001 | Farley |
| 2002/0070293 A1 | 6/2002 | Ti |
| 2002/0113145 A1 | 8/2002 | Wong |
| 2002/0148915 A1 | 10/2002 | Sasaki et al. |
| 2002/0166821 A1 | 11/2002 | Flanagan |
| 2004/0056123 A1 | 3/2004 | Douglas et al. |
| 2004/0244105 A1 | 12/2004 | Tsai |
| 2004/0255377 A1 | 12/2004 | Mueller et al. |
| 2004/0256303 A1 | 12/2004 | Talbot et al. |
| 2005/0022671 A1 | 2/2005 | Yamazaki et al. |
| 2005/0035227 A1 | 2/2005 | Li |
| 2005/0035228 A1 | 2/2005 | Douglas et al. |
| 2005/0127004 A1 | 6/2005 | Lutich |
| 2005/0205475 A1 | 9/2005 | Hsu |
| 2006/0218721 A1 | 10/2006 | Ho |
| 2006/0273201 A1 | 12/2006 | Wu |
| 2007/0006380 A1 | 1/2007 | Huang |
| 2008/0011656 A1 | 1/2008 | Lacy et al. |
| 2008/0289097 A1 | 11/2008 | Jeong |
| 2011/0147286 A1 | 6/2011 | Mang |
| 2011/0290913 A1 | 12/2011 | Jung |
| 2011/0297624 A1 | 12/2011 | Smith |
| 2012/0031511 A1 | 2/2012 | Farley |
| 2012/0111422 A1 | 5/2012 | Jeong |
| 2013/0319929 A1 | 12/2013 | Farley, Jr. |
| 2013/0334116 A1 | 12/2013 | Stanley et al. |
| 2014/0041348 A1 | 2/2014 | Lawrence et al. |
| 2014/0042241 A1 | 2/2014 | Cai et al. |
| 2015/0298143 A1 * | 10/2015 | Farley ............... B01D 35/02 239/553 |

OTHER PUBLICATIONS

Shower filter replacement cartridge for models WMF, HSF, and SUN. Sold by Paragon Waters Systems, Inc. found at URL: www.amazon.com/Shower-filter-replacement-cartridge-models/dp/50001F0ZZO; Four (4) pages; Applicant believes that the above product is prior art being on sale more than one year prior to the earliest claimed priority date of the subject application namely, Feb. 14, 2015.

* cited by examiner

SHOWERHEAD WITH FILTER CARTRIDGE ASSEMBLY

CROSS REFERENCES TO RELATED APPLICATIONS

The following application claims priority to U.S. Provisional Patent Application Ser. No. 62/135,050, filed Mar. 18, 2015 entitled SHOWERHEAD WITH CARTRIDGE FILTER ASSEMBLY and U.S. Provisional Patent Application Ser. No. 62/116,380, filed Feb. 14, 2015 entitled SHOWERHEAD WITH CARTRIDGE FILTER ASSEMBLY. Both of the above-identified U.S. provisional patent applications are incorporated herein by reference in their respective entireties for any and all purposes.

TECHNICAL FIELD

The present disclosure relates to a showerhead comprising a filter cartridge assembly including a replaceable filter cartridge for filtering water flowing through the showerhead, and more specifically, a showerhead comprising a filter cartridge assembly including a split filter cartridge housing for removably supporting the replaceable filter cartridge.

BACKGROUND

Both residential and commercial establishments typically include a stand-alone shower and/or a bathtub equipped with a showerhead for bathing. The showerheads are coupled to a water supply source. Two of the most common water supply sources include a well, typically in rural areas and water feed lines from a municipal water station or company. A showerhead water supply line extends through a vertical wall or panel of a shower or tub enclosure. The water supply line is typically positioned at slightly above head height of a user standing in the tub or shower enclosure. The water supply line includes a threaded distal end that angles downwardly toward the user. A fixed-position showerhead is affixed directly to the threaded distal end of the water supply line and includes a swivel connector to allow the user to angle the showerhead with respect to the water supply line as desired to direct the water flow pattern of the showerhead to a desired region of the enclosure for showering purposes.

By contrast, a hand-held showerhead may include a hand sprayer, a showerhead bracket, and a flexible hose that is coupled between the hand sprayer at one end and the shower bracket at the other end. The showerhead bracket is, in turn, is coupled to the threaded distal end of the water supply line. Water from the supply line flows through the showerhead bracket and into the flexible hose. The hand sprayer includes a handle that is manipulated by the user to direct the water flow pattern of the showerhead or sprayer as desired by the user for showering purposes.

SUMMARY

In one aspect, the present disclosure relates to a showerhead assembly including a filter cartridge assembly for filtering water flowing through the showerhead assembly. The showerhead assembly including a filter cartridge assembly for filtering water flowing through the showerhead assembly, the showerhead assembly comprising: a water-directing and filtering assembly including: a) a body portion including an exterior shell; b) a face portion including at least one water exit opening through which filtered water exits the water-directing and filtering assembly, the face portion releasably affixed to the body portion; and c) the filter cartridge assembly including: i) a filter cartridge housing, a first part of the filter cartridge housing disposed in the body portion of the water-directing and filtering assembly and including an end wall and a cylindrical side wall extending axially from the end wall, the side wall including a retainer wall adjacent the end wall and an upper wall spaced radially outwardly from the retainer wall, the retainer wall having an axial height, a second part of the filter cartridge housing disposed in the face portion of the water-directing and filtering assembly, the second part of the filter cartridge housing defined by an end wall and a cylindrical side wall extending from the end wall, an upper portion of the cylindrical side wall being received within the upper wall of the first part of the filter cartridge housing; ii) a filter cartridge removably disposed in the filter cartridge housing, the filter cartridge being generally cylindrical and centered about a central longitudinal axis of the filter cartridge and including a casing, a first end wall at one end of the casing extending orthogonal to the central longitudinal axis, a second end wall at a second end of the casing extending orthogonal to the central longitudinal axis and parallel to the first end wall, the casing and the first and second end walls defining an interior region of the filter cartridge, the casing including an outer surface and an inner surface, the first end wall including a first connector defining a first port in fluid communication with the interior region, the first connector extending axially through the first end wall and centered about a first connector central axis, the second end wall including a second connector defining a second port in fluid communication with the interior region, the second connector extending axially through the second end wall and centered about a second connector central axis, the first connector axis being radially offset from the second connector central axis, the second connector including an outer surface, the second end wall including a first recess in an exterior surface of the second end wall, the first recess extending linearly between a peripheral edge of the second end wall and the outer surface of the second connector and passing through the filter cartridge central longitudinal axis, a first circumferential groove in the outer surface of the casing axially spaced from the first end wall and the second end wall, the first circumferential groove being parallel to the first and second end walls, a first axial groove in the outer surface of the casing extending between the second end wall and the first circumferential groove; and iii) a filter media disposed in the interior region of the filter cartridge.

In one exemplary embodiment, the water-directing and filtering assembly is a showerhead of a fixed-position showerhead assembly. In another exemplary embodiment, the water-directing and filtering assembly is a showerhead bracket of a hand-held showerhead assembly.

In another aspect, the present disclosure relates to a filter cartridge for use in a showerhead assembly for filtering water flowing through the showerhead assembly. The filter cartridge comprises: a) a cylindrical filter shell centered about a central longitudinal axis of the filter cartridge and including a casing extending along the central longitudinal axis, a first end wall at one end of the casing extending orthogonal to the central longitudinal axis, a second end wall at a second end of the casing extending orthogonal to the central longitudinal axis and parallel to the first planar end wall, the casing and the first and second end walls defining an interior region of the filter cartridge, the casing including an outer surface and an inner surface, the first end wall including a first connector defining a first port in fluid communication with the interior region, the first connector extending axially through the first end wall and centered about a first connector central axis, the second end wall including a second connector defining a second port in fluid communication with the interior region, the second connector extending axially through the second end wall and centered about a second connector central axis, the first connector axis being radially offset from the second connector central axis, the second connector including an outer surface, the second end wall including a first recess in an exterior surface of the second end wall, the first recess extending linearly between a peripheral edge of the second end wall and the outer surface of the second connector and passing through the filter cartridge central longitudinal axis, a first circumferential groove in the outer surface of the casing axially spaced from the first end wall and the second end wall, the first circumferential groove being parallel to the first and second end walls, a first axial groove in the outer surface of the casing extending between the second end wall and the first circumferential groove; and b) a filter media disposed in the interior region.

BRIEF DESCRIPTION OF THE DRAWINGS

The foregoing and other features and advantages of the present disclosure will become apparent to one skilled in the art to which the present invention relates upon consideration of the following description of the invention with reference to the accompanying drawings, wherein like reference numerals refer to like parts unless described otherwise throughout the drawings and in which.

DETAILED DESCRIPTION

Referring now to the Figures generally, wherein like-numbered features shown therein refer to like elements throughout unless otherwise noted. The present disclosure relates to a showerhead assembly including a water-directing and filtering assembly having a filter cartridge assembly, and more specifically, to a showerhead assembly including a water-directing and filtering assembly comprising a filter cartridge assembly including a removable filter cartridge for purifying or filtering fluid, i.e., water, passing through or flowing through the water-directing and filtering assembly of the showerhead assembly.

Both residential and commercial establishments typically include a stand-alone shower and/or a bathtub equipped with a showerhead assembly for bathing. The establishments, as a result, require a fluid supply source provided most often from a municipality or well located on the respective property. The fluid supply provides in most instances, potable water (hereinafter referred to generally as "potable water", "water", or "fluid" interchangeably) of sufficient quality such that it can be consumed or used without immediate or long-term health risks.

However, even potable water in the U.S. may include various contaminants, such as bacteria, arsenic, metals, compounds, chlorine, and minerals mixed with carbon, (collectively or individually hereinafter "contaminants"). Accordingly, there is an interest to remove such contaminants from the water before use in bathing by the owner of a residential or commercial establishment. In particular, the interest extends to the removal of such contaminants in the water prior to the contact of the water on the body of the user taking a shower, which is advantageously achieved through the present disclosure in the various showerhead filter assembly example embodiments discussed herein in combination with the referenced figures and claims.

First Exemplary Embodiment—Showerhead Assembly 99

Figure 1:
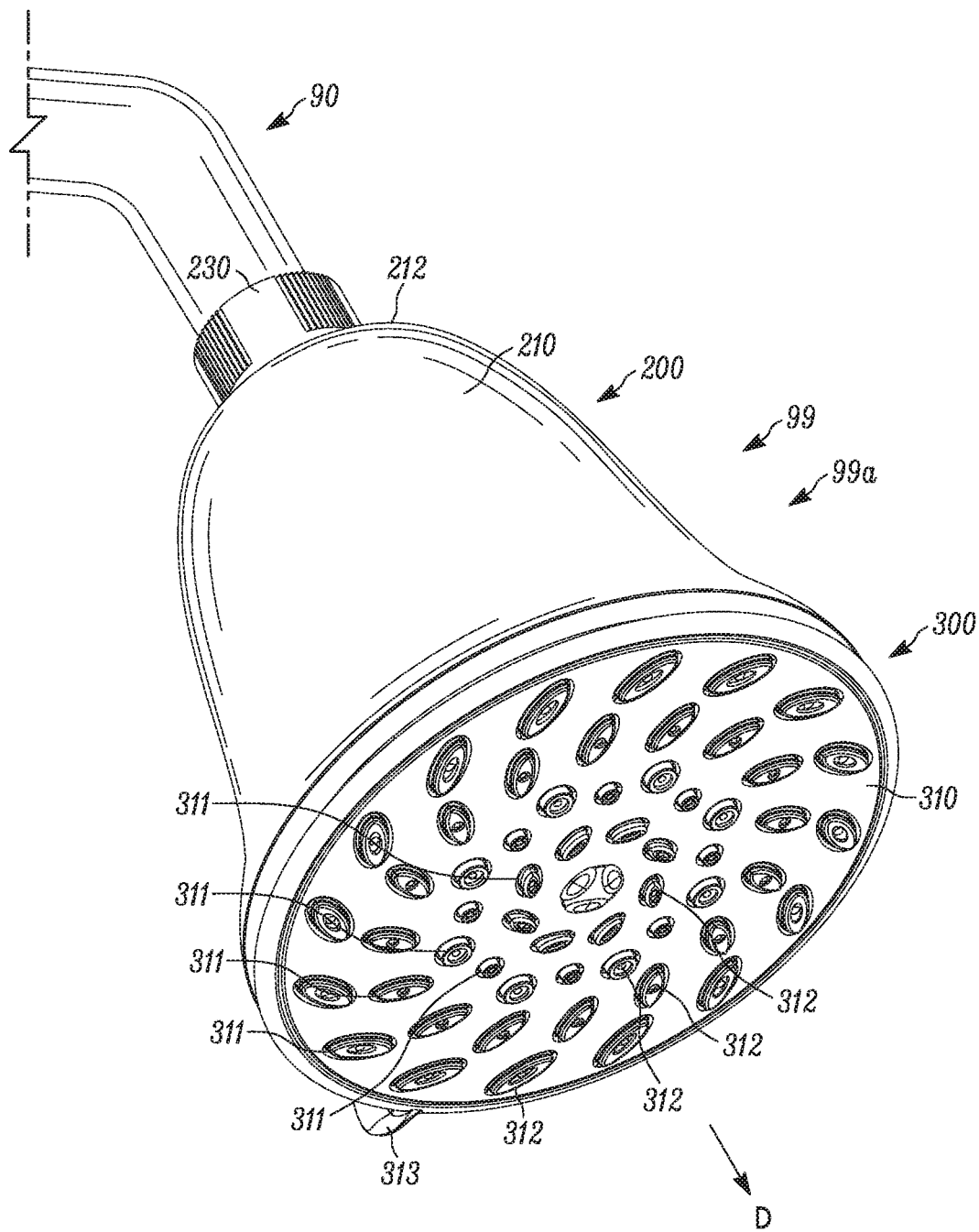
FIG. 1 is a schematic bottom, side perspective view of an exemplary embodiment of a fixed position showerhead assembly of the present disclosure, including a water-directing and filtering assembly, specifically, a showerhead attached to a water supply line.
Figure 2:
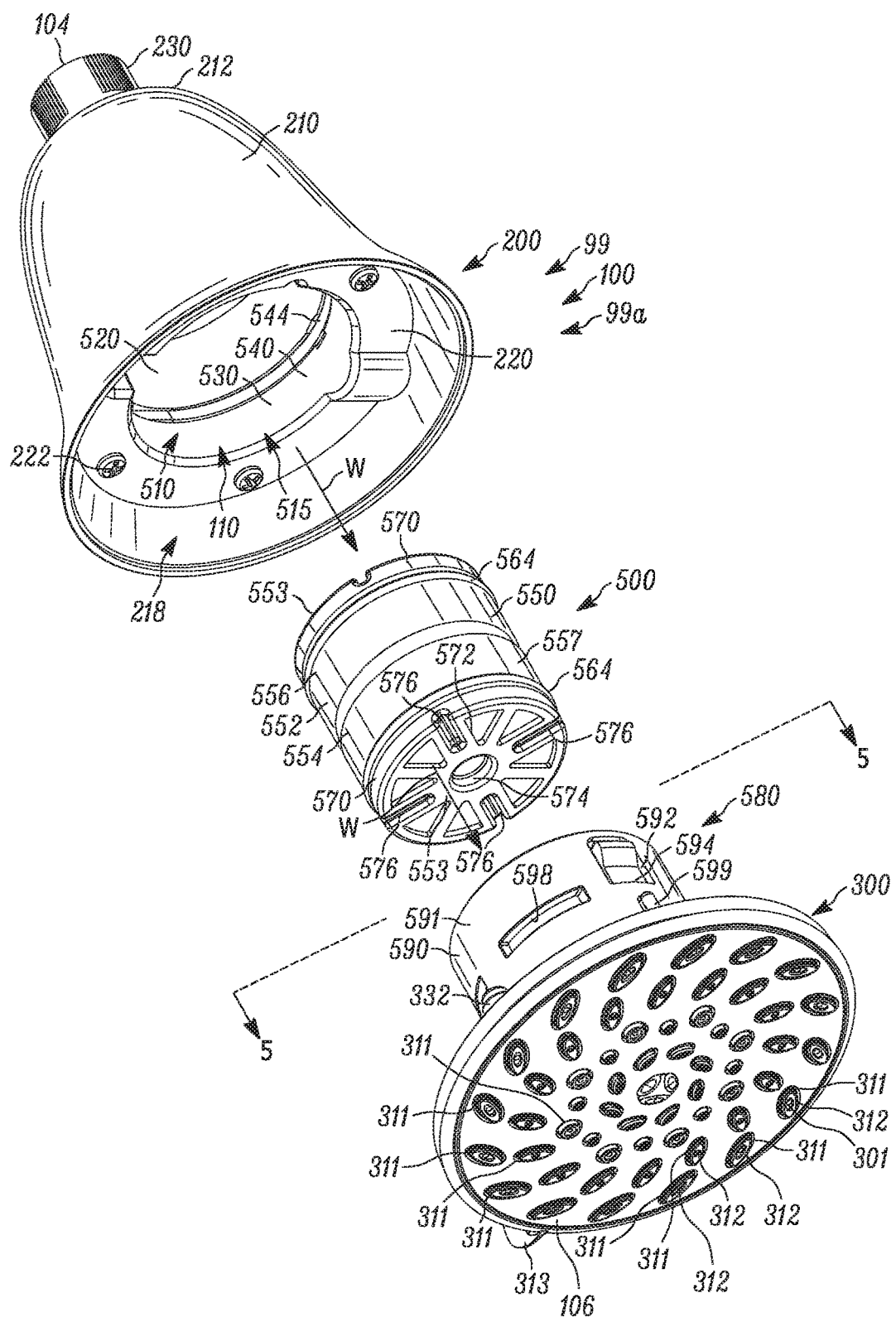
FIG. 2 is a schematic exploded bottom, side perspective view of the showerhead of FIG. 1 showing a filter cartridge assembly of the present disclosure within the showerhead.
Figure 3:
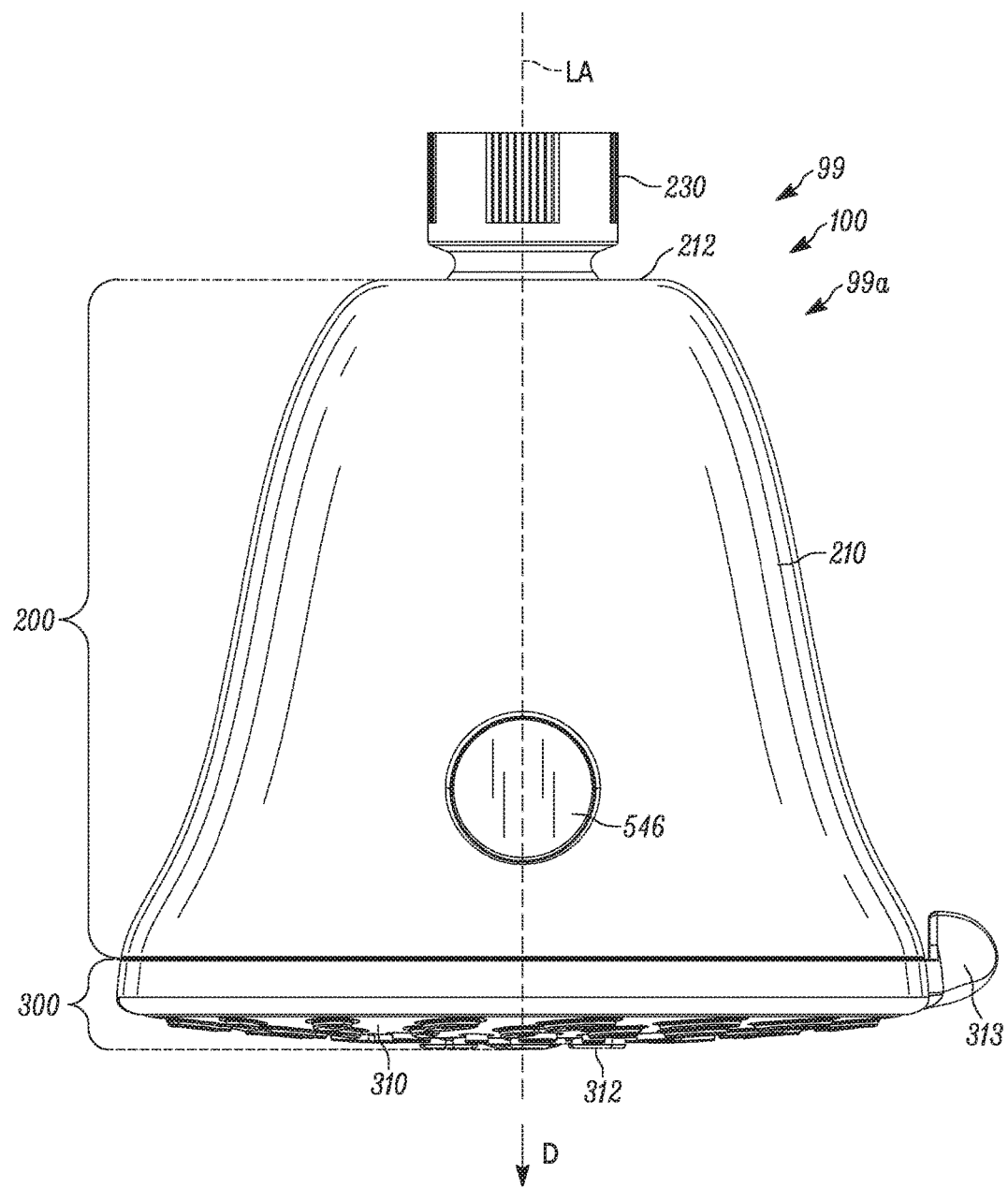
FIG. 3 is a schematic front elevation view of the showerhead of FIG. 1.
Figure 4:
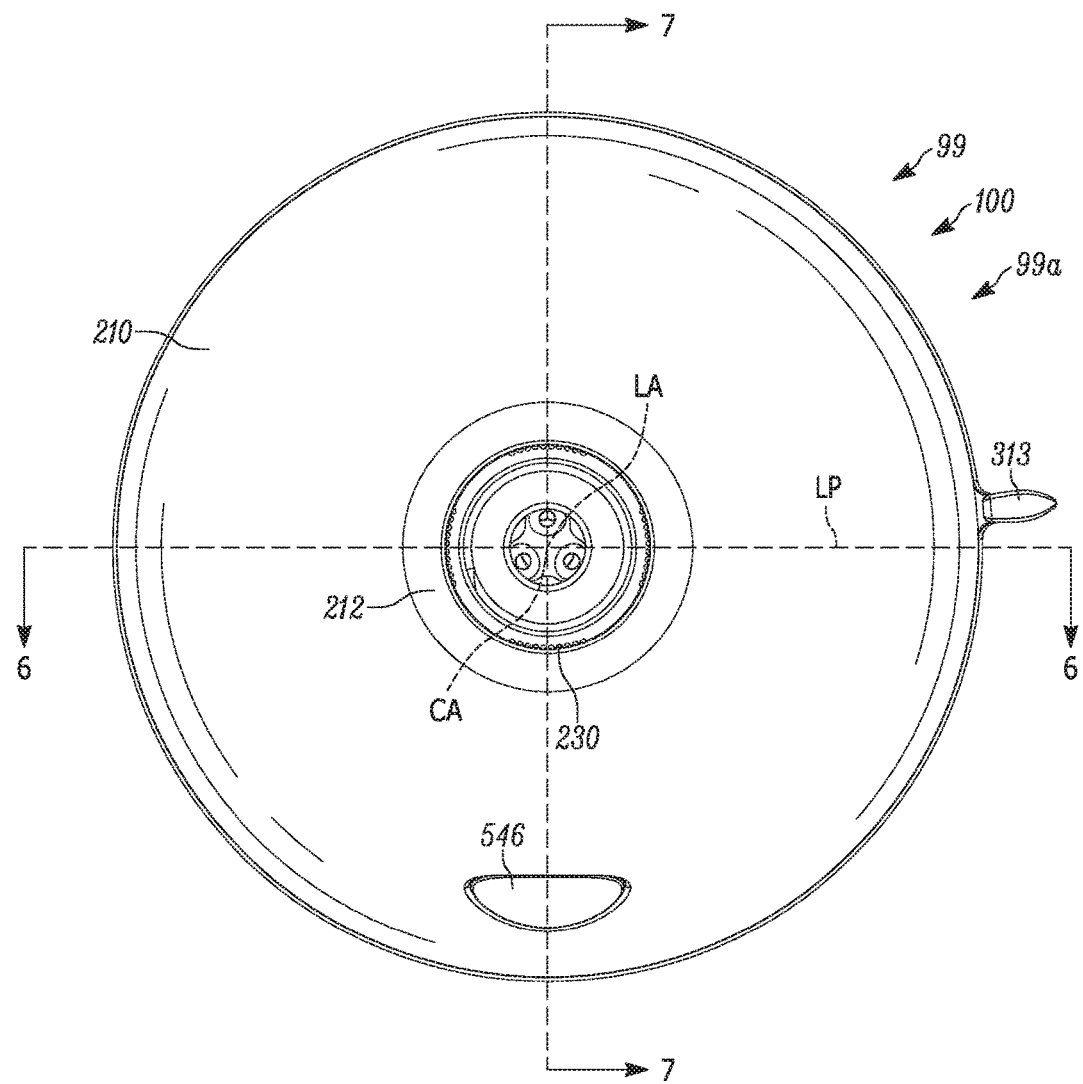
FIG. 4 is a schematic top plan view of the showerhead of FIG. 1.

Referring now to the Figures, FIGS. 1 and 2 are schematic perspective views of a first exemplary embodiment of a showerhead assembly 99 including a water-directing and filtering assembly 99a, which extends along a longitudinal or central axis LA (FIGS. 3-4 and 6-7). The water-directing and filtering assembly 99a both directs or routes the flow of water emanating from a water supply line 90 and further includes a filter cartridge assembly 500 for filtration of the water from the supply line 90 prior to the water being sprayed upon the user during a shower. Filtered water exits the water-directing and filtering assembly 99a in a spray pattern in a generally distal or downward direction D (FIG. 3) with respect to the central or longitudinal axis LA of the showerhead assembly 99. The showerhead assembly 99 comprises a fixed-position showerhead 100, which constitutes the water-directing and filtering assembly 99a, constructed in accordance with one example embodiment of the present disclosure.

Figure 10:
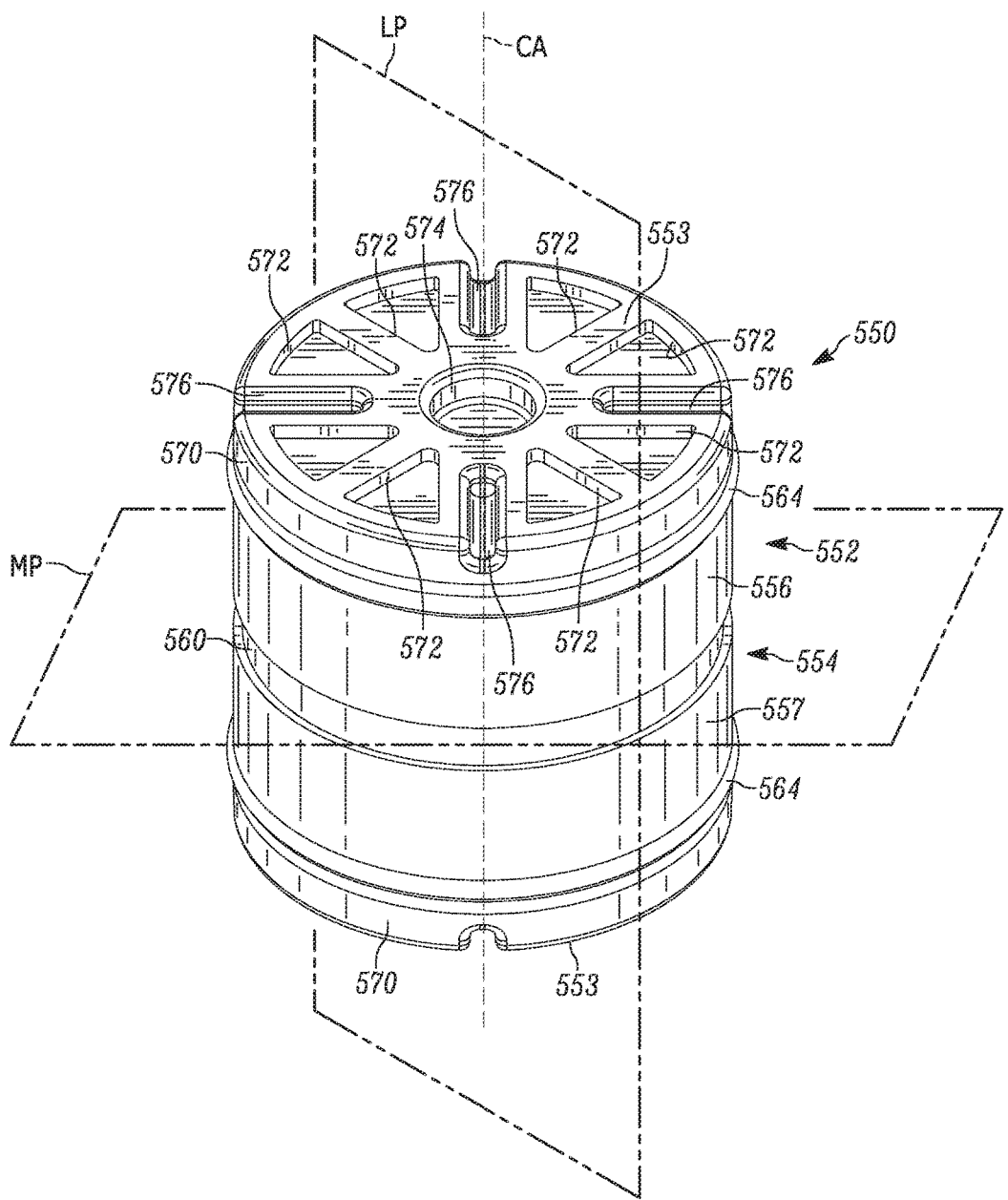
FIG. 10 a schematic top, side perspective view of the filter cartridge of the filter cartridge assembly of the showerhead of FIG. 1.

The showerhead 100 is coupled to the water supply line 90 extending through a wall of panel of, for example, a tub or shower enclosure. The filter cartridge assembly 500 provides for filtration of water W that passes through a showerhead engine 102 (schematically shown in FIGS. 6 and 7) of the showerhead 100. Specifically, the filtration of water is accomplished by a cylindrical filter cartridge 550 (best seen in FIGS. 8-13) housed or disposed in a split filter cartridge housing 510 (best seen in FIG. 6-9). The showerhead engine 102 directs all water flowing through the showerhead 100 such that the unfiltered water flows into orifices 572 (FIG. 10) in an end wall 553 of the cartridge 550 closest to the supply line 90. The water then flows through filter media 578 contained within an interior region 555 of the filter cartridge whereby contaminants are removed by the filter media 578 and/or are chemically converted or altered to inert materials and/or less undesirable materials by the filter media 578, i.e., the flowing water is filtered by the filter media 578. The filter water then exits through orifices 572 in an opposite end wall 553 of the cartridge 550, the end wall 553 nearest a faceplate 310 of the showerhead 100. A flow of water through an interior region 110 of the showerhead 100 (and through the showerhead engine 102) from an upper end 104 to a lower end 106 of the showerhead 100 is shown schematically as W in FIGS. 2 and 6.

Advantageously, the filter cartridge 550 is reversible within the split filter cartridge housing 510. Thus, when the user notices a decrease in water flow in a flow pattern of filtered water emanating from the faceplate 310 of the showerhead, this may be an indication that a build-up of filtered out contaminants in the filter media 578 of the filter cartridge 550 is causing a reduction in water flow discharged from the showerhead 100. At this point, the user may remove filter cartridge 550 and reverse the orientation of the cartridge 550 within the split filter cartridge housing 510 thereby reversing the direction of flow through the cartridge 550. Reversing the direction of water flow through the filter cartridge 550 will typically result in increased the filtered water flow from the new exit end of the filter cartridge and effectively prolong the useful life of the filter cartridge 550. At such time as the filter cartridge 550 becomes so clogged with filtered contaminants that filtered water exiting the cartridge 550 is reduced to an unacceptable low volume which does not provide a proper shower flow pattern and/or volume emanating from the faceplate 310 for showering purposes, the user will remove and replace the filter cartridge 550 with a new filter cartridge 550.

As explained below, a latching arrangement 541 of the showerhead 100 of the present disclosure advantageously allows for efficient disassembly of a face portion 300 from a body portion 200 of the showerhead. A first body part 520 of the split filter cartridge housing 510 stays with the body portion 200 upon disassembly of the face portion 300 from the body portion 200, while a second face part 580 of the split filter cartridge housing 510 is affixed to and removed with face portion 300 upon disassembly of the face portion 300 from the body portion 200 of the showerhead 100. This latching arrangement 541 and the split configuration of the split filter cartridge housing 510 allows the user ready and efficient access to the filter cartridge 550 disposed in the split filter cartridge housing 510 for purposes of reversing the direction or, at the end of its useful life, removing and replacing the filter cartridge 550 with in split filter cartridge housing 510.

Figure 14:
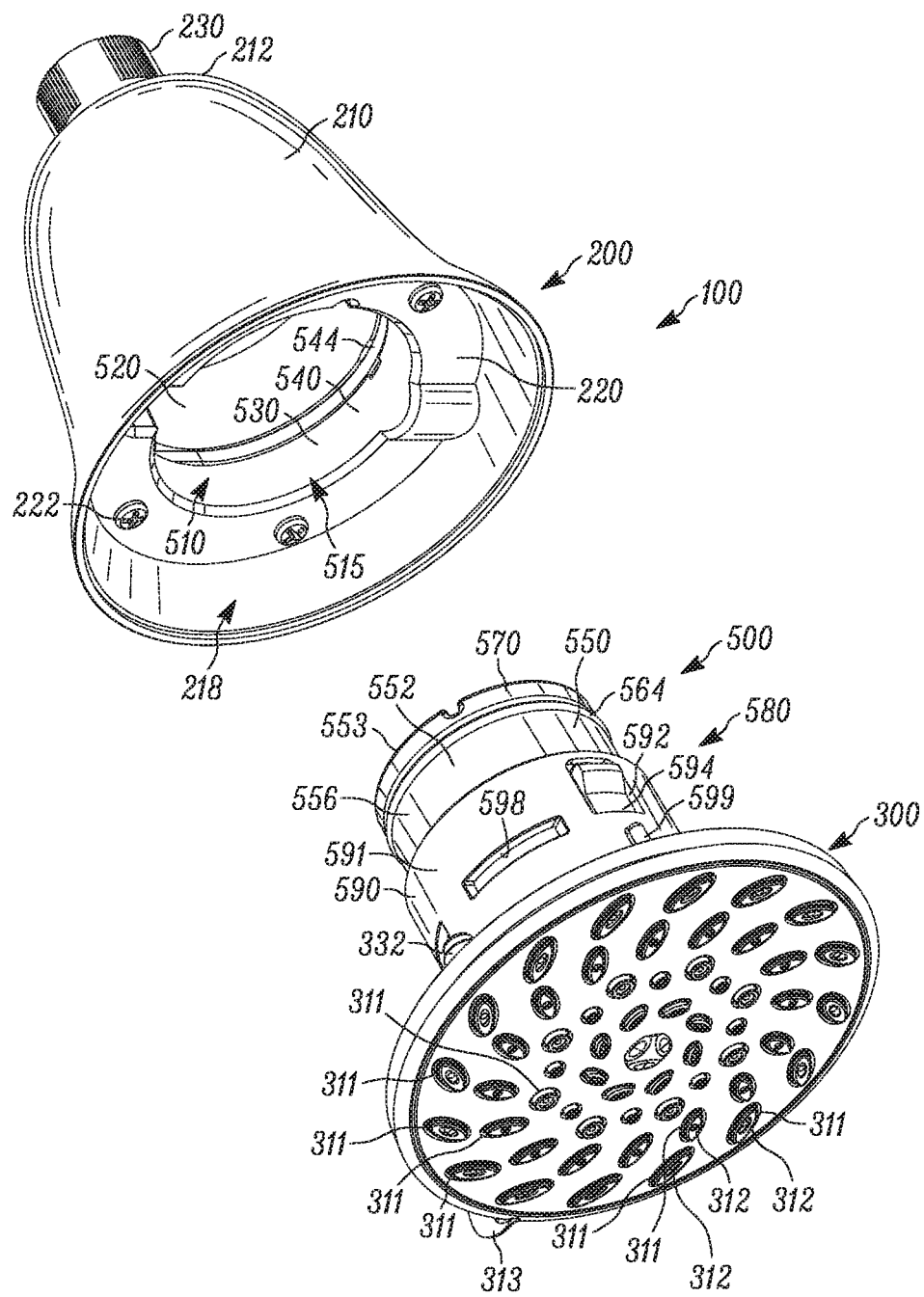
FIG. 14 is a schematic exploded bottom, side perspective view of the showerhead of FIG. 1 showing the face portion of the showerhead, as removed from the body portion of the showerhead, with the filter cartridge seated or nested in a second part or portion of a split filter cartridge housing coupled to the face portion, upon removal of the face portion from the body portion.

Additionally, as will be explained below, advantageously, the second part 580 of the split filter cartridge housing 510 includes an extraction finger arrangement including a pair of extraction fingers 594 (FIGS. 8 and 9) such that when the face portion 300 is removed from the body portion 200 of the showerhead 100, the filter cartridge 550 is held or remains seated or nested in the second part 580 of the housing 510. The seating or nesting of the filter cartridge 550 in the second part of the filter cartridge housing upon removal of the face portion 300 from the body portion 200 is schematically depicted in FIG. 14. Thus, removed cartridge 550 is in the user's hand with the face portion 300 meaning that the user has easy access to the filter cartridge 550 for purposes of reversing its direction within the housing 510 or replacing the cartridge 550. The user does not have to pry or otherwise dislodge the filter cartridge from the first part 520 of the split filter cartridge housing 510 in the body portion 200 of the showerhead 100. This makes it easier for the user to reverse the direction or replace the filter cartridge 550 and minimizes the risk of the filter cartridge 550 falling from the showerhead 100 to the floor of the tub or shower enclosure thereby potentially damaging the filter cartridge 550.

Body Portion 200 and Face Portion 300 of Showerhead

The showerhead 100 includes the body portion 200, which is affixed to and extends from the unfiltered water supply line 90, and the face portion 300, which includes the faceplate 310, through which filtered water exits the showerhead 100 in a filtered water spray pattern that impinges upon the user of the showerhead 100.

The face portion 300 includes the faceplate 310, a backing plate 314, and an intermediate plate 320 sandwiched between the faceplate 310 and the backing plate 314. The face portion 300 also includes a rotatable housing cylinder 330 (FIG. 8) defining the second, face part 580 of the split filter cartridge housing 510. The second part 580 of the split filter cartridge housing 510 extends from a base 581 (FIG. 6) and includes a generally drum-shaped end wall 583 extending orthogonally to the longitudinal axis LA of the showerhead and a cylindrical side wall 590 extending from the end wall 583. The base 581 of the second part 580 is rotatably supported on a shoulder 318 of the backing plate 314. Extending in the distal direction D from the base 581 is an axially extending threaded stem 582, which receives a threaded fastener 334 to rotatably secure the second part 580 of the filter cartridge housing 510 to the face portion 300. A head of the threaded fastener 334 is covered by a distal cover 336 of the faceplate 310.

Figure 5:
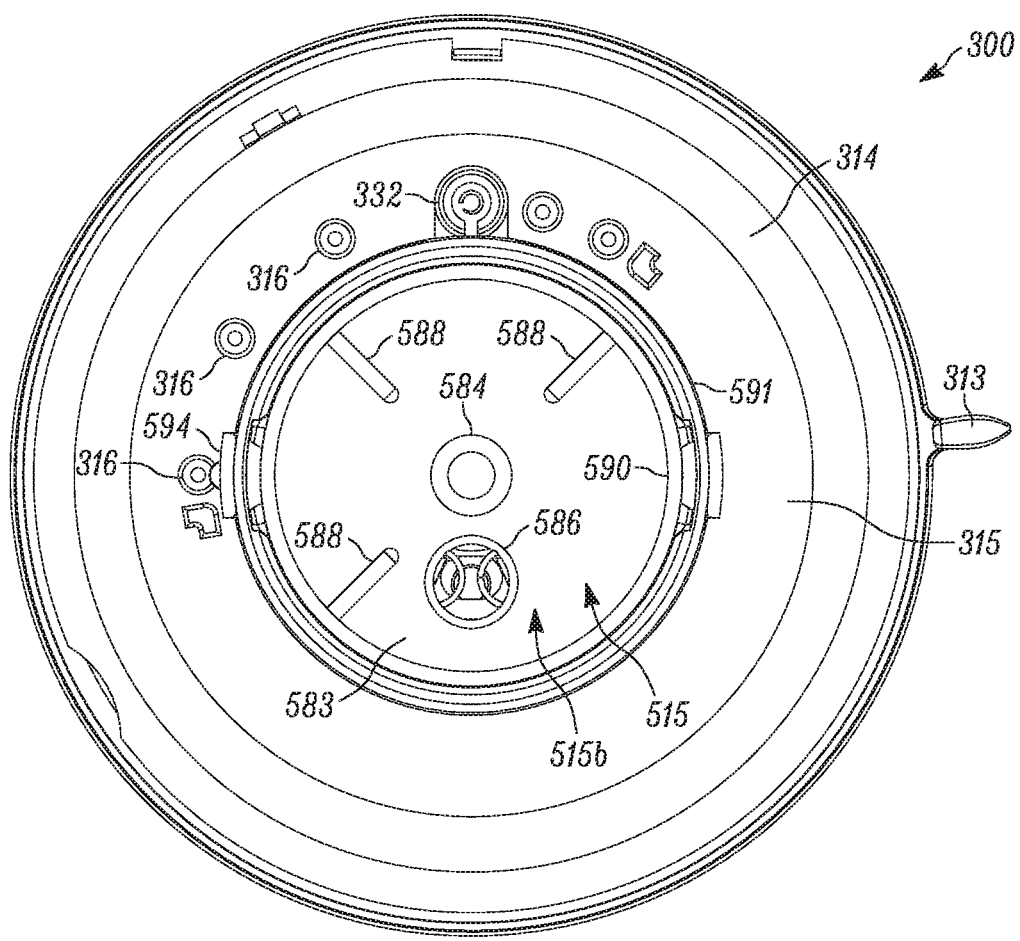
FIG. 5 is a schematic top plan view into a face portion of the showerhead of FIG. 1, as seen from a plane indicated by the line 5-5 in FIG. 2.
Figure 8:
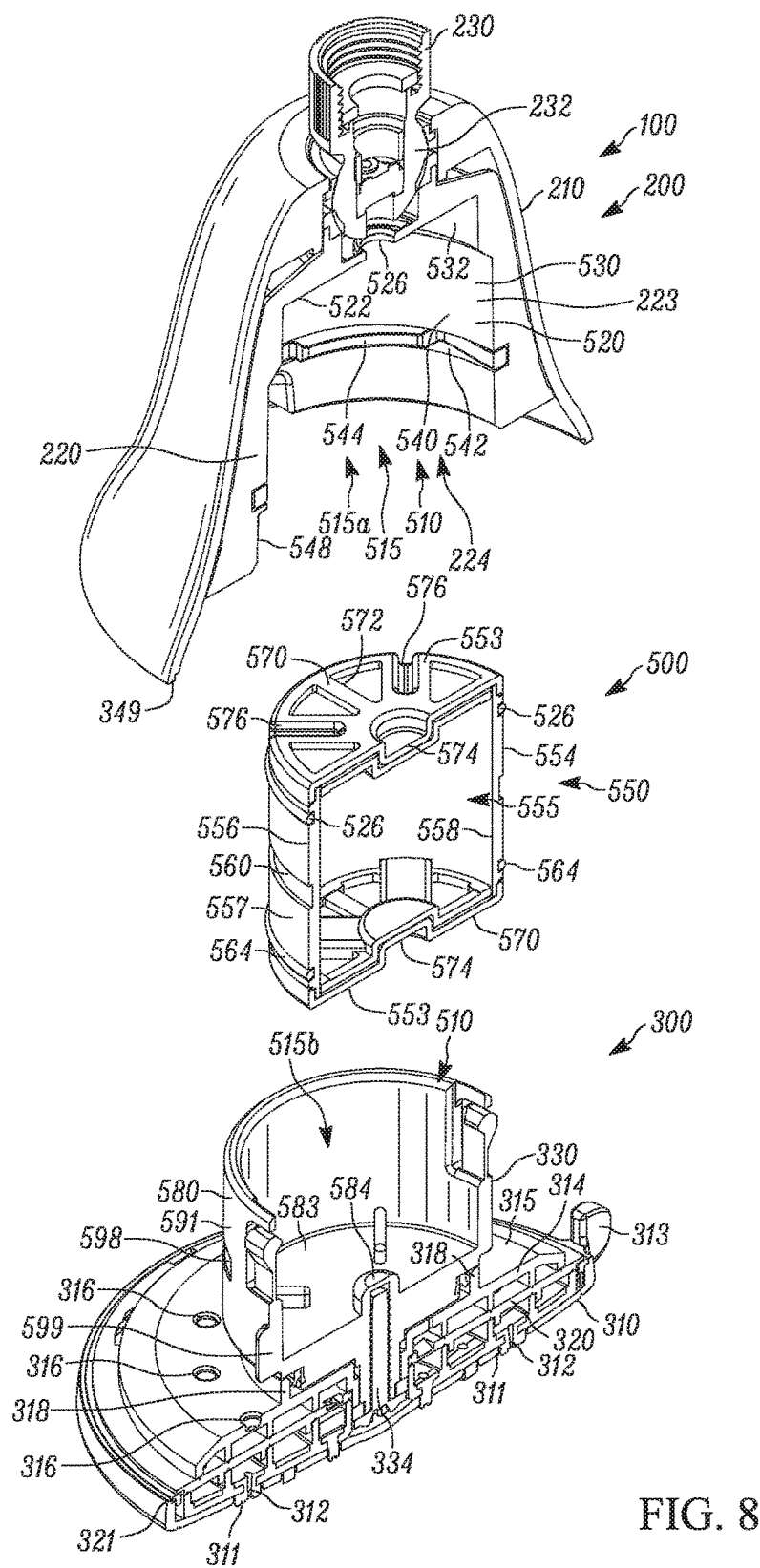
FIG. 8 is a schematic top, side exploded perspective view of a longitudinal section the showerhead of FIG. 1, with a filter media of a filter cartridge of the filter cartridge assembly removed.
Figure 9:
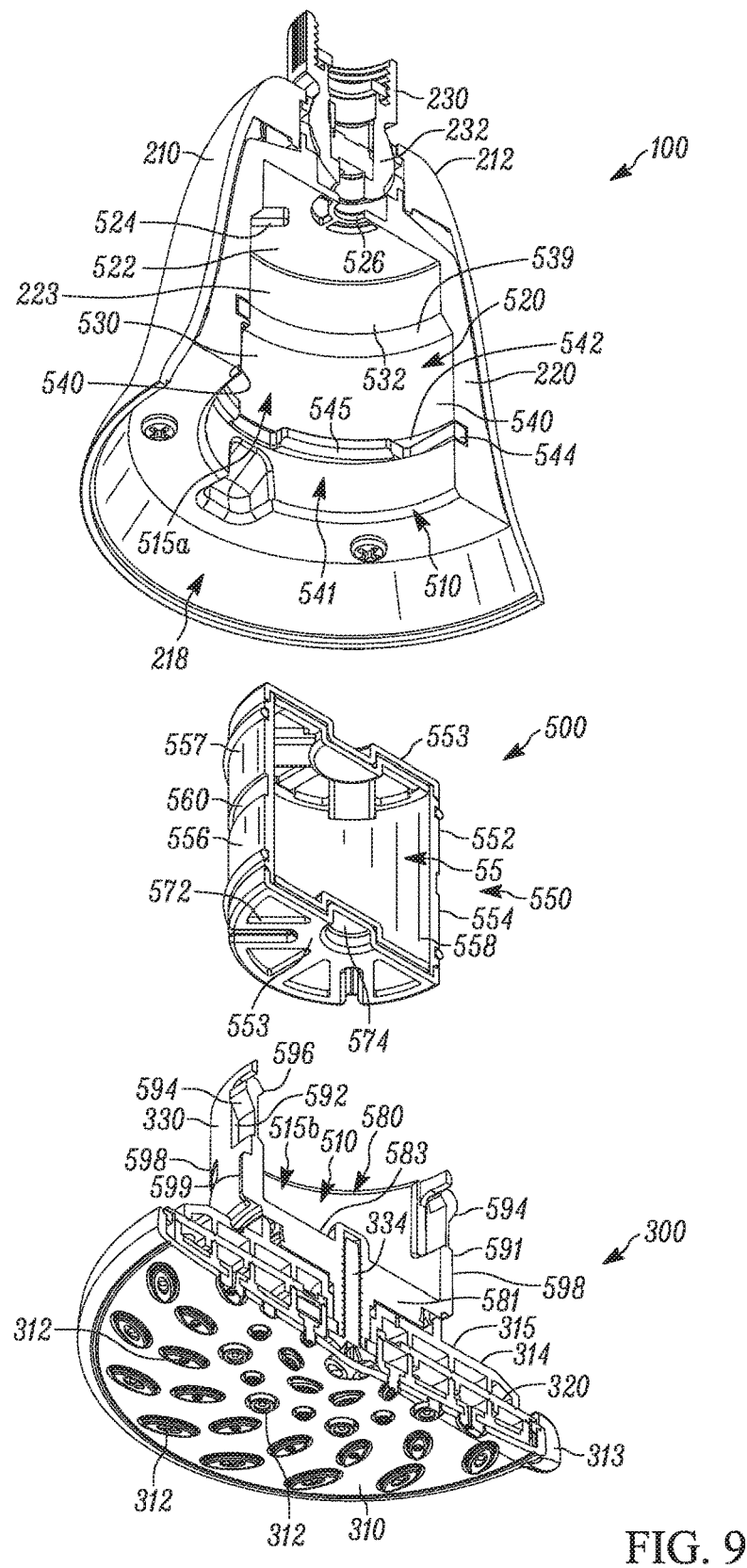
FIG. 9 is a schematic bottom, side exploded perspective view of a longitudinal section the showerhead of FIG. 1, with a filter media of the filter cartridge assembly removed.

As can best be seen in FIGS. 5 and 8, an upper surface 315 of the backing plate 314 includes a plurality of detent notches 316, which are used to change water flow patterns of the showerhead, as desired by the user. Affixed to an outer surface of the rotatable housing cylinder 330, that is, affixed to an outer surface 591 of the side wall 590 of the filter cartridge housing second part 580, is a detent arm assembly 332. The detent arm assembly 332 includes a spring biased detent 333. The side wall 590 of the second part 580 includes a pair of cut outs 592 in the side wall 590. The cut outs 592 are positioned approximately 180° apart about the periphery defined by the cylindrical side wall 590. Disposed in the respective cut outs 592 are the pair of extraction fingers 594 that function to extract the filter cartridge 550 when the face portion 300 is removed from the body portion 200.

As described in more detail below, the latching arrangement 541 releasably secures the face portion 300 to the body portion 200. When the latching arrangement or mechanism 541 is engaged, the housing cylinder 330, that is, the second part 580 of the split filter cartridge housing 510, is secured to the inner frame 220 of the body portion 200 in a non-rotational manner. When the latching mechanism 541 is engaged, rotation between the housing cylinder 330 and the inner frame 220 of the body portion 200 is prevented by latching mechanism and the interfit of an axially extending locating rib 599 on an outer surface 591 of a side wall 590 of the second part 580 of the filter cartridge housing 510 that is received by a corresponding axially extending slot 548 in an upper wall 540 of the first part 520. That is, when the user rotates the faceplate 310 by pushing on the faceplate rotation finger 313, the faceplate 310, the backing plate 314 and the intermediate plate 320 rotate in unison. However, the housing cylinder 330, that is, the second part 580 of the split filter cartridge housing 510 does not rotate. Rather, the housing cylinder 330, that is, the second part 580, including the base 581 and the stem 582 are stationary being fixed to the body portion 200 via the latching mechanism 341 and the interfit of the rib 599 and the slot 548. Thus, as the backing plate 314 rotates as the user rotates the faceplate rotation finger 313, the spring biased detent 333 locks into the detent notches 316 on the upper surface 315 of the backing plate 314, as the notches 316 pass sequentially under the detent 333. As can be seen in FIG. 5, in one exemplary embodiment, the number of detent notches 316, and, thus, the number of water flow patterns that may be selected by the user by rotating the faceplate rotation finger 313 is six water flow patterns or six water flow pattern presets.

Filtered water exiting the orifices 572 of the filter cartridge 550 flows through an opening or orifice 586 (FIG. 5) in the end wall 583 of the second part 580 of the split filter cartridge housing 510 and into a water manifold defined by the combination of plates 310, 314, 320. The rotational position of the exit orifice 586 with respect to the backing plate 314 determines what portion of the water manifold receives the flowing, filtered water and, thus, what spray pattern is discharged by the nozzles 311 of the faceplate 310.

The faceplate 310 includes a plurality of nozzles 311 which include orifices 312 allowing filtered water to exit the showerhead in a spray pattern in the distal or downward direction D (FIG. 3) with respect to the central or longitudinal axis LA (FIGS. 3, 6 and 7) through the showerhead 100. The plurality of orifices 312 define at least one water exit opening The faceplate 310 of the face portion 300 is rotatable with respect to the body portion 200 between a selected one of a plurality of predetermined filtered water spray pattern positions or spray pattern presets. The faceplate 310 includes a rotation finger 313 that facilitates rotation of the faceplate 310 by a user. The specific nozzles of the plurality of nozzles 311 are selectively in fluid communication or not in fluid communication with the showerhead engine 102 depending on the selected spray pattern position or preset selected by the user by rotation of the faceplate 310. Relative rotation of the faceplate 310 with respect to the body portion 200 between the six presets changes the volumetric fluid flow rate or filtered water spray pattern exiting from the faceplate 310 of the showerhead 100.

Figure 6:
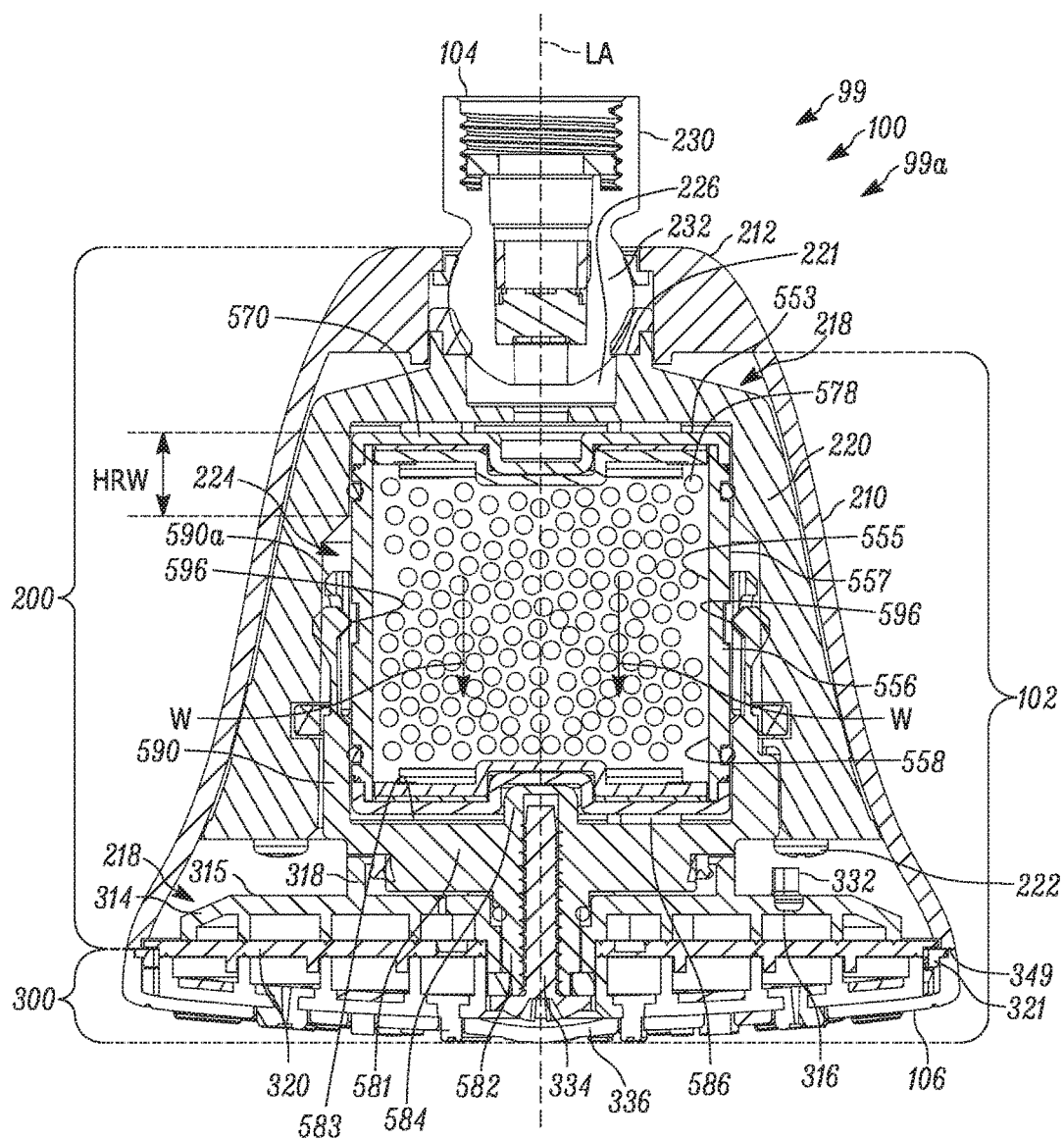
FIG. 6 is a schematic longitudinal section view of the showerhead of FIG. 1, as seen from a plane indicated by the line 6-6 in FIG. 4.
Figure 7:
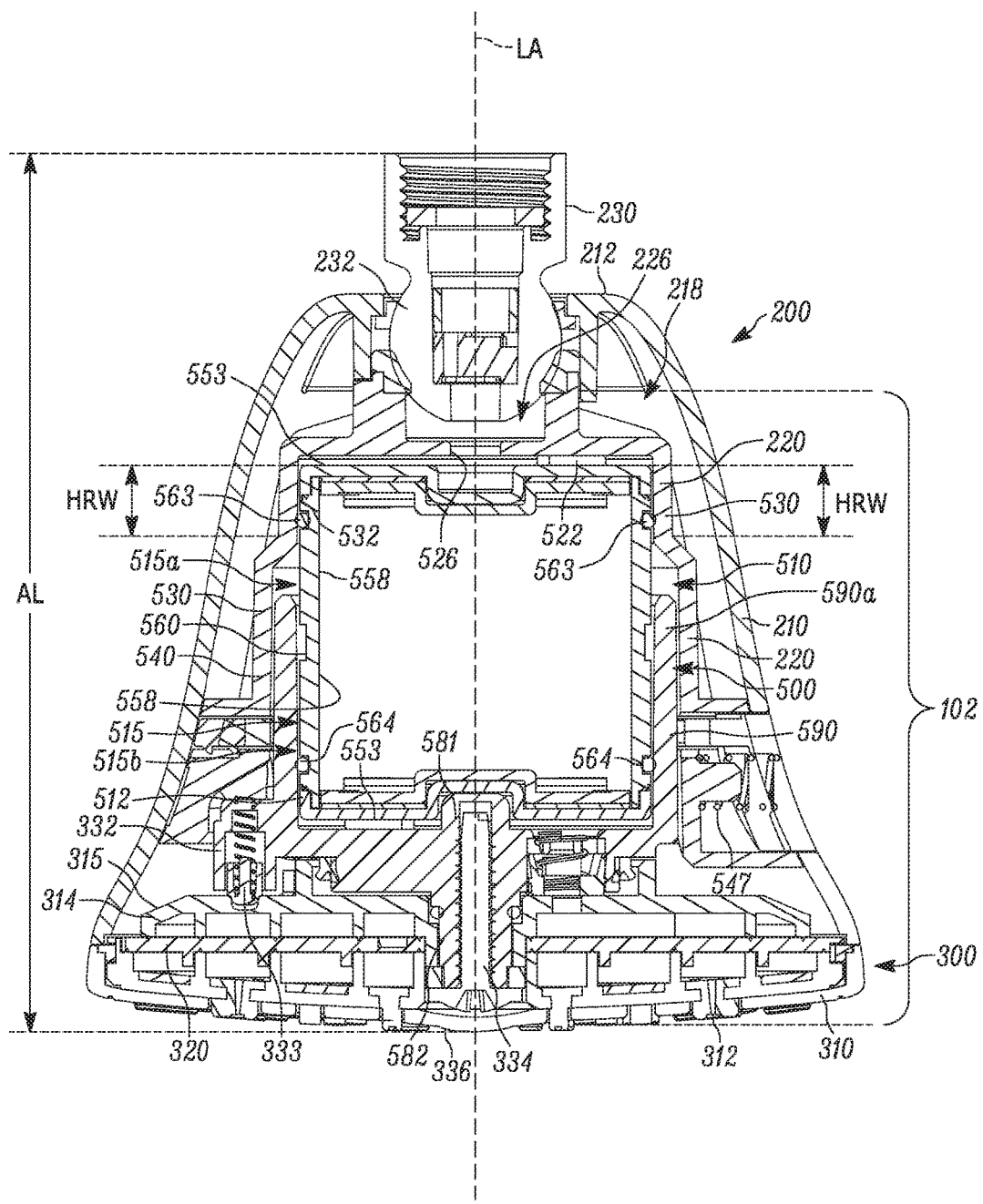
FIG. 7 is a schematic longitudinal section view of the showerhead of FIG. 1, as seen from a plane indicated by the line 7-7 in FIG. 4.

As can best be seen in FIGS. 6 and 7, the body portion 200 includes a generally bell-shaped exterior shell 210 and an inner frame 220 disposed within an interior region 218 defined by the exterior shell 210. The inner frame 220 is affixed to the exterior shell 210 by a plurality of threaded fasteners 222. The inner frame 220, in turn, includes an inner surface 223 that defines an interior region 224 of the inner frame 220. A threaded swivel connection 230 couples an upper portion 212 of the exterior shell of the body portion 200 to a distal threaded portion of the water supply line 90 and provides a passageway for the flow of water from the supply line 90 to the showerhead engine 102. The swivel connection 230 includes a ball 232 which allows the body portion 200 of the showerhead 100 to be swiveled or articulated with respect to the swivel connection 230 (and the water supply pipe 90) in a ball and socket type arrangement.

The inner surface 223 of inner frame 220 defines the first, body part 520 of the split filter cartridge housing 510. The first part 520 of the split cartridge housing 510 includes an end wall 522 generally orthogonal to the showerhead longitudinal axis LA and a side wall 530 extending orthogonally to the end wall 522 along the longitudinal axis LA. The side wall 530 includes two portions: a) an annular retainer wall 532 adjacent to the end wall 522; and b) the annular upper wall 540 spaced from the end wall 522 and stepped radially outwardly from the retainer wall 532, along a shoulder 539.

The end wall 522 includes a central multi-opening orifice 526 that allows unfiltered water to flow from the cavity 226 formed in the upper portion 221 of inner frame 220 into the plurality of orifices 572 of the end wall 553 of the filter cartridge 550 facing and closes to the swivel connector 230.

The showerhead engine 102, shown schematically in FIGS. 6 and 7, defines a water flow path or passageway (shown schematically as water flow W in FIGS. 2 and 6) through the showerhead 100 that extends generally along a longitudinal axis LA of the showerhead (FIG. 6), and includes a water flow path through both the body portion 200 and the face portion 300. The showerhead engine 102 extends generally from an upper portion 221 (FIG. 6) of the inner frame 220 of the body portion 200, where unfiltered supply line water is received an upper cavity 226 (FIG. 6) formed in the upper portion 221 of the inner frame 220. The water is received into the upper cavity 226 from a passageway through the ball 232 of the swivel connector 230 and flows through the split filter cartridge housing 510 and the filter cartridge 550, through the water manifold defined by the plates 310, 314, 320 and exits through the spray nozzles 311 of the faceplate 310. The showerhead engine 102 provides alternate water flow paths through the showerhead, depending on the water spray pattern selected by the user by rotating the faceplate rotation finger 313 between the predetermined spray pattern presets (the detent notches 316), as explained above. Regardless of the spray pattern selected from the spray pattern presets, the showerhead engine 102 is configured to direct the supply line water through the reversible filter cartridge 550 of the filter cartridge assembly 500, where the supply line water is filtered or purified, ultimately exiting though the face plate 310 of the face portion 300.

While the showerhead assembly 100 of the present disclosure is shown in one exemplary embodiment as a so-called fixed position showerhead, directly coupled to the water supply line 90 via the swivel connector 230, it should be appreciated, however, that the showerhead assembly 100 of the present disclosure is equally applicable to hand-held showerheads or hand sprayers, as would be appreciated by one of skill in the art. The filter cartridge assembly 500 of the present disclosure is equally applicable to and may be used in fixed position or hand-held showerheads for water filtration purposes.

Filter Cartridge Assembly 500

The filter cartridge assembly 500 of the present disclosure includes the reversible, replaceable filter cartridge 550 removably disposed in the split filter housing 510. Advantageously, for compactness along an axial direction of the showerhead 100, that is, a length AL (FIG. 7) of the showerhead 100 as measured along the longitudinal axis LA of the showerhead 100, the interior region 515 defined by the split filter cartridge housing 510 of the filter cartridge assembly 500 is sized and configured to be contained within the interior region 218 of the exterior shell 210 of the body portion 200 and further within the interior region 224 of the inner frame 220 of the body portion 200. Additionally, for axial compactness, the filter cartridge 550 is sized and configured to fit within an interior region 515 defined by the split filter housing 510 and thus the filter cartridge 550 is disposed within the interior region 218 of the exterior shell 210 of the body portion 200 and further within the interior region 224 of the inner frame 220 of the body portion 200. Moreover, as can be seen in FIG. 7, an upper portion 590a of the side wall 590 of the second face part 580 of the split filter cartridge housing 510 has an outer diameter that is sized to be telescopically received in an inner diameter of the enlarged diameter upper wall 540 of the side wall 530 of the first body part 520 of the split filter cartridge housing 510. This telescopic coupling of the side walls 530, 590 of the first and second parts 520, 580 again serves to reduce the overall axial length AL of the showerhead 100. Minimizing the axial length AL of the showerhead 100 (as measured along longitudinal axis LA) is of significant importance because the position of the water supply line 90 is fixed with respect to the panel or wall of the tub or shower enclosure. Thus, there is a limited vertical distance between the tub or shower floor and the position of the generally horizontal water supply line 90. Typically, the showerhead 100 will be angled downwardly with respect to a horizontal direction to direct the water spray pattern downwardly against the user's body. Accordingly, if the axial length AL of the showerhead 100 is too great, taller users will have a tendency to bump their heads against the faceplate 310 of the showerhead 100.

The split filter cartridge housing 510 extends along showerhead longitudinal axis LA and includes the first, body part 520 (best seen in FIG. 9) that is generally drum-shaped and is defined by the inner frame 220 of the body portion 200 and the second, face part 580 (best seen in FIG. 8) that is also generally drum-shaped and is defined by the cylindrical housing cylinder 330 of the face portion 300. As can best be seen in FIGS. 7 and 9, the interior region 515 of the split filter cartridge housing 510 is comprised by a first portion 515a of the interior region 515 defined by the first part 520 and a second portion 515b of the interior region 515 defined by the second part 580.

The second part 580 of the filter cartridge housing 510 includes the planar end wall 583, the cylindrical side wall 590 and the detent arm assembly 332. The side wall 590 includes the pair of extraction fingers 594 that are disposed in the cut outs 592 positioned approximately 180° apart about the periphery of the side wall 590. The side wall 590 additionally includes a pair of peripheral slots 598 (one of which may be seen in FIGS. 8 and 9) formed in the outer surface 591 of the side wall 590. The pair of peripheral slots 598 are part of the latching arrangement or mechanism 541 of the showerhead 100 to releasably attach the face portion 300 to the body portion 200, as explained below. The outer surface 591 of the side wall 590 includes the axially extending locating rib 599 (FIG. 8) which is received in the axially extending slot 548 of the upper wall 540 of the side wall 530 of the first part 520 to inhibit relative rotation between the second part 580 and the first part 520 when the latching mechanism 541 is engaged. The end wall 583 of the second part 580 includes the water orifice 586, previously discussed, and a central axially extending boss 584 that is received in a center opening 574 defined in the respective end walls 553 of the filter cartridge 550. The end wall 583 also includes three radially extending anti-rotation ribs 588 that are received in three of the four radially extending recesses 576 defined in the end walls 553 of the filter cartridge 550. Advantageously, when the anti-rotation ribs 588 are seated in respective recesses 576 of the filter cartridge 550, undesired rotation of the filter cartridge 550 within the split filter cartridge housing 510 is prevented.

The first part 520 of the split filter cartridge housing 510 includes the end wall 522 that is generally orthogonal to the longitudinal axis LA and the side wall 530 extending orthogonally to the end wall 522 along the longitudinal axis LA. The side wall 530 includes two portions: a) an annular retainer wall 532 adjacent to the end wall 522; and b) an annular upper wall 540 spaced from the end wall 522 and stepped radially outwardly from the retainer wall 532, along a shoulder 539. The increased diameter of the upper annular wall 540 is sized to telescopically receive an upper portion 590a of the side wall 590 of the second part 580 of the split filter cartridge housing 510, as can best be seen in FIG. 7.

The upper wall 540 of the first part 520 includes an annular latching slot 542 that supports the latch 544. The latching slot 542 and the latch 544 are part of a latching arrangement 541 that releasably secures the face portion 300 to the body portion 200 of the showerhead 100. The latch 544 slides in a radial direction (orthogonal to the longitudinal axis LA) outwardly to recess within the latching slot 542 when the user pushes inwardly on a latch release actuator 546 (FIG. 4) positioned in an opening on the exterior shell 210 of the body portion 200. When the latch 544 is in an engaged or latching position, two inwardly extending rib portions 545 of the latch 544 engage the pair of peripheral slots 598 (one of which may be seen in FIGS. 8 and 9) formed in an outer surface 591 of a side wall 590 of a second, face part 580 of the filter cartridge housing 510 to releasably secure the face portion 300 to the body portion 200 of the showerhead 100.

When it is desired to either reverse the filter cartridge 550 (to extend its useful life by reversing water flow direction through the filter cartridge) or replace the filter cartridge 550 (when its useful life has expired), the face portion 300 is removed from the body portion 200 by pressing inwardly on the latch release actuator 546 thereby sliding the inwardly extending rib portions 545 of the latch to be recessed within the latching slot 542 and out of engagement with the peripheral slots 598 of the outer surface 591 of the side wall 590 of the second, face part 580 of the filter cartridge housing 510 thereby allowing the face portion 300 to moved with respect to the stationary body portion 200 along the longitudinal axis LA in a direction down D (FIG. 3) and removed from the body portion 200. When the latch release actuator 546 is pressed, the latching mechanism 541 is moved to the release position.

Advantageously, the configuration of the filter cartridge 550 includes a center, annular circumferential extraction groove 560 in an outer surface 557 of a central casing 556 of the filter cartridge 550. The second part 580 of the filter cartridge housing 510 includes the pair of extraction fingers 594 formed in a pair of cut outs 592 in the side wall 590 of the second part 580 of the filter cartridge housing 510.

A radially protruding head 596 of each of the extraction fingers 594 extend into and engage the circumferential extraction groove 560 of the filter cartridge 550. Thus, when the face portion 300 is removed from the body portion 200 by the user pressing the latch release actuator 546, as can be best seen in FIG. 14, the filter cartridge 550 is removed with the face portion 300, that is, is remains seated or nested in the second part 580 of the filter cartridge housing 510 upon removal of the face portion 300 from the body portion 200. This is advantageous since it allows the user easy access to the filter cartridge 550 because the filter cartridge is literally in his or her hand as it is attached to the face portion 300 when the face portion 300 is removed from the body portion 200 by the user. Thus, the user does not have to attempt to dislodge the filter cartridge 550 from the first part 520 of the filter cartridge housing 510 where it may become seated, thereby risking potentially damaging the filter cartridge 550 or the body portion 200 when attempting to dislodge the filter cartridge 550 from the first part 520 of the filter cartridge housing 510. Additionally, the risk of the filter cartridge 550 suffering damage by initially being seated in the first part 520 of the filter cartridge housing 510 and then, upon dislodgement of the filter cartridge 550 by the user, the filter cartridge 550 falling to the floor of the tub or shower and suffering damage is also mitigated by the extraction finger design of the present disclosure.

The end wall 522 of the first part 520 also includes three radially extending anti-rotation ribs 524, which are received in a respective three of the four radially extending recesses 576 defined in the end walls 553 of the filter cartridge 550. Advantageously, when the anti-rotation ribs 588 are seated in respective recesses 576 of the filter cartridge 550, undesired rotation of the filter cartridge 550 within the split filter cartridge housing 510 is prevented. Additionally, the anti-rotation ribs 524, 588 of the first and second parts 520, 580 provide a positive locating function to make sure that the filter cartridge 550 is properly seated in the filter cartridge housing 510. If the anti-rotation ribs are not properly seated in the recesses 576 of the filter cartridge 550, the extending portions 545 of the latch 544 of the first part 520 will not be able to proper engage (i.e., slide into) the pair of latch receiving slots 598 of the second part 580 to properly secure the face portion 300 to the body portion 200 of the showerhead 100.

Filter Cartridge 550

As can best be seen in FIGS. 6-13, the filter cartridge 550 of the present disclosure is reversible. Accordingly, the cartridge 550 is symmetric about a midplane MP (FIGS. 10 and 11) that cuts horizontally through the center extraction groove 560. Additionally, the cartridge is symmetric about a longitudinal plane LP (FIGS. 10-12) that cuts vertically through the cartridge 550. When positioned in the split filter cartridge housing 510, a longitudinal or central axis CA the cartridge 550 extends along and is generally is concentric with the longitudinal axis LA of the showerhead 100.

The filter cartridge 550 includes a filter shell 552 defining an interior region 555 containing the filter media 578 for filtering out contaminants from water flowing through the cartridge 550. The filter shell 552 is generally in the shape of a cylindrical drum 554 that is defined by a hollow central cylindrical casing 556 extending along and centered about the central axis CA of the filter cartridge 550 and axially spaced apart end walls 553 defining opposite ends of the drum 554. In one exemplary embodiment, the end walls 553 are defined by a pair of end caps 570 are affixed to opposite ends of the casing 556. Specifically, the pair of end caps 570 fit over reduced diameter axial end portions 559 (FIG. 13) of the casing 556. The end walls 553 of the end caps 570 and are planar and orthogonal to the central axis CA of the filter cartridge. As discussed previously, the end walls 553 and thus the end caps 570 define the boss receiving center opening 574. The end walls 553 and the end caps 570 also define the eight pie-shaped orifices 572, which allow ingress and egress of water, that is, the flow of water into or out of the interior region 555 of the filter cartridge 550, depending on the orientation or direction of the cartridge 550 in the split filter cartridge housing 510. The end walls 553 and the end caps 570 also define the radially extending locating, anti-rotation recesses 576, four of which are disposed in each end wall, spaced substantially 90° apart circumferentially and extending radially inwardly from an outer surface 557 of the casing 556, as can best be seen in FIG. 12.

Figure 13:
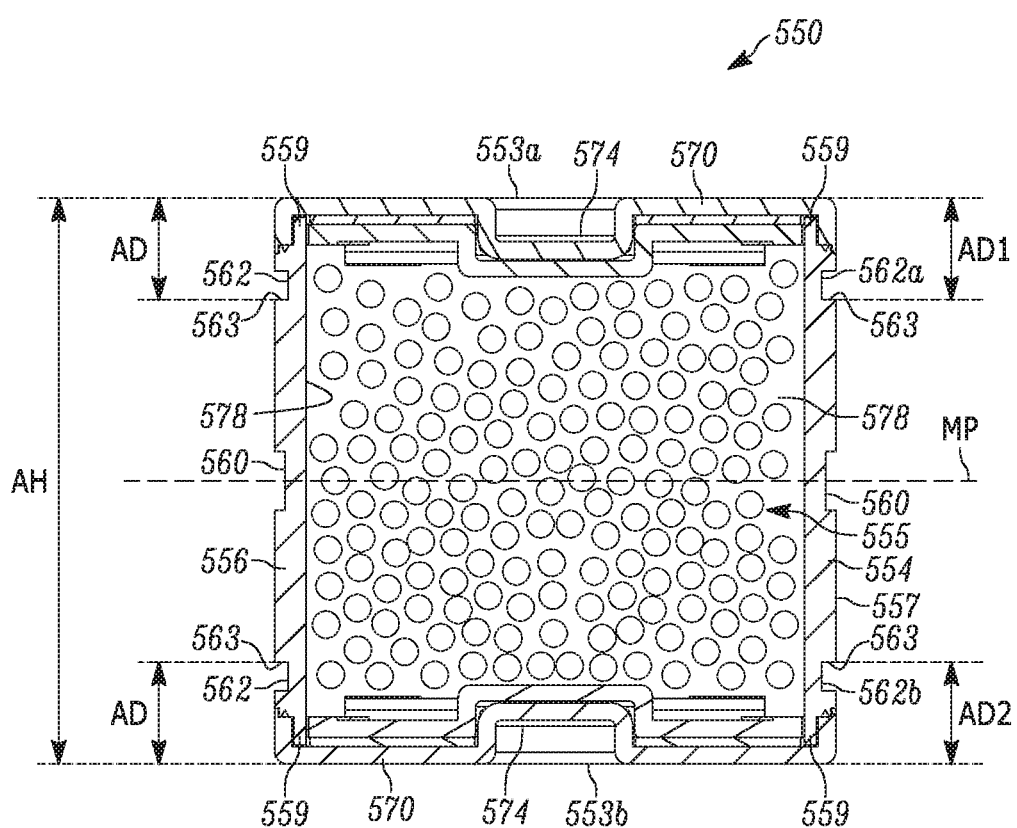
FIG. 13 is a schematic longitudinal section view of the filter cartridge of FIG. 10, as seen from a plane indicated by the line 13-13 in FIG. 12, a pair of o-rings of the filter cartridge being removed.

The casing 556 of the filter cartridge 550 includes an inner surface or wall 558 and the outer surface or wall 557. The outer surface 557 includes a pair of circumferential o-ring grooves 562, which receive respective o-rings 564. The o-ring grooves 562 are annular and extend substantially parallel to the planar end walls 553 and orthogonal to the central axis CA of the filter cartridge 550 and the longitudinal axis LA of the showerhead 100. With reference to FIG. 13, the first circumferential o-ring groove 562a in the outer surface 557 of the casing 556 is axially spaced by AD1 from the first planar end wall 553a and the second circumferential o-ring groove 562b in the outer wall or outer surface 557 of the casing 556 is axially spaced by AD2 from the second planar end wall 553b, the first and second circumferential grooves 562a, 562b being parallel to the first and second planar end walls 553a, 553b.

Respective o-rings 564 are seated in the o-ring grooves 562 formed in the outer surface 557 of the casing 556. As noted previously, so that the filter cartridge 550 is reversible in the split filter cartridge housing 510, the filter cartridge 550 is configured so as to be symmetric with respect to the midplane MP (FIG. 13) which cuts radially or horizontally through a center of the filter cartridge, that is horizontally through the center annular center, annular circumferential extraction groove 560 in the outer surface 557 of the casing 556. That is, an axial height AH of the filter cartridge 550 is bisected by the midplane MP. The o-ring grooves 562 and, thus, the o-rings 564 are both equidistant from their respective end walls 553 and are disposed between their respective end walls 553 and the extraction groove 560.

As can be seen in FIG. 13, an interior side wall 563 of the o-ring grooves 562 are an axial distance AD from their respective end walls 553. In order to provide for proper watertight sealing between the retainer wall 532 of the side wall 530 of the first body part 520 of the filter cartridge housing 510 and the filter cartridge 550, it is necessarily the case that the axial height HRW of the retainer wall 532 (shown in FIGS. 6 and 7, as measured from the end wall 522, must exceed the axial distance AD between the interior side walls 563 of the o-ring grooves 562 and their respective cartridge planar end walls 553. This condition of the axial height HRW of the retainer wall 532 being greater than the axial distance AD between the interior side walls 563 of the o-ring grooves 562 and their respective cartridge planar end walls 553 is clearly satisfied from an inspection of the sectional views of FIGS. 6 and 7. A watertight seal thereby is formed between the retainer wall 532 of the side wall 530 of the first body part 520 of the filter cartridge housing 510 and the upper o-ring 564 of the filter cartridge 550 such that all water flowing through the showerhead engine 102 is forced to flow through the filter cartridge 550 whereby all of the water flow flows through the filter media 578 (depicted in FIGS. 6 and 13) of the filter cartridge 550 for filtration purposes. Water flow W is shown schematically through the filter cartridge 550 in FIGS. 2 and 6. Further, because filter cartridge 550 is symmetric about the midplane MP, the axial distance AD between the interior side walls 563 of the o-ring grooves 562 and their respective cartridge planar end walls 553 is the identical for both of the grooves 562.

Figure 11:
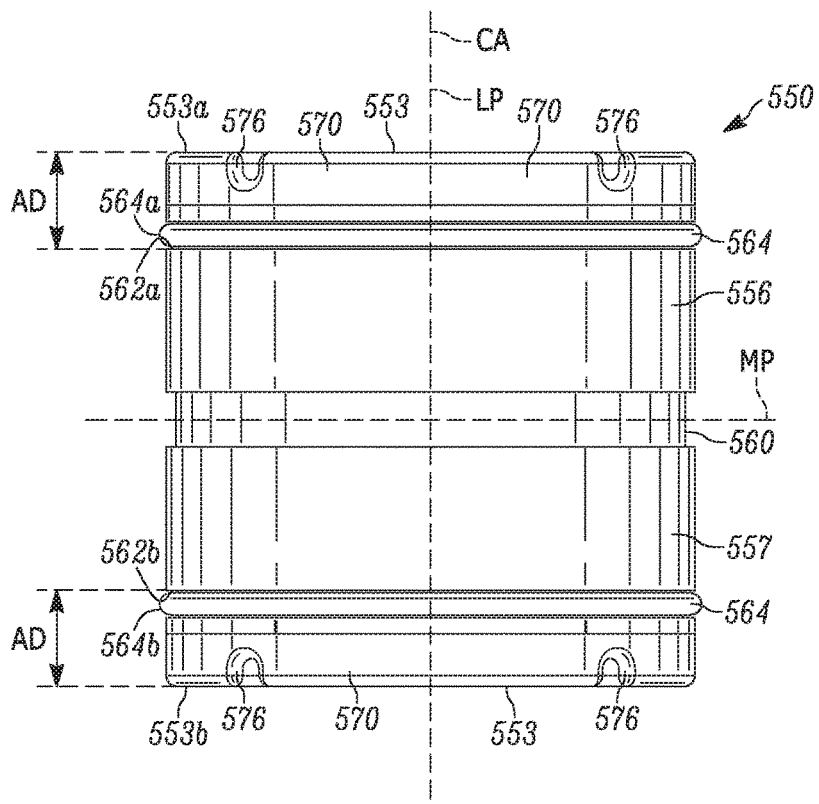
FIG. 11 is a schematic front elevation view of the filter cartridge of FIG. 10.
Figure 12:
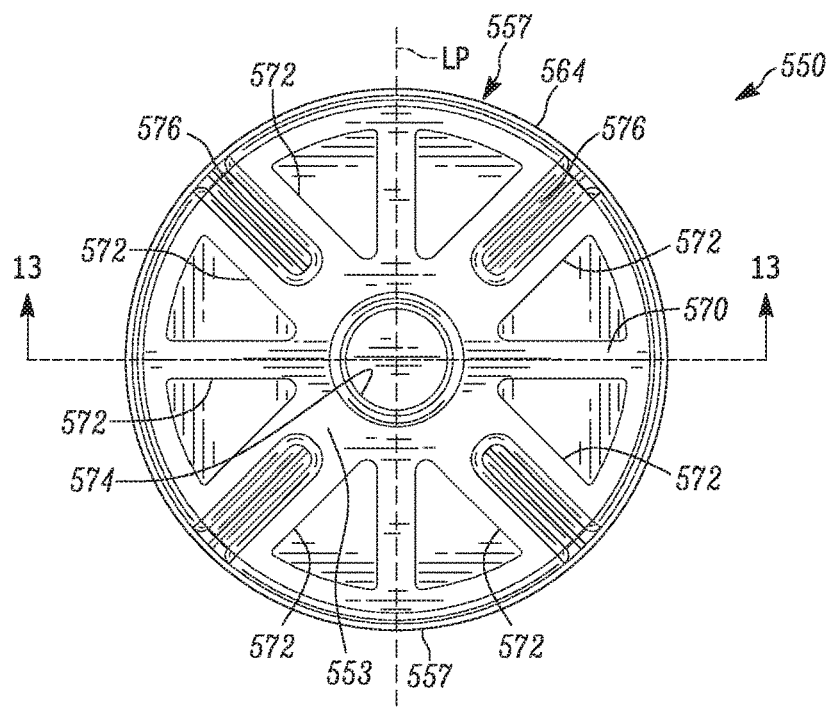
FIG. 12 is a schematic top plan view of the filter cartridge of FIG. 10.

Stated another way, with reference to FIG. 13, the axial height HRW of the retainer wall 532 of the first part 520 of the filter cartridge housing 510 is greater than a maximum axial distance AD between the first circumferential groove 562a and the first planar end wall 553a and the axial height HRW of the retainer wall 532 of the first part 520 of the filter cartridge housing 510 is greater than a maximum axial distance AD between the second circumferential groove 562b and the second planar end wall 553b. With reference to FIG. 11, since the filter cartridge is symmetric about the midplane MP, because the first and second o-rings 564a, 564 are disposed in the first circumferential o-ring groove 562a and the second circumferential o-ring groove 562b, respectively, it is necessarily true that an axial distance between the first o-ring 564a and the first end wall 553a is substantially equal to an axial distance between the second o-ring 564b and the second end wall 553b. Accordingly, the axial height HRW of the retainer wall 532 of the first part 520 of the filter cartridge housing 510 is greater than an axial distance (which can be approximated by AD or AD1) between the first o-ring 564a and the first planar end wall 553a and the axial height HRW of the retainer wall 532 of the first part 520 of the filter cartridge housing 510 is greater than an axial distance (which can be approximated by AD or AD2) between the second o-ring 564b and the second planar end wall 553b.

In one example embodiment, the filter media 578 is a porous material that filters contaminants such as, for example, chlorine and/or other contaminants, by either removing the contaminants from the unfiltered water as the water flows through the filter cartridge or converting the contaminants to another less objectionable/harmful material, for example, an inert material, as the water flows through the filter cartridge. In one exemplary embodiment, the porous material of the filter media 578 may include granulated carbon. In another exemplary embodiment, the porous material of the filter media may include copper and/or zinc alloy particles or other particles/materials, in addition to or in lieu of granulated carbon.

As can best be seen in FIG. 6, when the face portion 300 is affixed to the body portion 200 via the latching arrangement 541, a lower annular surface 349 (FIG. 8) of the exterior shell 210 of the body portion 200 seats against a seal 321 disposed between the intermediate plate 320 and the faceplate 310 for a water resistant seal between the body portion 200 and the face portion 300.

The materials used for the various components of the showerhead 100 may be durable, waterproof plastic and/or rubber materials or materials having similar durability and waterproof characteristics.

Second Exemplary Embodiment—Showerhead Assembly 990

Figure 15:
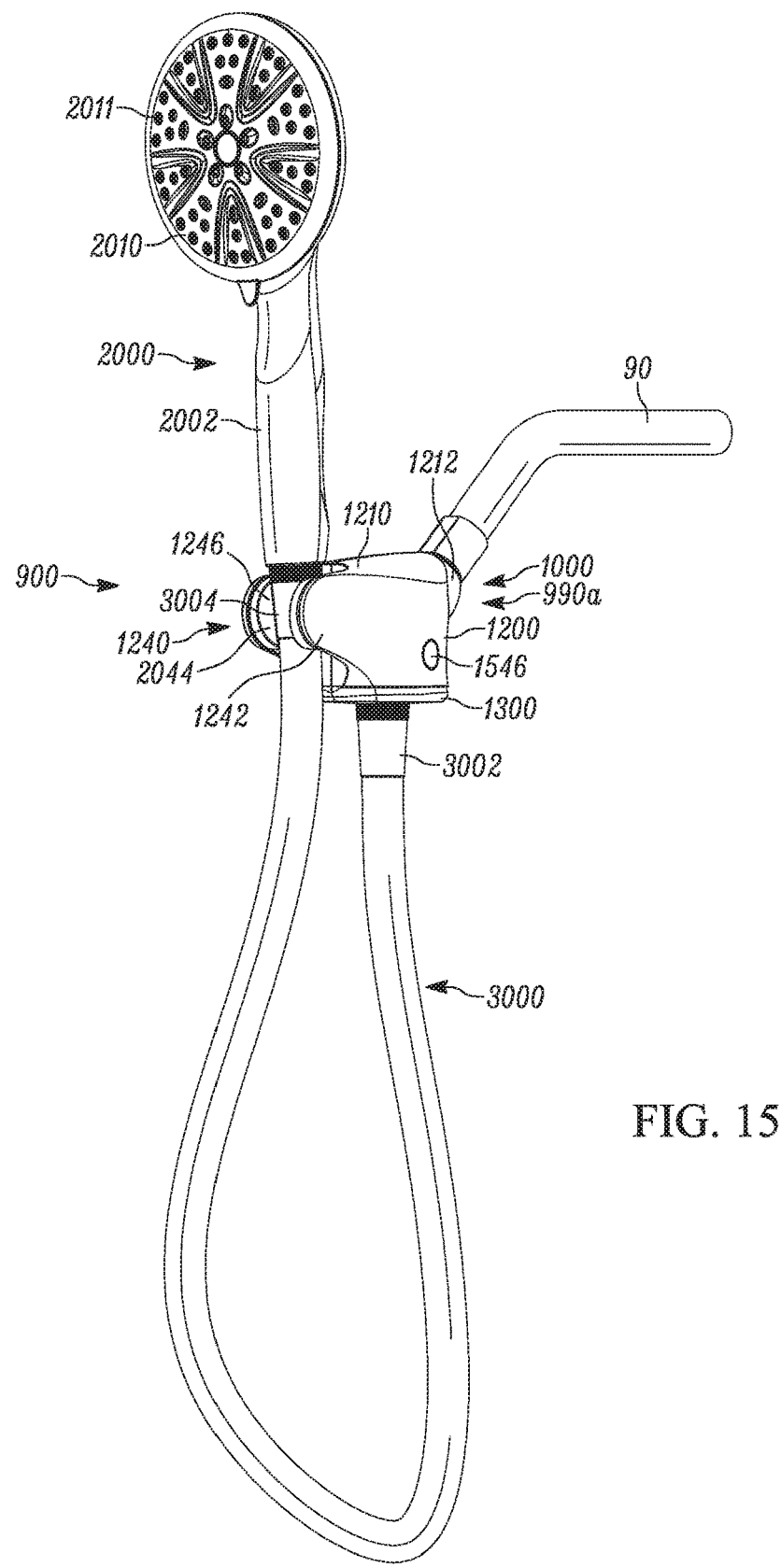
FIG. 15 is a schematic side, front perspective view of an exemplary embodiment of a hand-held showerhead assembly of the present disclosure, including a water-directing and filtering assembly, specifically, a showerhead bracket attached to a water supply line, the showerhead assembly including the showerhead bracket, a hand sprayer, and a flexible hose assembly coupled between the hand sprayer and an exit port of the showerhead bracket.
Figure 16:
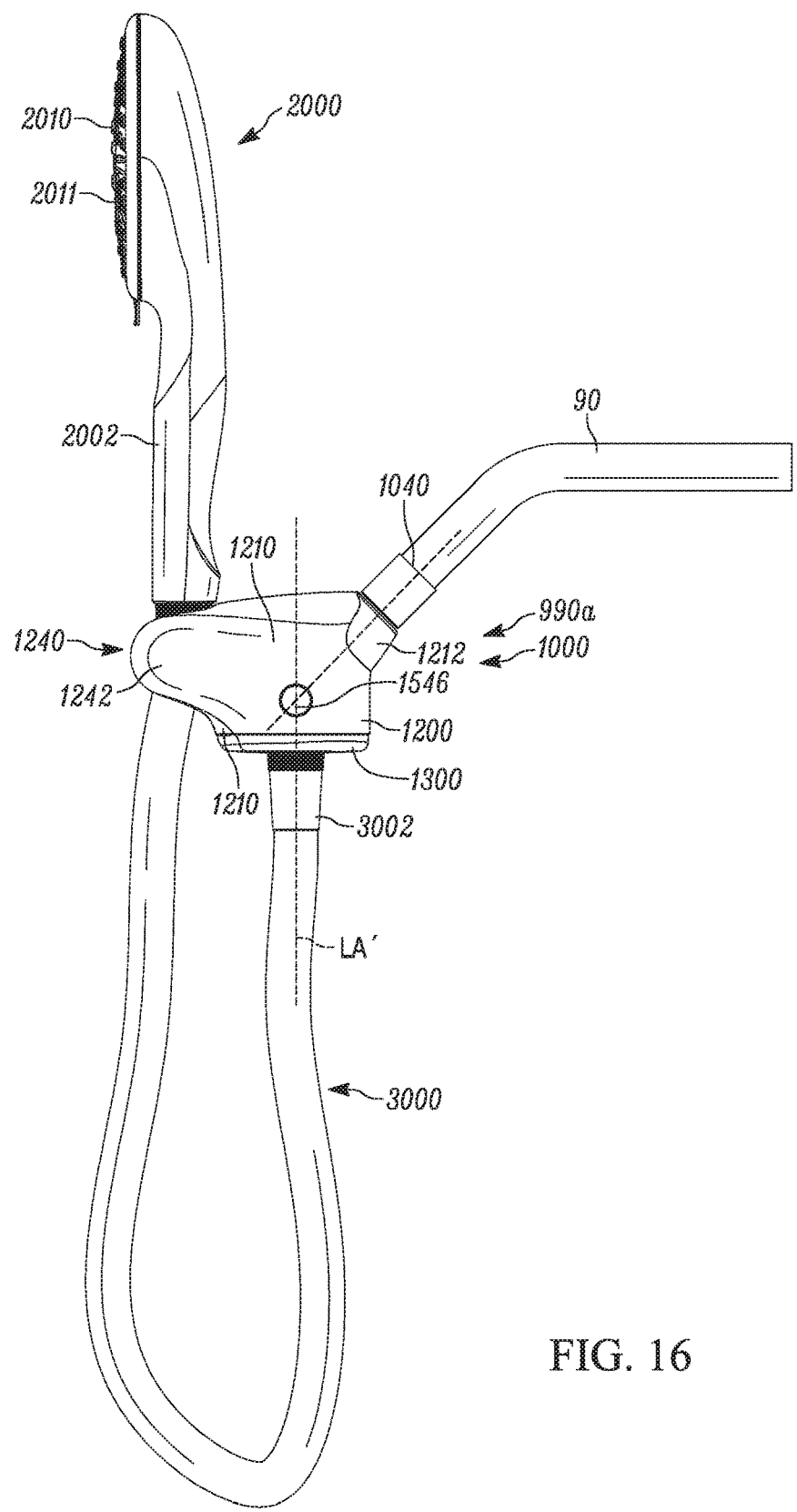
FIG. 16 is a schematic side view of the showerhead assembly of FIG. 15.

As second exemplary embodiment of a showerhead assembly of the present disclosure is shown generally at 990 in FIGS. 15-20. The showerhead assembly 990 comprises a hand-held showerhead assembly, as opposed to the fixed-position showerhead assembly 99 of the first exemplary embodiment. As can best be seen in FIGS. 15 and 16, the hand-held showerhead assembly 990 includes a hand sprayer 2000, a water-directing and filtering assembly 990a, and a flexible hose assembly 3000 routing filtered water exiting the water-directing and filtering assembly 990a to the hand sprayer 2000. The hand sprayer 2000 includes an elongated handle 2002 that is manipulated by the user when taking a shower to direct a spray pattern of filtered water exiting through nozzles of a faceplate 2010 of the hand sprayer 2000, as desired, within a shower or tub enclosure. As can be seen in FIGS. 15 and 16, when not being manipulated by the user, the hand sprayer 2000 is releasably docked to the water-directing and filtering assembly 990a.

As can best be seen in FIGS. 17-20, the water-directing and filtering assembly 990a of the showerhead assembly 990 is generally similar in function and structure to the water-directing and filtering assembly 99a of the showerhead assembly 99 of the first exemplary embodiment, as described above. That is, the water-directing and filtering assembly 990a is attached to the water supply line 90 and both routes and filters water flowing or passing through an interior region 1100 from an entrance end 1040 to an exit end 1060 of the assembly 990a, just as the case with the water-directing and filtering assembly 99a of the first exemplary embodiment. Further, just as the case with the water-directing and filtering assembly 99a of the first embodiment, filtered water exits the water-directing and filtering assembly 990a through at least one water exit opening 1301.

One difference between the two embodiments is that the exit opening 301 of the water-directing and filtering assembly 99a of the first embodiment included a plurality of orifices 312 in the faceplate 310 through which filtered water exited. In the water-directing and filtering assembly 990a of the second embodiment, the filtered water is directed into the passageway or central throughbore of the flexible hose assembly 3000 and then routed by the hose assembly 3000 to the hand sprayer 2000. Thus, the plurality of orifices 312 of the faceplate 310 of the first embodiment is not required with the water-directing and filtering assembly 990a, that is, the showerhead bracket 1000 of the second embodiment. In the showerhead bracket 1000 of the second embodiment, a single filtered water exit opening 1301 defined in a face portion 1300 of the water-directing and filtering assembly 990a is provided to route filtered water from the water-directing and filtering assembly 990a into the throughbore of hose assembly 3000. The hand sprayer 2000 of the showerhead assembly 990 receives the filtered water from the hose assembly 3000 and provides the filtered water spray pattern that impinges on the user of the showerhead assembly 990.

Showerhead Bracket 1000

In the present exemplary embodiment, the water-directing and filtering assembly 990a comprises a showerhead bracket 1000. As can best be seen in FIGS. 18-20, the showerhead bracket 1000, like the showerhead 100, includes a body portion 1200 and a removable face portion 1300, a portion of which is telescopically received in the body portion 1200. The showerhead bracket 1000 further includes a filter cartridge assembly 1500 within an interior region 1100 of the showerhead bracket 1000. The filter cartridge assembly 1500 includes a reversible filter cartridge 1550, similar in structure and function to the filter cartridge assembly 500 and reversible filter cartridge 550 of the showerhead 100 of the first embodiment.

The body portion 1200 and the face portion 1300 are releasably affixed by a latching arrangement 1541, similar to the latching arrangement 541 of the showerhead 100. The latching arrangement 1541 includes a latch release actuator 1546, similar in function and structure to the latch release actuator 546 of the latching arrangement 541 of the showerhead 100. The user presses the latch release actuator 1546 to release the face portion 1300 from the body portion 1200 for purposes of reversing or replacing a filter cartridge 1550 of the filter cartridge assembly 1500.

For brevity, the structural details/functions/advantages of the body portion 1200, the face portion 1300, and the latching arrangement 1541 are not repeated in detail, those structural details/functions/advantages being generally the same as the structural details/functions/advantages discussed above with respect to the showerhead 100 and hereby incorporated by reference.

Filter Cartridge Assembly 1500

The filter cartridge assembly 1500 of the showerhead bracket 1000 is disposed along a longitudinal axis LA' of the showerhead bracket 1000, just as the filter cartridge assembly 500 of the showerhead 100 is disposed along the longitudinal axis LA of the showerhead 100, in the first embodiment. The reversible filter cartridge 1550 is removably disposed within an interior region 1515 defined by a two-part or split filter cartridge housing 1510, similar to the split filter cartridge housing 510 of the first embodiment showerhead 100. A first body part 1520 of the split filter cartridge housing 1510 stays with the body portion 100 upon disassembly of the face portion 1300 from the body portion 1200, while a second face part 1580 of the split filter cartridge housing 1510 is affixed to and removed with face portion 1300 upon disassembly of the face portion 1300 from the body portion 1200 of the showerhead bracket 1000.

As was the case with the showerhead 100 of the first embodiment, a pair of extraction fingers 1594 of the face portion 1300 extend into and engage a circumferential extraction groove 1560 of the filter cartridge 1550. Thus, when the user presses the latch release actuator 1546, the face portion 1300 falls downwardly and away from the body portion 1200 of the showerhead bracket 1000. When this occurs, the filter cartridge 1550 is removed with the face portion 1300, that is, the filter cartridge 1550 remains seated or nested in the second part 1580 of the filter cartridge housing 1510 upon removal of the face portion 1300 from the body portion 1200, as explained in detail above and as shown with respect to the first embodiment in FIG. 14.

For axial compactness, the filter cartridge 1550 is sized and configured to fit within an interior region 1515 defined by the split filter housing 1510. The filter cartridge 1550 is disposed within an interior region of the outer or exterior shell 1210 of the body portion and is disposed within an interior region 1224 of an inner frame 1220 of the body portion 1200. Moreover, an upper portion 1590a of a side wall 1590 of the second face part 1580 of the split filter cartridge housing 1510 has an outer diameter that is sized to be telescopically received in an inner diameter of an enlarged diameter upper wall 1540 of a side wall 1530 of the first body part 1520 of the split filter cartridge housing 510. This telescopic coupling of the side walls 1530, 1590 of the first and second parts 1520, 1580 serves to reduce the overall axial length AL of the showerhead bracket 1000.

Body Portion 1200

Figure 18:
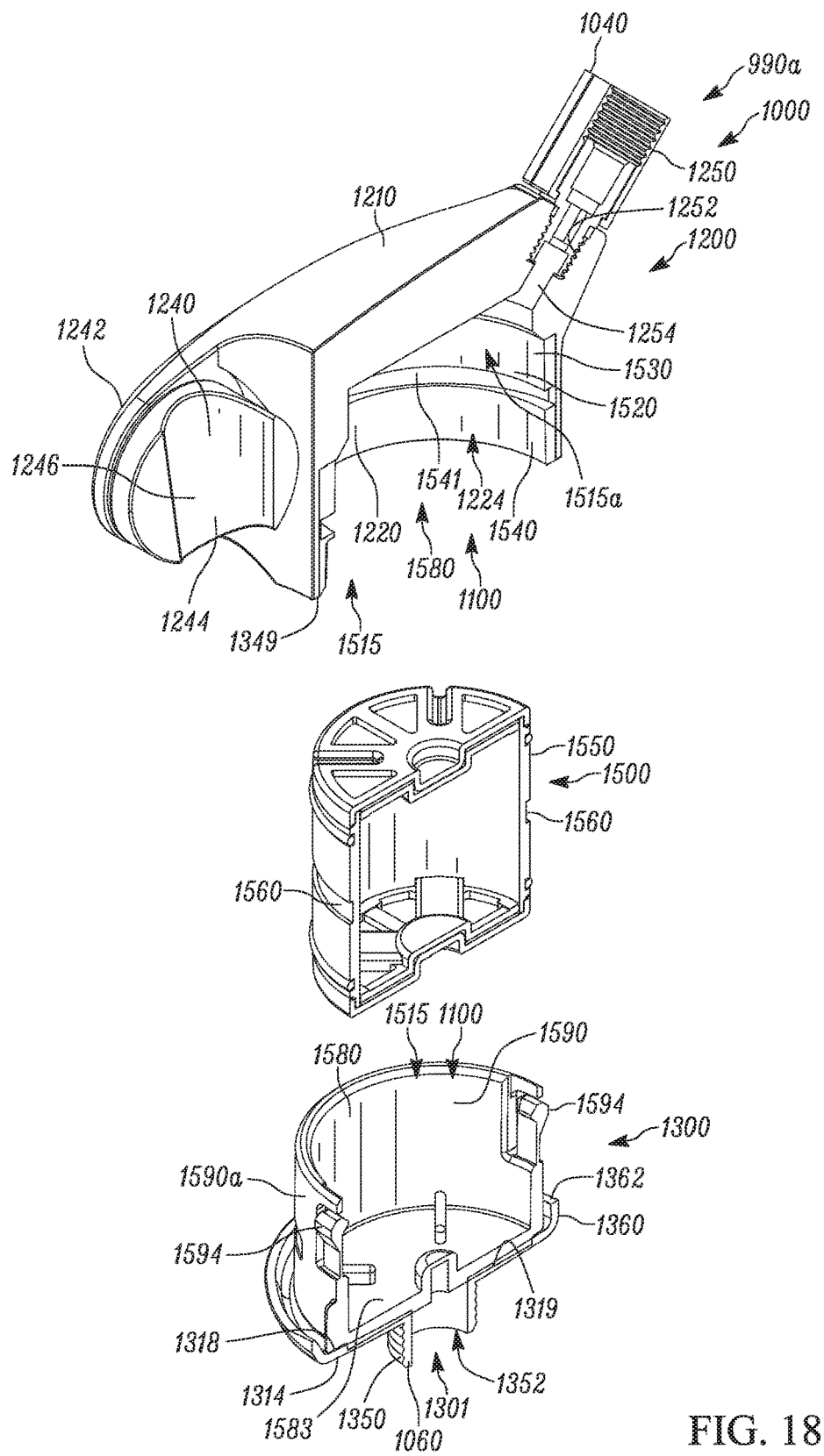
FIG. 18 is a schematic top, side exploded perspective view of a longitudinal section the showerhead bracket of FIG. 17, with a filter media of a filter cartridge of the filter cartridge assembly removed.
Figure 19:
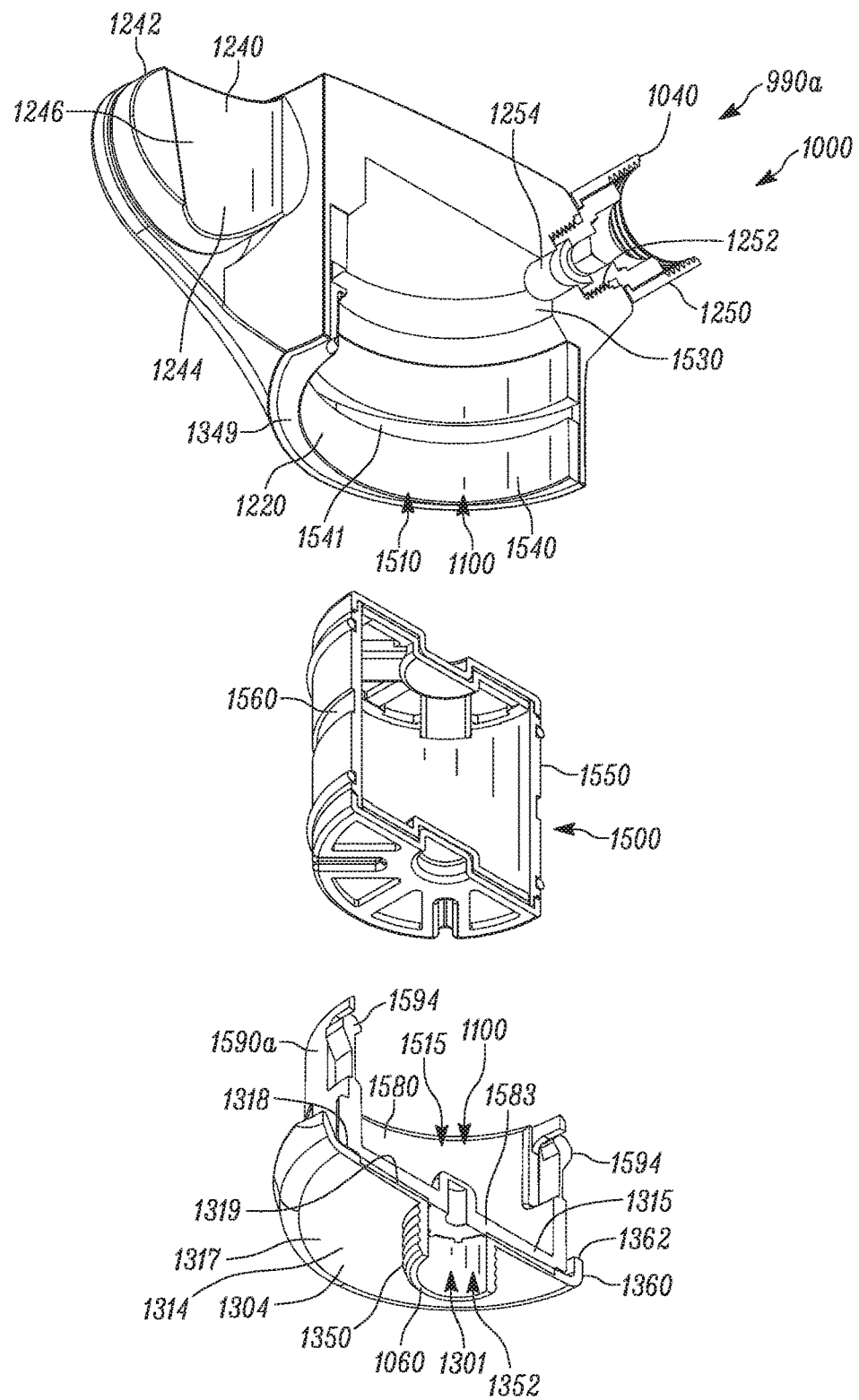
FIG. 19 is a schematic bottom, side exploded perspective view of a longitudinal section the showerhead bracket of FIG. 17, with a filter media of the filter cartridge assembly removed.
Figure 20:
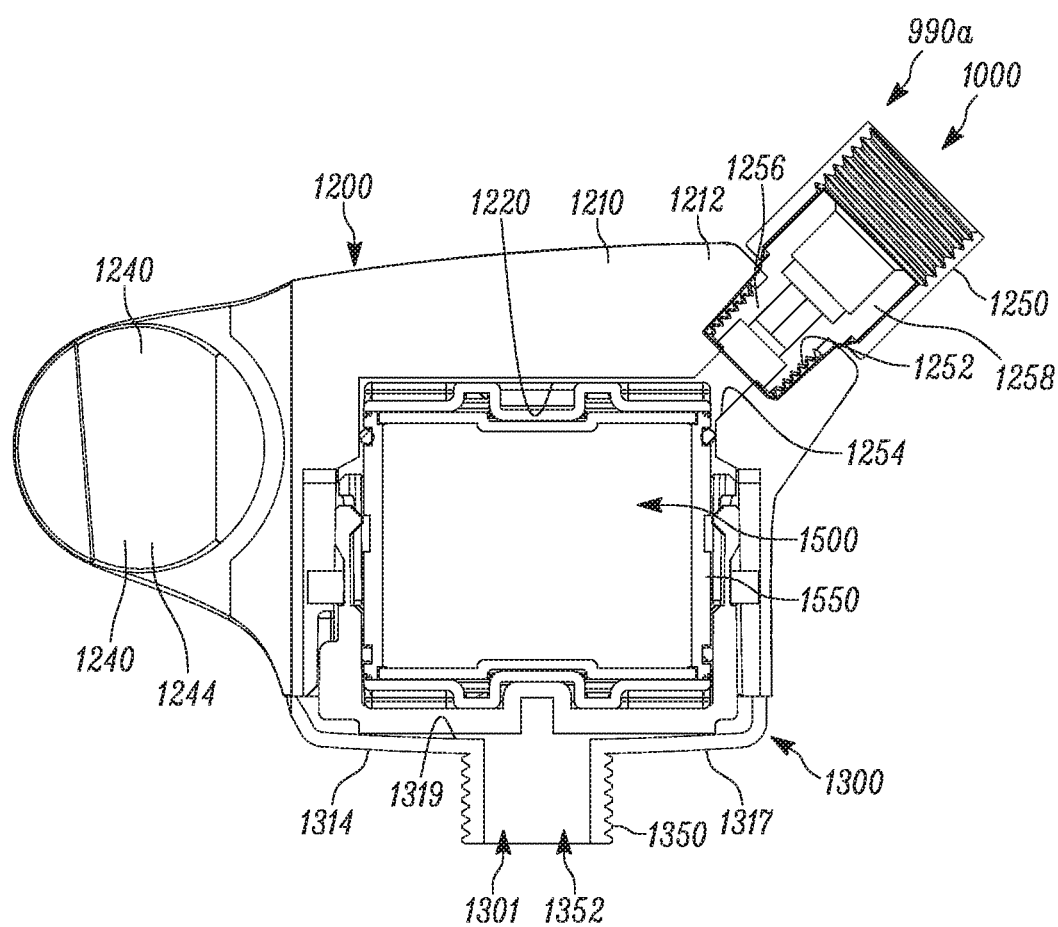
FIG. 20 is a schematic longitudinal sectional view of the showerhead bracket of FIG. 17, with a filter media of the filter cartridge assembly removed

As is best seen in FIGS. 18-20, the body portion 1200 of the showerhead bracket 1000 comprises an exterior shell 1210 that generally extends along the longitudinal axis LA' of the showerhead bracket 1000. The body portion 1200 also includes the inner frame 1220, disposed within the exterior shell 1210. The inner frame 1220 defines the interior region 1224. The interior region 1224, in turn, defines an upper region 1515a of an interior region 1515 of the filter cartridge housing 1510.

The exterior shell 1210 of the body portion 1200 of the showerhead bracket 1200 has a slightly different configuration as compared to the body portion 200 of the showerhead 100. Specifically, as there is no need to adjust the angle of the showerhead bracket 1200 with respect to the water supply line 90 because the hand sprayer 2000 is manipulated by the user to directed filtered water as desired. Accordingly, there is no swivel connector at the upper end portion 1212 of the exterior shell 1210 of the body portion 1200. Instead, as can best be seen in FIG. 17, an upper end portion 1212 of the body portion 1200, including the exterior shell 1210, is angled at an acute angle α with respect the longitudinal axis LA' of the showerhead bracket 1000 and defines a threaded opening or port 1252. The threaded port 1252 at the upper end portion 1212 of the body portion 1200 receives a fitting adapter 1256 (FIG. 20) which threads into the threaded port 1252. The fitting adapter 1256 includes an upper body portion 1258. A fitting 1250, is rotatably affixed to the upper body portion 1258 of the fitting adapter 1256.

The fitting 1250, in turn, is threaded onto the threaded end of the water supply line 90 to operatively couple the showerhead assembly 990 to the water supply pipe 90. A water passageway 1254 is provided in the upper end portion 1212 of the body portion 1200 to route unfiltered water passing through the fitting 1250 from the water supply line 90 to the upper region 1515a of an interior region 1515 of the filter cartridge housing 1510. The water then enters and passes through the filter cartridge 1550 for filtration purposes, as described above.

The fitting 1250 routes water from the supply line 90 through the port 1252 and into an interior region 1224 defined by an inner frame 1220 of the body portion 1200 of the showerhead bracket 1000. The unfiltered water is directed through the filter cartridge 1550 disposed within the filter cartridge housing 1510 defined by the first body part 1520 of the body portion 1200 and the second face part 1580 of the face portion 1300 of the showerhead bracket 1000, as described above with respect to the showerhead 100 and the filter cartridge housing 510.

Another difference between the exterior shell 210 of the body portion 200 of the showerhead 100 of the first embodiment and the exterior shell 1210 of the body portion 1200 of the showerhead bracket 1100 is that the exterior shell 1200 provides a releasable docking station 1240 for the hand sprayer 2000 when not being held and manipulated by the user. In that respect, the docking station 1240 provides a stationary or fixed-position for the hand sprayer 2000 such that the sprayer 2000 emits a spray pattern of filtered water in the direction of the user and essentially functions as a fixed-position showerhead when docked in the docking station 1240. The docking station 1240 is defined as a generally C-shaped opening 1244 formed in a side projection 1242 of the exterior shell 1210 of the body portion 1200 of the showerhead bracket 1200. As can best be seen in FIGS. 15 and 16, the C-shaped opening is sized to releasably receive a hose coupling 3004 of the flexible hose assembly 3000 adjacent the hand sprayer 2000 thereby holding the elongated handle 2002 of the hand sprayer 2000 in a generally vertical position. The hose coupling 2004 is firmly held by a snap-action frictional engagement of a circumferential portion 1246 of the side projection 1242 defining the C-shaped opening and the proximal portion 2004 of the sprayer handle 2002. As can best be seen in FIG. 16, when docked, the handle 2002 is oriented in a vertical position such that a longitudinal axis through the sprayer 2000 would be substantially parallel to the longitudinal axis LA' of the showerhead bracket.

Face Portion 1300

Unlike the showerhead 100 of the first embodiment, the face portion 1000 of the showerhead bracket 1000 does not include a plurality of spray nozzles since the hand sprayer 2000 provides the spray pattern of filtered water for showering purposes. Instead, the face portion 1300 includes a backing plate 1314, which supports the second face part 1580 of the filter cartridge housing 1510. Specifically, an upper surface 1315 of the backing plate 1314 includes an axially extending peripheral shoulder 1318 (FIGS. 18 and 19) that provides a seating surface for an end wall 1583 of the second face part 1580 of the filter cartridge housing 1510.

Figure 17:
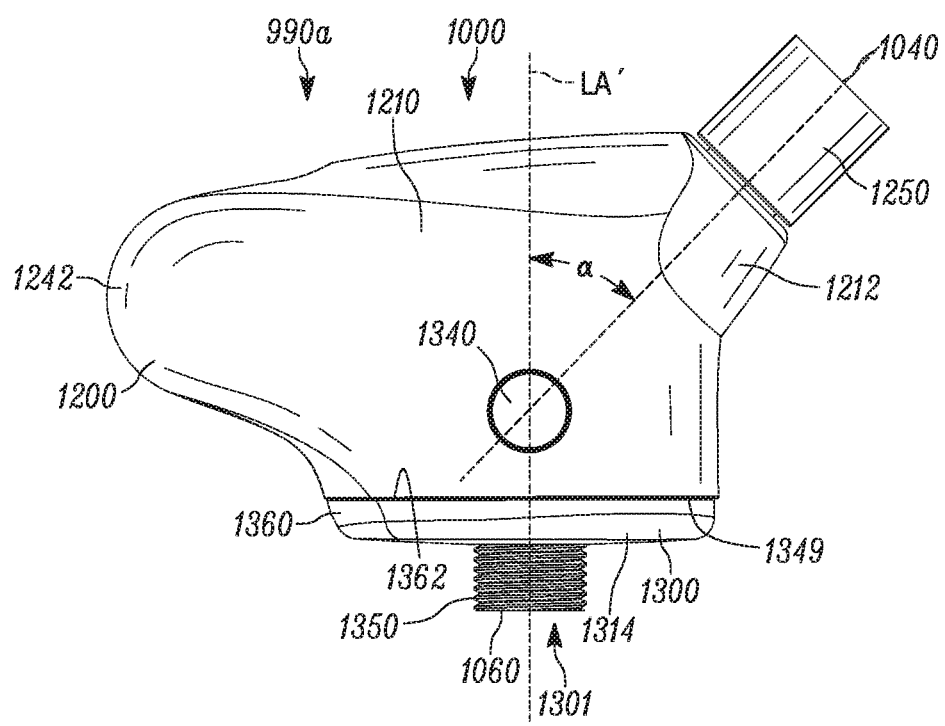
FIG. 17 is a schematic side view of the showerhead bracket of the showerhead assembly of FIG. 15.

As can best be seen in FIG. 17, a threaded water exit port 1350 extends from a bottom surface 1317 of the backing plate 1314 of the face portion 1300. The port 1350 defines a water passageway 1352 axially through the backing plate 1314. Thus, face portion 1300 includes at least one water exit opening 1301 allowing filtered water to exit the showerhead bracket 1000 and pass into the hose assembly 3000. A coupling 3002 at one end of the flexible hose assembly 3000 threads onto the water exit port 1350 of the face portion 1300 to route filtered water from the water passageway 1352 of the port 1350 into a throughbore of the flexible hose 3006 of the hose assembly 3000. As can be seen in FIGS. 18 and 19, a gap exists between a central portion 1319 of the upper surface 1315 of the backing plate 1314 and the end wall 1583 of the second face part 1580 of the filter cartridge housing 1510 to permit or route the flow of filtered water from exiting the filter cartridge 1550, through an exit opening (not shown, but similar to water orifice 586 of the first embodiment) in the end wall 1583 of the second face part 1580, then through the water exit port 1350 of the backing plate 1314 and into the hose assembly 3000.

The backing plate 1314 includes an upturned annular rim 1360. When the face portion 1300 is affixed to the body portion 1200 via the latching arrangement 1541, an upper surface 1362 of the rim 1360 seats against a mating lower annular surface 1349 of the exterior shell 1210 of the body portion 1200 for a clean, continuous exterior appearance.

Advantageously, in the hand-held showerhead assembly 990 of the present embodiment 990, the filter cartridge assembly 1500 is disposed in the showerhead bracket 1000 instead of, for example, being disposed in the hand sprayer 2000. Locating the filter cartridge assembly 1500 in the showerhead bracket 1000, which is directly affixed to the water supply line 90, provides a number of significant advantages including: 1) Multiple hand sprayers may be interchangeably used with the showerhead assembly without any need to have multiple filter cartridges. 2) If the filter cartridge assembly 1500 were disposed in the hand sprayer, the size of the hand sprayer would have to be markedly increased to accommodate the filter cartridge assembly. Small hand sprayer size is a desirable given the size of user's hands and the limited space in most shower enclosures. 3) Replacing the filter cartridge 1550 involves a simple downward pull on the face portion 1300 or the hose assembly 3000 as the user pushes the latch release actuator 1546 to separate the face portion 1300 from the body portion 1300. Since the body portion 1200 of the showerhead bracket 1000 is directly threaded onto the water supply line 90, it is rigidly held fast in position by the water supply as the face portion 1300 is pulled downwardly. Thus, the user does not have to worry about holding the body portion 1200 while pulling downwardly on the face portion 1300 since the body portion is solidly fixed in position. This rigid attachment structure of the body portion 1200 to the water supply line 90 facilitates easy disassembly of the face and body portions 1300, 1200 for cartridge reversal or replacement of the cartridge. Of course, the same advantage is equally true for the showerhead 100 of the first embodiment wherein the body portion 200 is also affixed/threaded to the water supply line 90.

The materials used for the various components of the showerhead bracket 1000 may be durable, waterproof plastic and/or rubber materials or materials having similar durability and waterproof characteristics.

Third Exemplary Embodiment—Showerhead Assembly 3990

Figure 21:
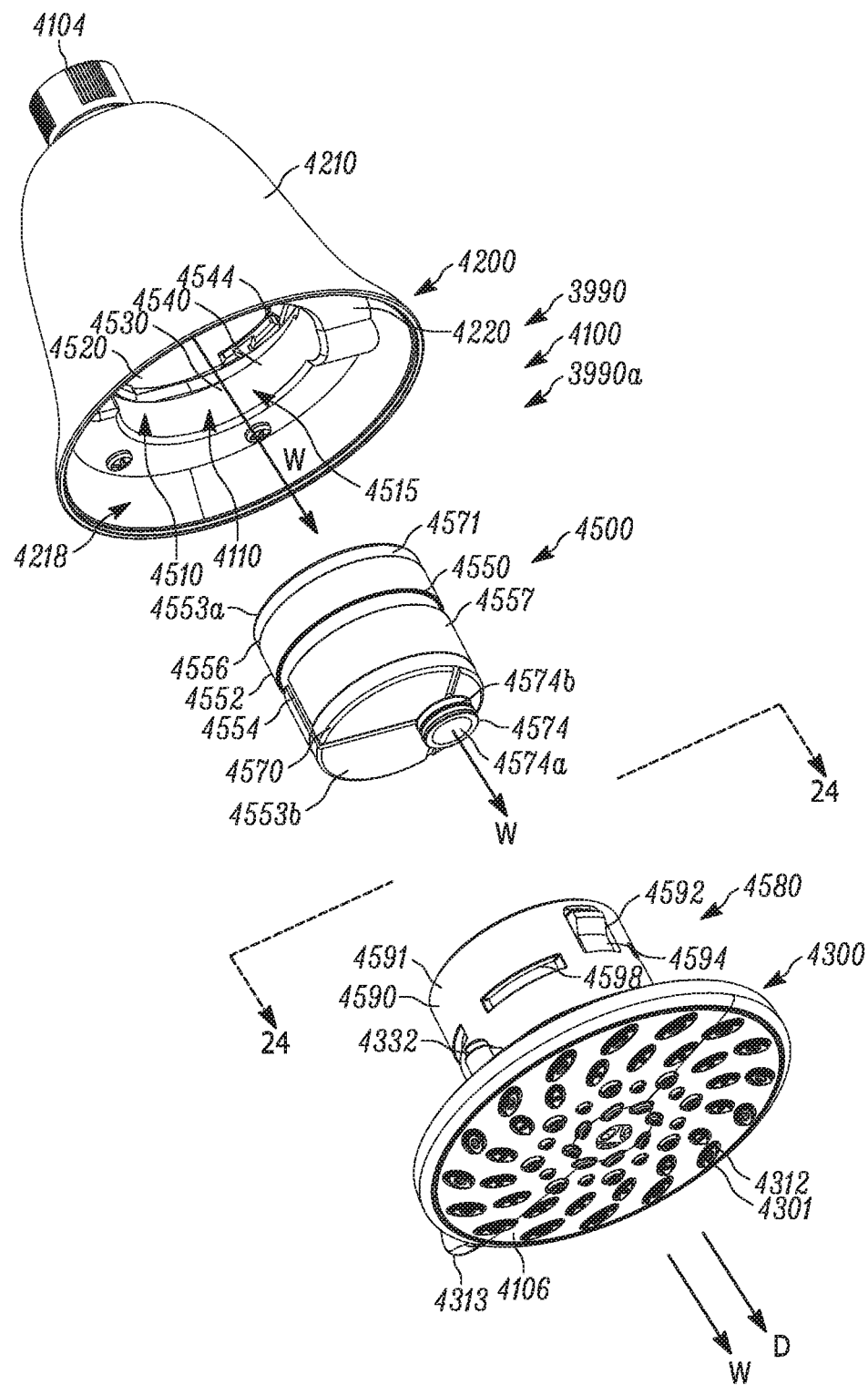
FIG. 21 is a schematic exploded bottom, side perspective view of an exemplary embodiment of a fixed position showerhead assembly of the present disclosure, including a water-directing and filtering assembly, including a filter cartridge assembly with a non-reversible filter cartridge.
Figure 22:
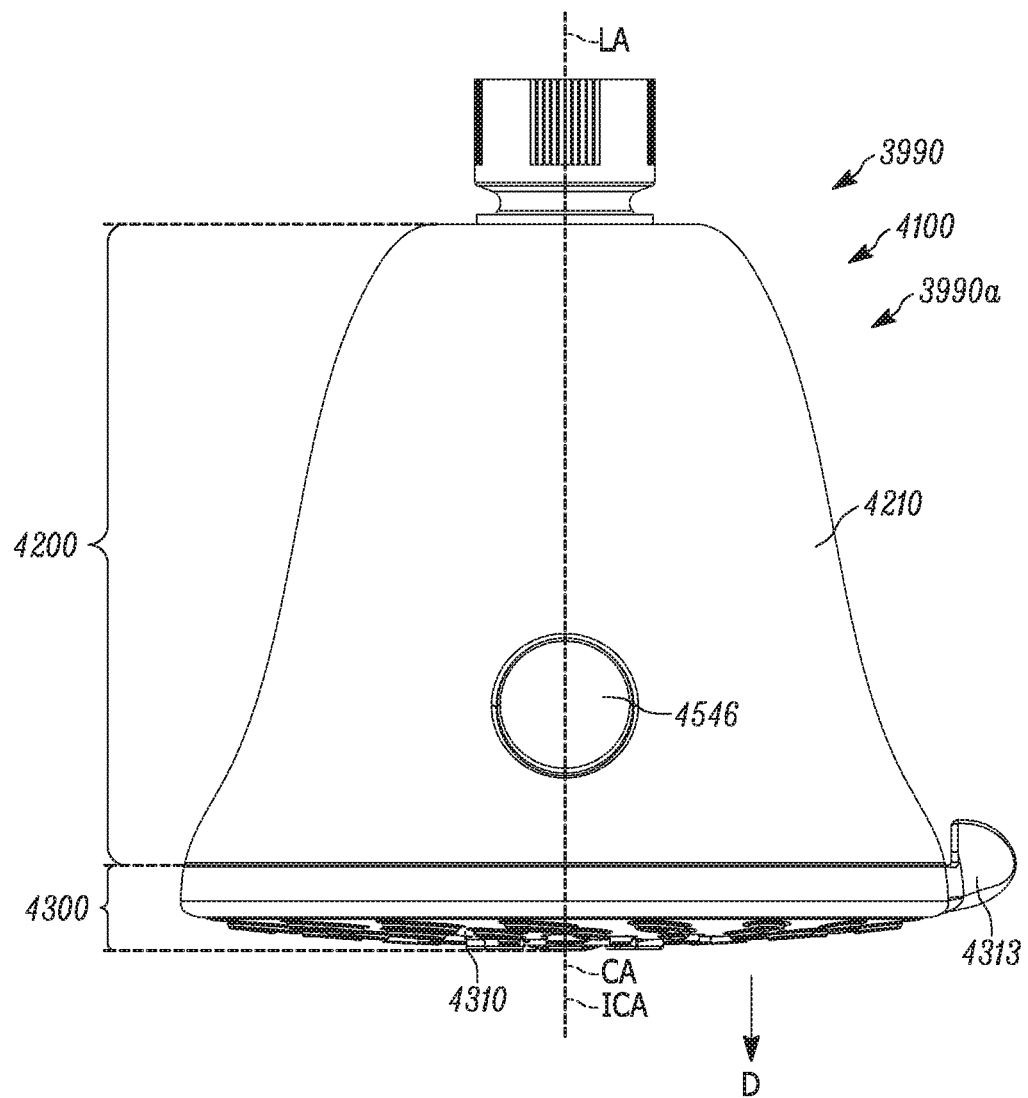
FIG. 22 is a schematic front elevation view of the showerhead of FIG. 21.

A third exemplary embodiment of a showerhead assembly of the present disclosure is shown generally at 3990 in FIGS. 21-34. The showerhead assembly 3990 includes a water-directing and filtering assembly 3990a, which extends along a longitudinal or central axis LA (FIGS. 22-23 and 25-26). The water-directing and filtering assembly 3990a both directs or routes the flow of water emanating from a water supply line (similar to the water supply line 90 of the first exemplary embodiment of the showerhead assembly 99) and further includes a filter cartridge assembly 4500 for filtration of the water from the supply line prior to the water being sprayed upon the user during a shower. Filtered water exits the water-directing and filtering assembly 3990a in a spray pattern in a generally distal or downward direction D (FIGS. 21 and 22) with respect to the central or longitudinal axis LA of the showerhead assembly 3990.

The showerhead assembly 3990 comprises a fixed-position showerhead 4100, which constitutes the water-directing and filtering assembly 3990a, constructed in accordance with one example embodiment of the present disclosure. As with the showerhead assembly 99 of the first exemplary embodiment, the showerhead assembly 3990 includes the fixed position showerhead 4100, which is similar to the fixed position showerhead 100 of the first embodiment, and the water-directing and filtering assembly 3990a, which is generally similar to the water-directing and filtering assembly 99a of the first embodiment. As with the showerhead assembly 99 of the first embodiment, the water-directing and filtering assembly 3990a of the showerhead assembly 3990 includes a two-part filter cartridge housing 4510 including a first body part 4520 disposed in a body 4200 of the showerhead 4100 and a second face part 4580 supported by a face portion 4300 of the showerhead 4100 releasable attached by a latching assembly 4541, similar to the first body part 520, the second face part 580, and the latching assembly 541, respectively, of the filter cartridge housing 510 of the showerhead assembly 99 of the first exemplary embodiment.

Various components and assemblies of the showerhead assembly 3990 of the third exemplary embodiment are similar in structure and/or function to corresponding components and assemblies of the showerhead assembly 99, as previously described. In the interest of brevity, components and assemblies of the showerhead assembly 3990 that are similar to the corresponding components and assemblies of the showerhead assembly 99 of the first exemplary embodiment in structure and/or function will not be fully described herein. Instead, reference is made to the description of such components and assemblies set forth above in connection with the showerhead assembly 99, as set forth above. Materials/fabrication of components and assemblies of the showerhead assembly 3990 are similar to materials/fabrication of corresponding components and assemblies of the showerhead assembly 99, as described above. Such descriptions of components and assemblies of the showerhead assembly 99 of the first exemplary embodiment are hereby incorporated by reference in the following description of the showerhead assembly 3990 of the third exemplary embodiment. Identification of axes, lines, planes and directions for the showerhead assembly 3990, as set forth herein, will be the same as used for the description of the showerhead assembly 99 of the first exemplary embodiment.

Overview

In contrast to the water-directed and filtering assembly 99a of the showerhead assembly 99 of the first exemplary embodiment, the water-directing and filtering assembly 3990a of the showerhead assembly 3990 of the third exemplary embodiment includes a single direction or non-reversible filter cartridge 4450 (best seen in FIGS. 21, 26 and 27-34. Such a filter cartridge 4550 advantageously provides for improved filtering and/or conversion of contaminants due, at least in part, to a longer flow path for water W flowing through filter media 4578 (shown schematically in FIG. 25, not shown in the other Figures for clarity purposes, but understood to be present in the filter cartridge 4578 even if not depicted in the drawing Figures) resulting from a water-directing baffle member 4600 disposed in an interior region 4555 of the filter cartridge 4550. The filter cartridge 4550 comprises a filter shell 4552 defining the filter cartridge interior region 4555. In one exemplary embodiment, as can best be seen in FIGS. 29-34, the filter shell 4552 comprises a cylindrical drum 4554 including a cylindrical central casing 4556 and generally planar end first and second end walls 4553a, 4553b defining opposite ends of the cylindrical drum 4554. The filter cartridge 4550 is generally cylindrical and is centered about and extends along a longitudinal or central axis CA. In one exemplary embodiment, the first end wall 4553a is defined by a first end cap 4570 and the second end wall 4553b is defined by a second end cap 4571 disposed at opposite ends of the casing 4556 and defining opposite ends of the cylindrical drum 4554.

The water-directing baffle member 4600 is disposed in the interior region 4555 of the filter cartridge 4550. The water-directing baffle member 4600 causes water W directed through the filter cartridge 4550 to have a more circuitous and lengthy flow path through the filter media 4578. In the filter cartridge 4550 of the water-directing and filtering assembly 3990a of the showerhead assembly 3990 of the third exemplary embodiment, unfiltered water is routed through a first or water inlet port 4572a defined by a first or inlet connector 4572 of the filter cartridge 4550 and into the filter cartridge interior region 4555. In the interior region 4555, the water W passes or flows through the filter media 4578 encased in the interior region 4555, as directed by the internal water-directing baffle member 4600 and as shown schematically in FIG. 26, whereupon the water is filtered or purified. The filtered water then exits the filter cartridge 4550 through a second or water outlet port 4574a defined by a second or outlet connector 4574 of the filter cartridge 4550.

Figure 30:
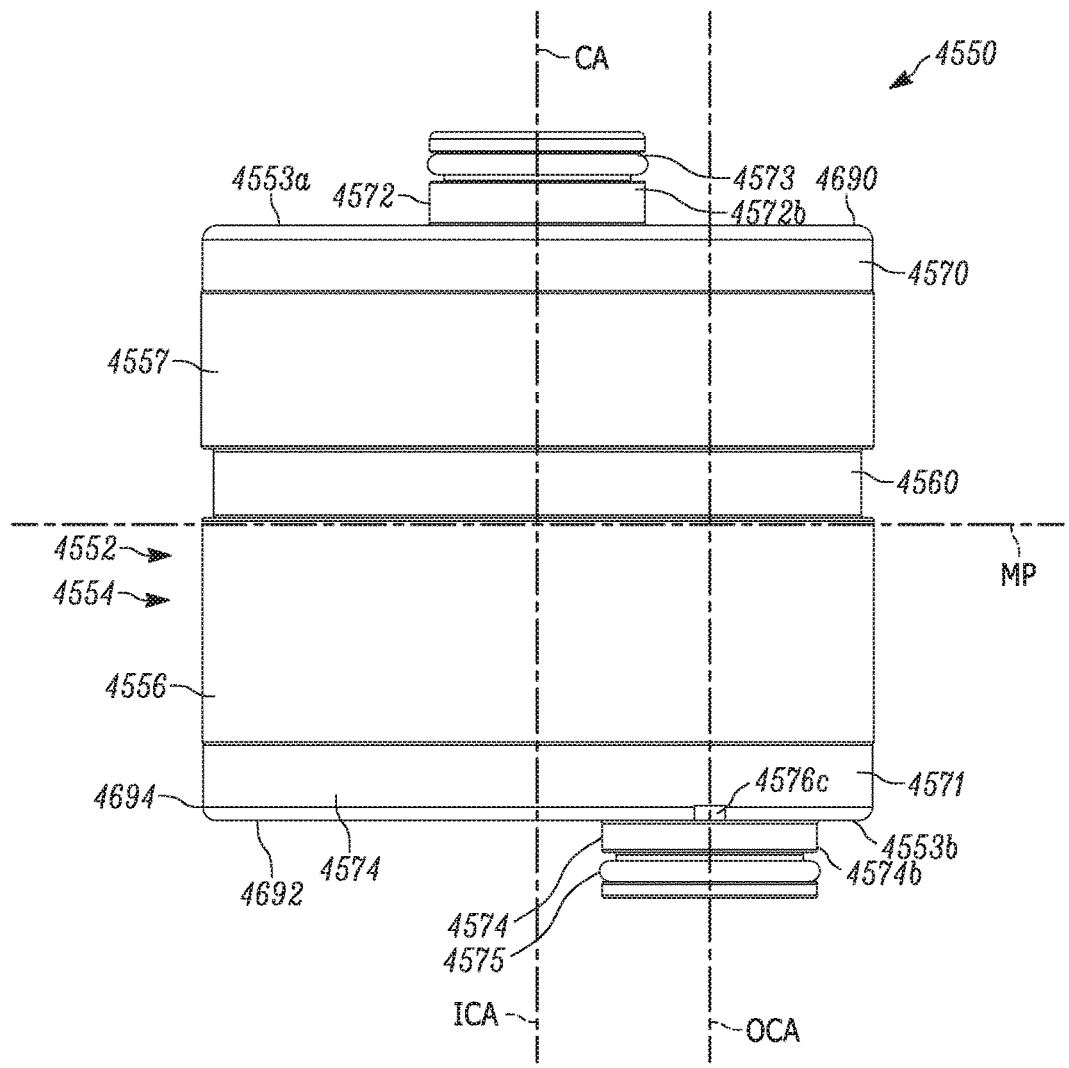
FIG. 30 is a schematic front elevation view of the filter cartridge of FIG. 29.
Figure 32:
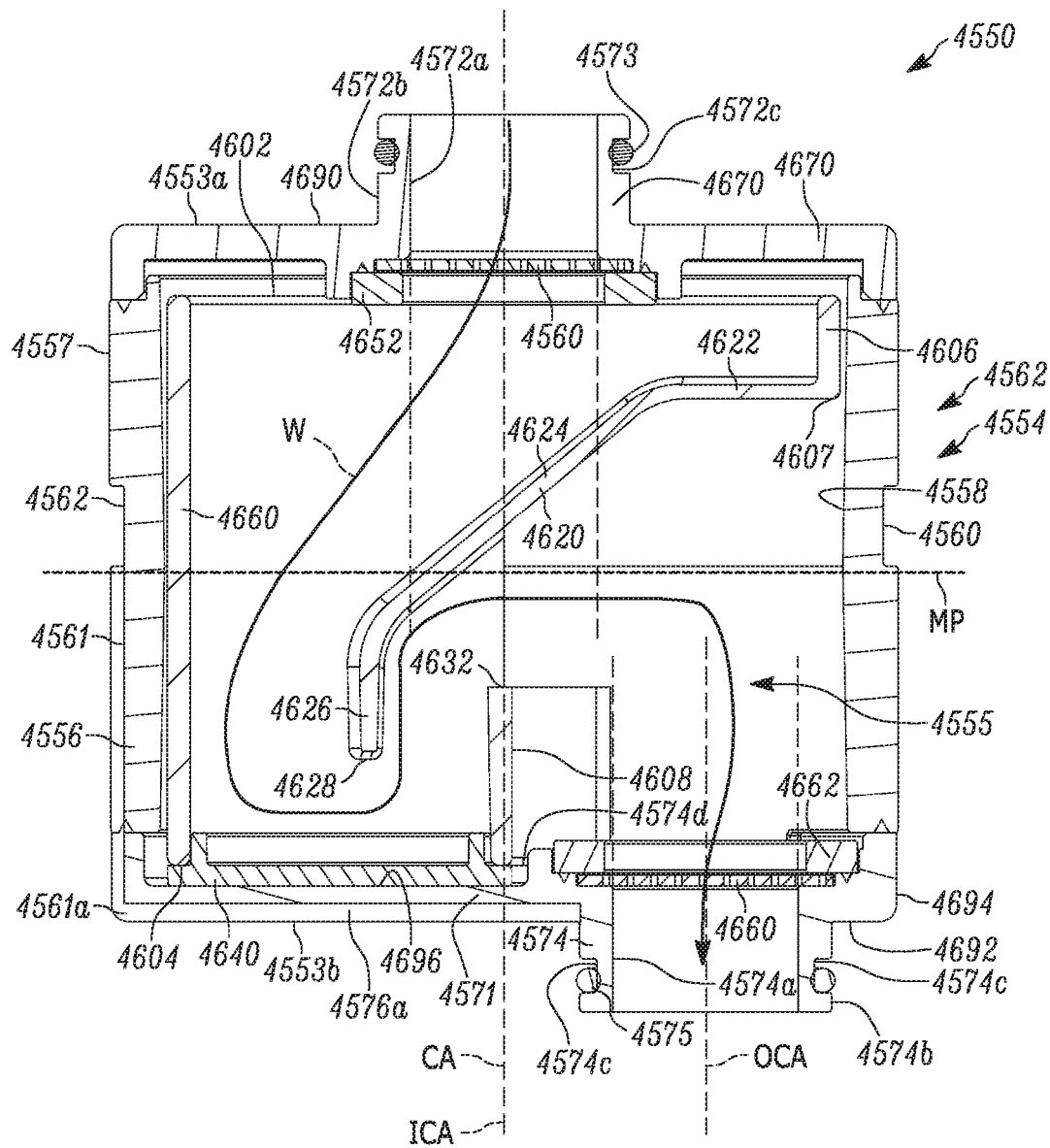
FIG. 32 is a schematic longitudinal section view of the filter cartridge of FIG. 29, as seen from a plane indicated by the line 32-32 in FIG. 12.

The first inlet connector 4572 is formed in the first end cap 4570 and extends axially through the first end wall 4553a. The first inlet connector 4572 is cylindrical and is centered about an inlet connector central axis ICA. In one exemplary embodiment, as best seen in FIGS. 30 and 32, the first inlet connector 4572 is substantially parallel to and coincident or collinear with the longitudinal central axis CA of the filter cartridge 4550. Stated another way, the axially extending inlet port 4572a of the first inlet connector 4572 is centered about the central axis ICA of the first inlet connector 4572. Thus, the inlet port 4572a of the first inlet connector 4572 is centered about the longitudinal central axis CA of the filter cartridge 4550.

The second outlet connector 4574 is formed in the second end cap 4571 and extends axially through the second end wall 4553b. The second outlet connector 4574 is cylindrical and is centered about an outlet connector central axis OCA. In one exemplary embodiment, as best seen in FIGS. 30 and 32, the second outlet connector 4574 is substantially parallel to and is radially offset from the longitudinal central axis CA of the filter cartridge 4550 and is substantially parallel to and is radially offset from the inlet connector central axis ICA (since the longitudinal central axis CA of the filter cartridge 4550 and the longitudinal central axis ICA of the first inlet connector 4572 are coincident or collinear). Stated another way, the axially extending outlet port 4574a of the second outlet connector 4574 is centered about the central axis OCA of the second outlet connector 4574. The outlet port 4574a of the second outlet connector 4574 is radially offset from the longitudinal central axis CA of the filter cartridge 4550 and is radially offset from the central axis ICA of the first inlet connector 4572. Further, as viewed with respect to the longitudinal central axis CA of the filter cartridge 4550 and as can be seen in FIG. 32, the outlet port 4574a of the second outlet connector 4574 is radially offset from, that is, does not axially overlap, the inlet port 4572a of the first inlet connector 4572, that is, a circumferential extent of the outlet port 4574a of the second outlet connector 4574 is radially offset from, that is, does not axially overlap, any portion of a circumferential extent of the inlet port 4572a of the first inlet connector 4572.

The central axis ICA of the inlet connector 4572 is coincident with the central longitudinal axis LA of the filter cartridge, the central axis OCA of the outlet connector 4574 is radially offset or spaced from the central longitudinal axis LA of the filter cartridge 4550 and is radially offset or spaced from the central axis ICA of the inlet connector 4572. Accordingly, the filter cartridge 4550 can be inserted into the filter cartridge housing 4510 in only one orientation or direction, that is, the desired orientation such that unfiltered water flows into the inlet connector 4572 and filter water flows out of the outlet connector 4574 after passing through the filter media 4578 of the filter cartridge 4550. Additionally, that fact that the outlet port 4574a of the second outlet connector 4574 is radially offset from, that is, does not axially overlap, the inlet port 4572a of the first inlet connector 4572, when viewed along or with respect to the central longitudinal axis CA of the filter cartridge 4550, facilitates the configuration and positioning of the internal baffle member 4600 within the cartridge interior region 4555 such that the water flow path within the filter cartridge 4550 (shown schematically as W in FIGS. 26 and 32) is desirably lengthened for filtering/purification purposes while minimizing, to the extent possible, the amount of baffling material needed to attain the desired water flow path and, at the same time, not unduly impeding flow through the filter cartridge 4550. That is, water flow through the filter cartridge 4550 must be sufficient to provide an acceptable flow rate or volume of filtered water exiting the cartridge 4550 to provide a proper shower flow pattern and/or water volume/flow rate emanating from a faceplate of the showerhead 4100 for showering purposes.

The showerhead 4100 is coupled to the water supply line extending through a wall of panel of, for example, a tub or shower enclosure. The filter cartridge assembly 4500 provides for filtration of water W that passes through a showerhead engine 4102 (schematically shown in FIGS. 25 and 26) of the showerhead 4100. Specifically, the filtration of water is accomplished by the cylindrical filter cartridge 4550 (best seen in FIGS. 27-32) housed or disposed in the split filter cartridge housing 4510 (best seen in FIG. 25-28). The showerhead engine 4102 directs all water flowing through the showerhead 4100 such that the unfiltered water flows into the inlet port 4572a of the first inlet connector 4572 of the first end wall 4553a of the filter cartridge 4550 closest to the supply line. The water then flows through filter media 4578 contained within an interior region 4555 of the filter cartridge 4550 whereby contaminants are removed by the filter media 4578 and/or are chemically converted or altered to inert materials and/or less undesirable materials by the filter media 4578, i.e., the flowing water is filtered by the filter media 4578. The filtered water then exits through the outlet port 4574a of the second outlet connector 4574 of the second end wall 4553b of the filter cartridge 4550 nearest a faceplate 4310 of the showerhead 4100. A flow of water through an interior region 4110 of the showerhead 4100 (and through the showerhead engine 4102) from an upper end 4104 to a lower end 4106 of the showerhead 4100 is shown schematically as W in FIGS. 21 and 25. Water exits the showerhead engine 4102 through at least one exit opening 4301 of the water-directing and filtering assembly 3990a, which includes, in one exemplary embodiment, a plurality of orifices 4312 in the faceplate 4310.

Filter Cartridge Assembly 4500

The filter cartridge assembly 4500 of the third exemplary embodiment includes the replaceable filter cartridge 4550 removably disposed in the split filter housing 4510. Advantageously, for compactness along an axial direction of the showerhead 100, that is, a length AL (FIG. 26) of the showerhead 4100 as measured along the longitudinal axis LA of the showerhead 4100, the interior region 4515 defined by the split filter cartridge housing 4510 of the filter cartridge assembly 4500 is sized and configured to be contained within an interior region 4218 of the exterior shell 4210 of the body portion 4200 and further within an interior region 4224 of an inner frame 4220 of the body portion 4200. Additionally, for axial compactness, the filter cartridge 4550 is sized and configured to fit within the interior region 4515 defined by the split filter housing 4510 and thus the filter cartridge 4550 is disposed within the interior region 4218 of the exterior shell 4210 of the body portion 4200 and further within the interior region 4224 of the inner frame 4220 of the body portion 4200.

Figure 26:
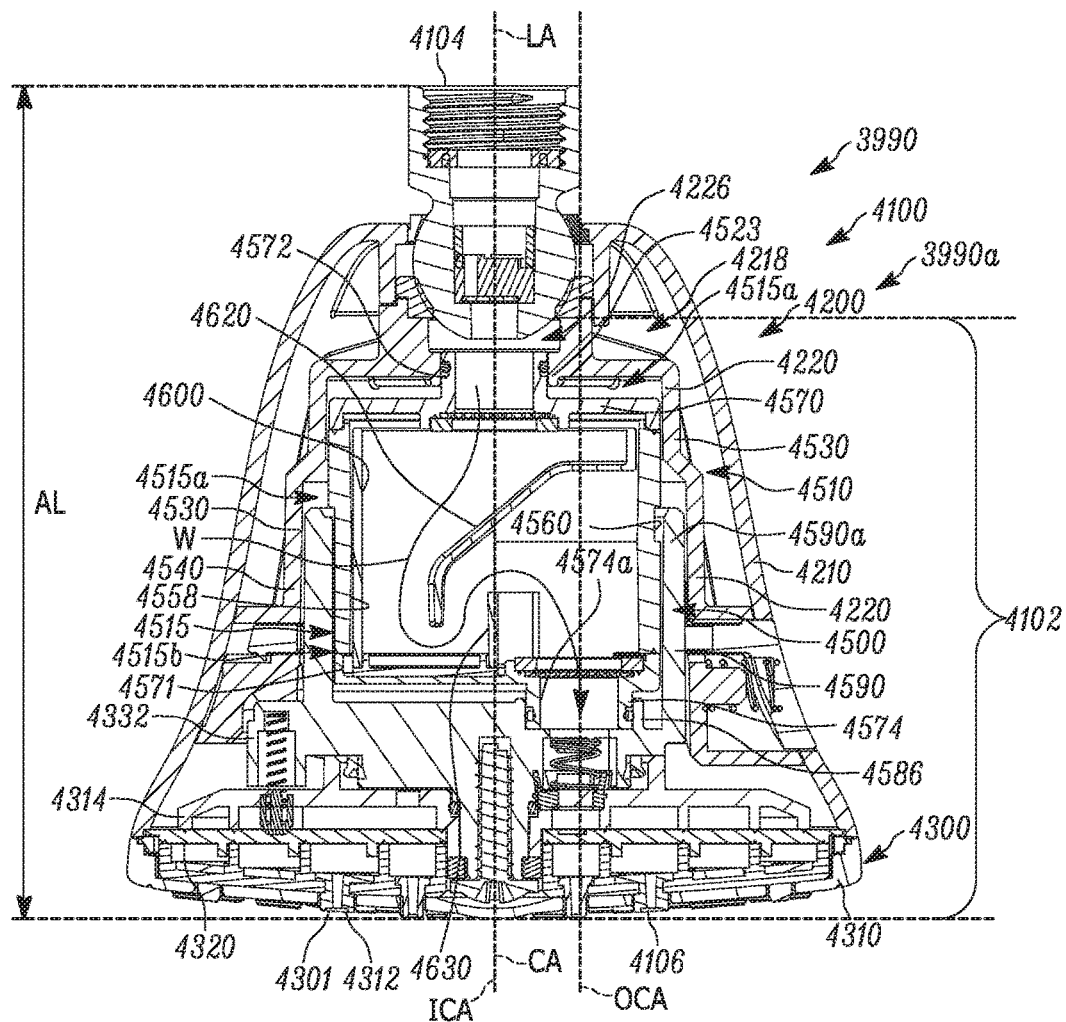
FIG. 26 is a schematic longitudinal section view of the showerhead of FIG. 1, as seen from a plane indicated by the line 26-26 in FIG. 23.

Moreover, as can be seen in FIG. 26, an upper portion 4590a of the side wall 4590 of the second face part 4580 of the split filter cartridge housing 4510 has an outer diameter that is sized to be telescopically received in an inner diameter of the enlarged diameter upper wall 4540 of the side wall 4530 of the first body part 4520 of the split filter cartridge housing 4510. This telescopic coupling of the side walls 4530, 4590 of the first and second parts 4520, 4580 again serves to reduce the overall axial length AL of the showerhead 4100. Minimizing the axial length AL of the showerhead 4100 (as measured along longitudinal axis LA) is of significant importance because the position of the water supply line is fixed with respect to the panel or wall of the tub or shower enclosure. Thus, there is a limited vertical distance between the tub or shower floor and the position of the generally horizontal water supply line. Typically, the showerhead 4100 will be angled downwardly with respect to a horizontal direction to direct the water spray pattern downwardly against the user's body. Accordingly, if the axial length AL of the showerhead 4100 is too great, taller users will have a tendency to bump their heads against the faceplate 4310 of the showerhead 4100.

The split filter cartridge housing 4510 extends along showerhead longitudinal axis LA and includes the first, body part 4520 (best seen in FIGS. 27 and 28) that is generally drum-shaped and is defined by the inner frame 4220 of the body portion 4200 and the second, face part 4580 (best seen in FIG. 27) that is also generally drum-shaped and is defined by the cylindrical housing cylinder 4330 of the face portion 4300. As can best be seen in FIGS. 26 and 28, the interior region 4515 of the split filter cartridge housing 4510 is comprised by a first portion 4515a of the interior region 4515 defined by the first part 4520 and a second portion 4515b of the interior region 4515 defined by the second part 4580.

The second part 4580 of the filter cartridge housing 4510 includes the planar end wall 4583, the cylindrical side wall 4590 and a detent arm assembly 4332. The side wall 4590 includes a pair of extraction fingers 4594 (FIG. 27) that are disposed in corresponding cut outs 4592 positioned circumferentially about the periphery of the side wall 4590. The side wall 4590 additionally includes a plurality of peripheral slots 4598 (one of which may be seen in FIGS. 27 and 28) formed in an outer surface 4591 of the side wall 4590. The pair of peripheral slots 4598 are part of the latching arrangement or mechanism 4541 of the showerhead 4100 to releasably attach the face portion 4300 to the body portion 4200. The outer surface 4591 of the side wall 4590 includes the axially extending locating rib 4599 (FIG. 27) which is received in the axially extending slot 4548 of the upper wall 4540 of the side wall 4530 of the first part 4520 to inhibit relative rotation between the second part 4580 and the first part 4520 when the latching mechanism 4541 is engaged.

The end wall 4583 of the second part 4580 of the filter cartridge housing 4510 includes a water fitting 4586 (FIGS. 24 and 26) and three torque-limiting, anti-rotation ribs 4588a, 4588b, 4588c (FIG. 24) that are received respectively in first, second and third recesses 4576a, 4576b, 4576c (FIGS. 29 and 31) formed in a second end wall 4553b of the second end cap 4571 of the filter cartridge 4550. The water fitting 4586 receives and seats the second or outlet connector 4574. The second connector 4574 includes an o-ring 4575 disposed in an annular groove 4574c formed in an outer surface 4574b of the second connector 4574. An interior diameter of the fitting 4586 of the end wall 4583 is sized to sealingly engage the o-ring 4575 of the second connector 4574 to provide a water-tight seal between the second connector 4574 and the end wall 4583. As can best be seen in FIG. 26, filtered water exits the filter cartridge 4550 via the second outlet port 4574a and flows into a water manifold defined by the combination of faceplate 4310, backing plate 4314, and intermediate plate 4320 of the face portion 4300 of the showerhead 4100, as previously explained with respect to the first embodiment of the showerhead 100.

The interfitting or seating of the torque-limiting ribs 4588a, 4588b, 4588c into the corresponding recesses 4576a, 4576b, 4576c of the second end wall 4553b of the filter cartridge 4550 advantageously function to both limit the torque that is applied by the end wall 4583 to the second connector 4574 as the faceplate 4310 is rotated by a user with respect to the showerhead body 4200 by pushing on a faceplate rotation finger 4313 to change water spray patterns emanating from the faceplate 4310, as previously explained, and to inhibit undesired rotation of the filter cartridge 5550 within the split filter cartridge housing 4510. To maximize the torque-limiting capability of the ribs 4588a, 4588b, 4588c when seated in the corresponding recesses 4576a, 4576b, 4576c, advantageously, the recesses 4576a, 4576b, 4576c each extend from an outer periphery 4694 of the second end wall 4553b of the filter cartridge 4550 to an outer surface 4574b of the second or outlet connector 4574 of the second end wall 4553b of the filter cartridge 4550. The recesses 4576a, 4576b, 4576c form a T-shaped configuration centered about or intersecting at the second connector 4574. To maximize the length of the longest of the three recesses, namely, the recess 4576a, the recess 4576a passes through the central longitudinal axis CA of the filter cartridge 4550. The recesses 4576a, 4576b, 4576c terminate at the outer surface 4574b of the second connector 4574, however, if extended, the recesses 4576a, 4576b, 4576c would extend through and intersect the central axis OCA of the second connector 4574.

Additionally, the torque limiting ribs 4588a, 4588b, 4588c of the end wall 4583 of the second part 4580 also provide a positive locating function to make sure that the filter cartridge 4550 is properly seated in the filter cartridge housing 4510. If the torque-limiting ribs 4588a, 4588b, 4588c are not properly seated in the recesses 4576a, 4576b, 4576c of the second end wall 4576 of the filter cartridge 4550, extending portions 4545 of the latch 4544 of the first part 4520 will not be able to proper engage (i.e., slide into) the latch receiving slots 4598 of the second part 4580 to properly secure the face portion 4300 to the body portion 4200 of the showerhead 4100.

Figure 27:
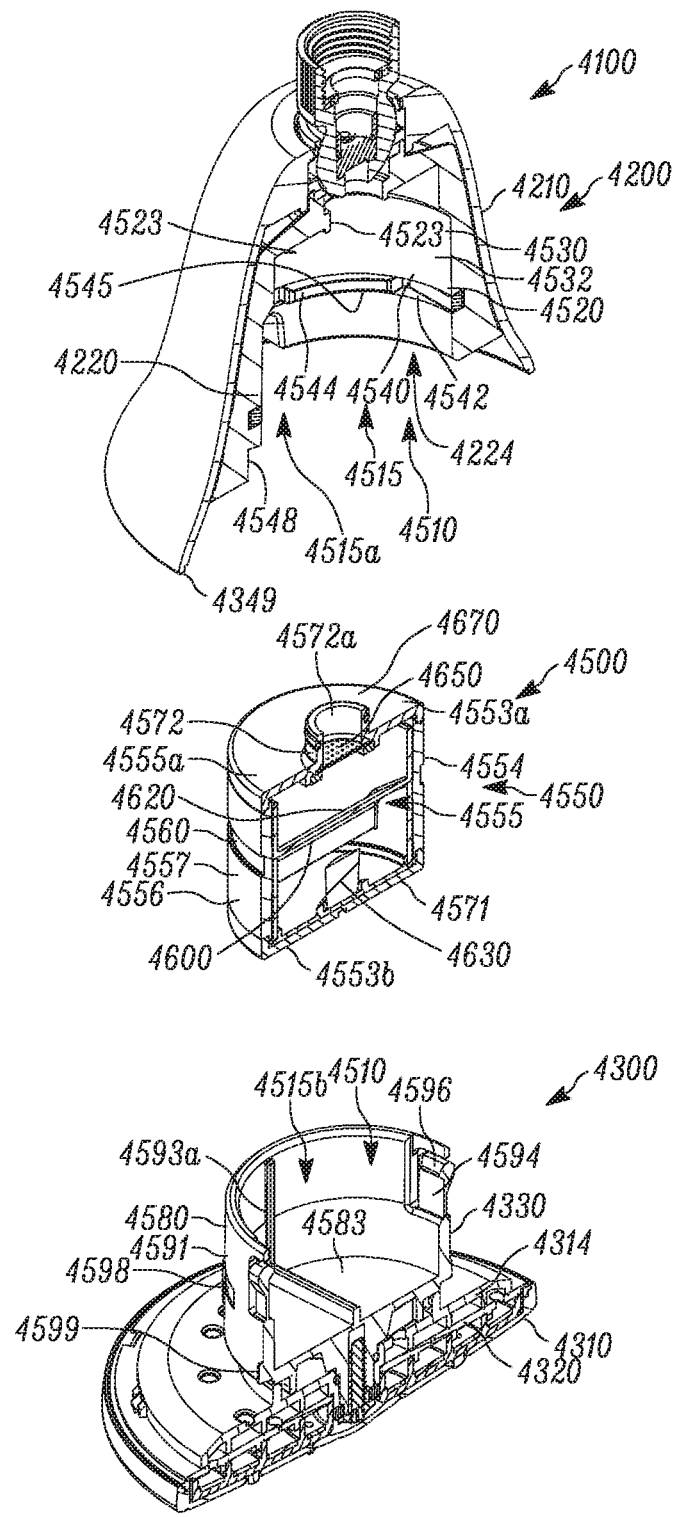
FIG. 27 is a schematic top, side exploded perspective view of a longitudinal section the showerhead of FIG. 21.
Figure 28:
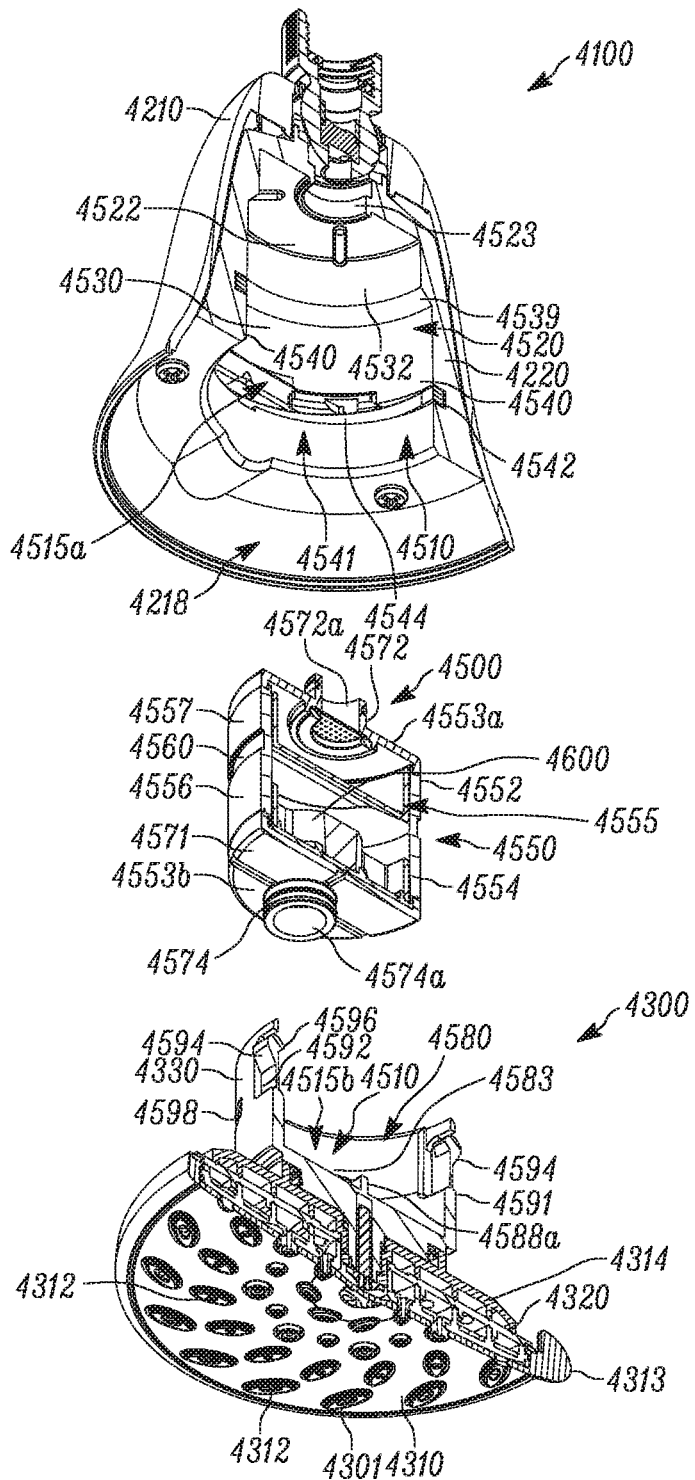
FIG. 28 is a schematic bottom, side exploded perspective view of a longitudinal section the showerhead of FIG. 21.

As best seen in FIGS. 27 and 28, the first part 4520 of the split filter cartridge housing 4510 includes the end wall 4522 that is generally orthogonal to the longitudinal axis LA and the side wall 4530 extending orthogonally to the end wall 4522 along the longitudinal axis LA. The side wall 4530 includes two portions: a) an annular retainer wall 4532 adjacent to the end wall 4522; and b) the annular upper wall 4540 spaced from the end wall 4522 and stepped radially outwardly from the retainer wall 4532, along a shoulder 4539. The increased diameter of the upper annular wall 4540 is sized to telescopically receive the upper portion 4590a of the side wall 4590 of the second part 4580 of the split filter cartridge housing 4510, as can best be seen in FIG. 26. The end wall 4522 of the first part 4520 of the filter cartridge housing 4510 also includes a fitting 4523 that receives the first connector 4572 of the first end wall 4553a of the filter cartridge housing 4550. The first connector 4572 includes an o-ring 4573 disposed in an annular groove 4572c formed in an outer surface 4572b of the first connector 4572. An interior diameter of the fitting 4523 of the end wall 4522 is sized to sealingly engage the o-ring 4573 of the first connector 4572 to provide a water-tight seal between the first connector 4572 and the end wall 4522. As previously explained with respect to the first embodiment, unfiltered supply line water flows into an upper cavity 4226 of the inner frame 4220 of the showerhead body 4200. Due to the seal between the filter cartridge first connector 4572 and the fitting 4523 of the filter cartridge housing end wall 4522, when the water flows from the upper cavity 4226 of the inner frame 4220 through the first inlet port 4572a of the first connector 4572 and into the interior region 4515 of the filter cartridge 4550 where the water is filtered/purified, as previously explained.

The upper wall 4540 of the first part 4520 includes an annular latching slot 4542 (FIG. 28) that supports a latch 4544. The latching slot 4542 and the latch 4544 are part of the latching arrangement 4541 that releasably secures the face portion 4300 to the body portion 4200 of the showerhead 4100. As described previously with respect to the latching arrangement 451 of the showerhead 100 of the first exemplary embodiment, the latch 4544 slides in a radial direction (orthogonal to the longitudinal axis LA) outwardly to recess within the latching slot 4542 when the user pushes inwardly on a latch release actuator 4546 (FIGS. 22 and 23) positioned in an opening on the exterior shell 4210 of the body portion 4200. Pressing on the latch release actuator 4546 moves the latch 4544 radially outwardly and away from engagement with latch receiving slots 4598 formed in an outer surface 4591 of the side wall 4590 of the face part 4580 of the filter cartridge housing 4510 to release the face portion 4300 from the body portion 4200 of the showerhead 4100. When the latch release actuator 4546 is not depressed, the latch 4544 is engaged or extends into the latch receiving slots 4598 thereby securing the face portion 4300 to the body portion 4200 of the showerhead 4100, as previously explained.

When it is desired to replace the filter cartridge 4550 when its useful life has expired, the face portion 4300 is removed from the body portion 4200 by pressing inwardly on the latch release actuator 4546, as previously explained with respect to the latching arrangement 451, to allow the face portion 300 to be moved with respect to the stationary body portion 4200 along the longitudinal axis LA in a direction down D (FIG. 22) and removed from the body portion 4200. When the latch release actuator 4546 is pressed, the latching mechanism 4541 is moved to the release position.

Figure 29:
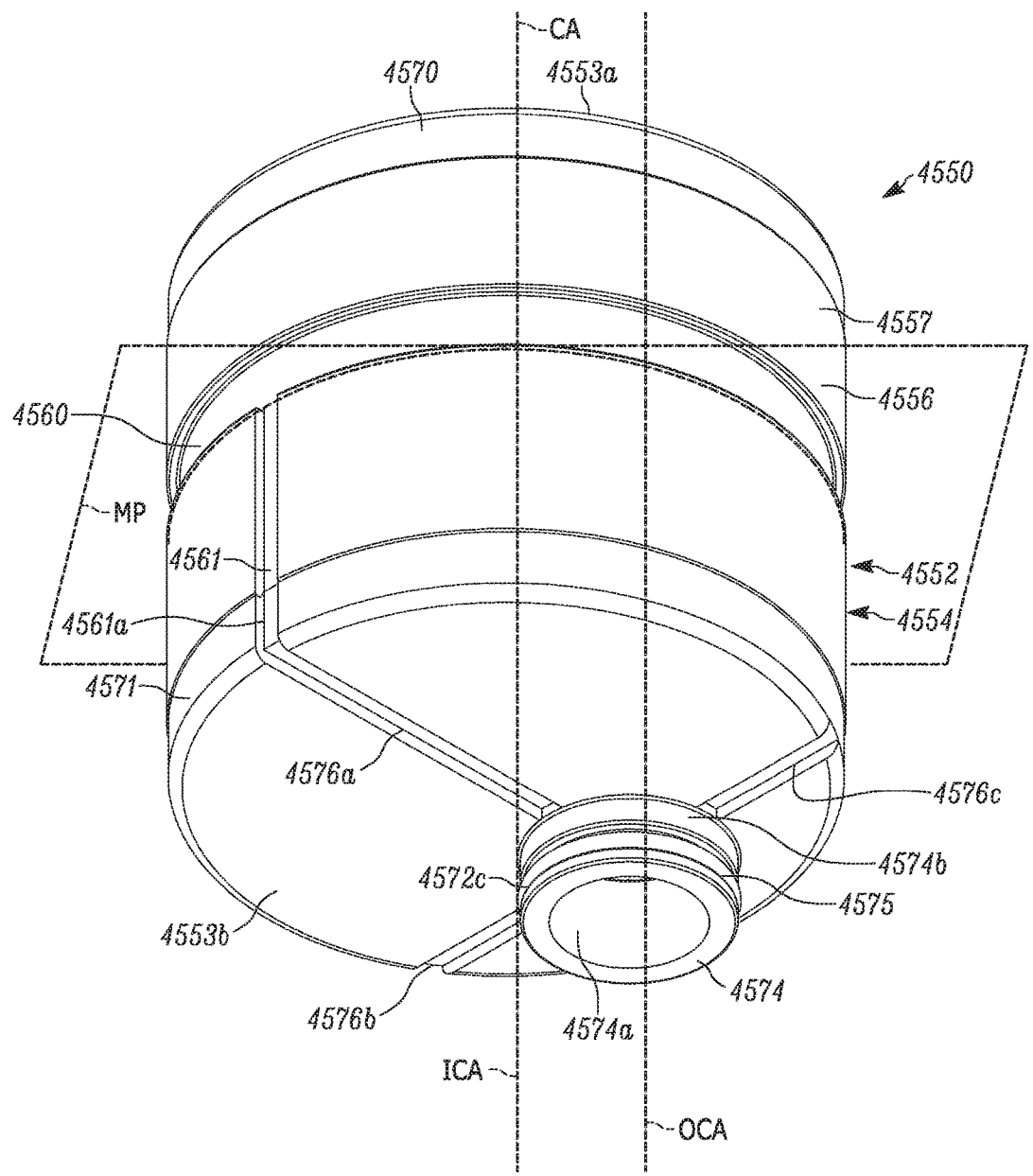
FIG. 29 a schematic top, side perspective view of the filter cartridge of the filter cartridge assembly of the showerhead of FIG. 21.

Advantageously, as can best be seen in FIGS. 29 and 30, the configuration of the filter cartridge 4550 includes an annular or circumferential extraction groove 4560 in an outer wall or outer surface 4557 of the central casing 4556 of the filter cartridge 4550. The second part 4580 of the filter cartridge housing 4510 includes the pair of extraction fingers 4594 formed in a pair of cut outs 4592 in the side wall 4590 of the second part 4580 of the filter cartridge housing 4510. The side wall 4590 of the second part 4580 of the filter cartridge housing 4510 also includes an axially extending alignment rib 4593a formed on an inner surface 4593 of the side wall 4590. The alignment rib 4593a is advantageously received in an axially extending alignment groove 4561 formed in the outer surface 4557 of the casing 4556. Advantageously, the alignment rib 4593a of the side wall 4590 of the second part 4580 of the filter cartridge housing 4510 and the alignment groove 4561 of the casing outer surface 4557 allow the user to visually align the filter cartridge 4550 with the face portion 4300 of the showerhead 4100 when inserting the cartridge 4550 into the second part 4580 of the filter cartridge housing 4510. The visual alignment of the alignment rib 4593a on the side wall inner surface 4593 of the second part 4580 of the filter cartridge housing 4510 and the alignment groove 4561 of the casing outer surface 4557 insures that when the filter cartridge 4550 is inserted into the second part 4580 of the filter cartridge housing 4510, the second connector 4574 of the filter cartridge 4550 will properly slide into and seat in the annular fitting 4586 of the end wall 4583 of the second part 4580 of the filter cartridge housing 4510.

Figure 25:
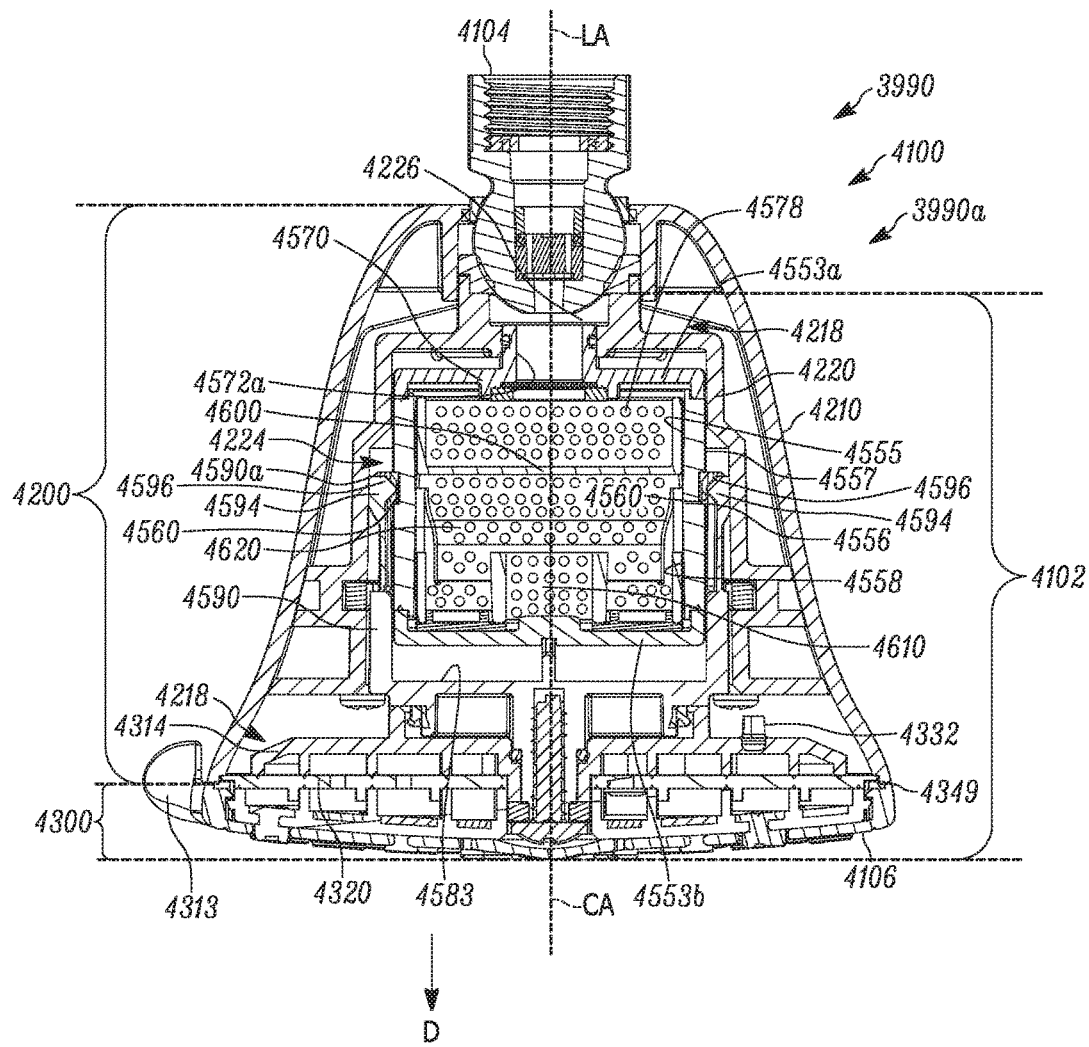
FIG. 25 is a schematic longitudinal section view of the showerhead of FIG. 21, as seen from a plane indicated by the line 25-25 in FIG. 23.

As can be seen in FIG. 25, a radially protruding head 4596 of each of the extraction fingers 4594 extend into and engage the circumferential extraction groove 4560 of the filter cartridge 4550. Thus, when the face portion 4300 is removed from the body portion 4200 by the user pressing the latch release actuator 4546, as was schematically depicted in FIG. 14 in the first exemplary embodiment of the showerhead 100, the filter cartridge 4550 is removed with the face portion 4300, that is, is remains seated or nested in the second part 4580 of the filter cartridge housing 4510 upon removal of the face portion 4300 from the body portion 4200. This is advantageous since it allows the user easy access to the filter cartridge 4550 because the filter cartridge is literally in his or her hand as it is attached to the face portion 4300 when the face portion 4300 is removed from the body portion 4200 by the user. Thus, the user does not have to attempt to dislodge the filter cartridge 4550 from the first part 4520 of the filter cartridge housing 4510 where it may become seated, thereby risking potentially damaging the filter cartridge 4550 or the body portion 4200 when attempting to dislodge the filter cartridge 4550 from the first part 4520 of the filter cartridge housing 4510. Additionally, the risk of the filter cartridge 4550 suffering damage by initially being seated in the first part 4520 of the filter cartridge housing 4510 and then, upon dislodgement of the filter cartridge 4550 by the user, the filter cartridge 4550 falling to the floor of the tub or shower and suffering damage is also mitigated by the extraction finger design of the present disclosure.

Filter Cartridge 4550

Figure 23:
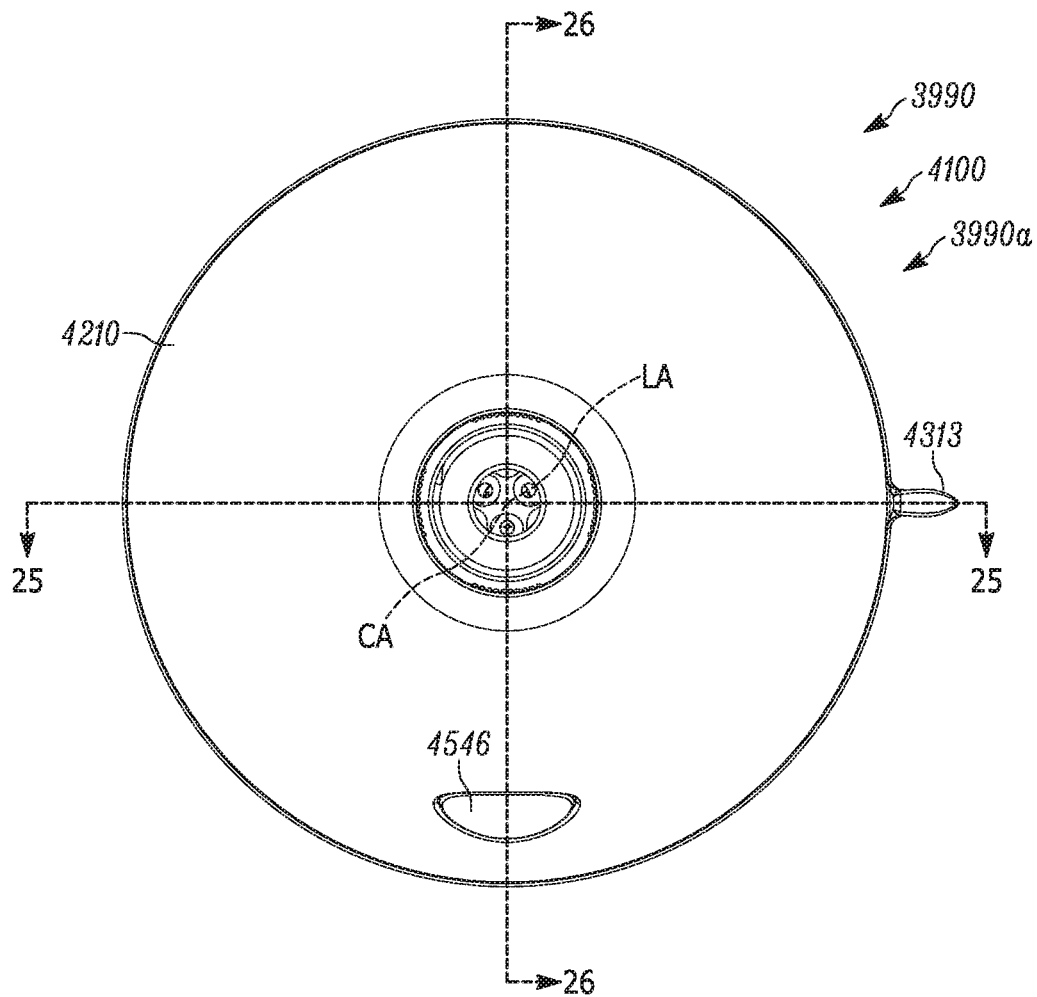
FIG. 23 is a schematic top plan view of the showerhead of FIG. 21.
Figure 24:
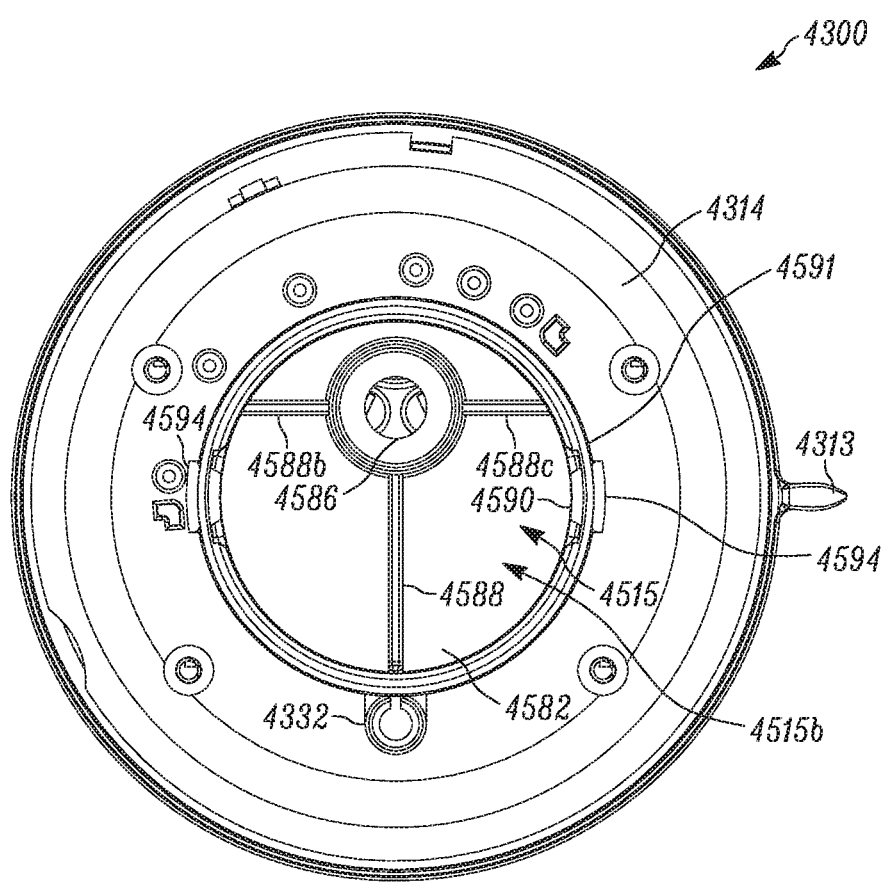
FIG. 24 is a schematic top plan view into a face portion of the showerhead of FIG. 11, as seen from a plane indicated by the line 24-24 in FIG. 21.

As can best be seen in FIGS. 23, 25 and 26, when positioned in the split filter cartridge housing 4510, the longitudinal or central axis CA of the generally cylindrical cartridge 4550 extends along and is generally is concentric with the longitudinal axis LA of the showerhead 4100. The filter cartridge 4550 includes the filter shell 4552 defining the interior region 4555 containing the filter media 4578 (schematically shown in FIG. 25) for filtering out contaminants from water flowing through the cartridge 4550. The filter shell 4552 is generally in the shape of a cylindrical drum 4554 that is defined by the hollow central cylindrical casing 4556 extending along and centered about the central axis CA of the filter cartridge 4550 and axially spaced apart first and second end walls 4553a, 4553b defining opposite ends of the drum 4554. In one exemplary embodiment, the end walls 4553a, 4553b are defined by the first and second end caps 4570, 4571 are affixed to opposite ends of the casing 4556 by, for example, ultrasonic welding. The end walls 4553a, 4553b of the end caps 4570, 4571 and are generally planar and orthogonal to the central axis CA of the filter cartridge 4550.

Figure 33:
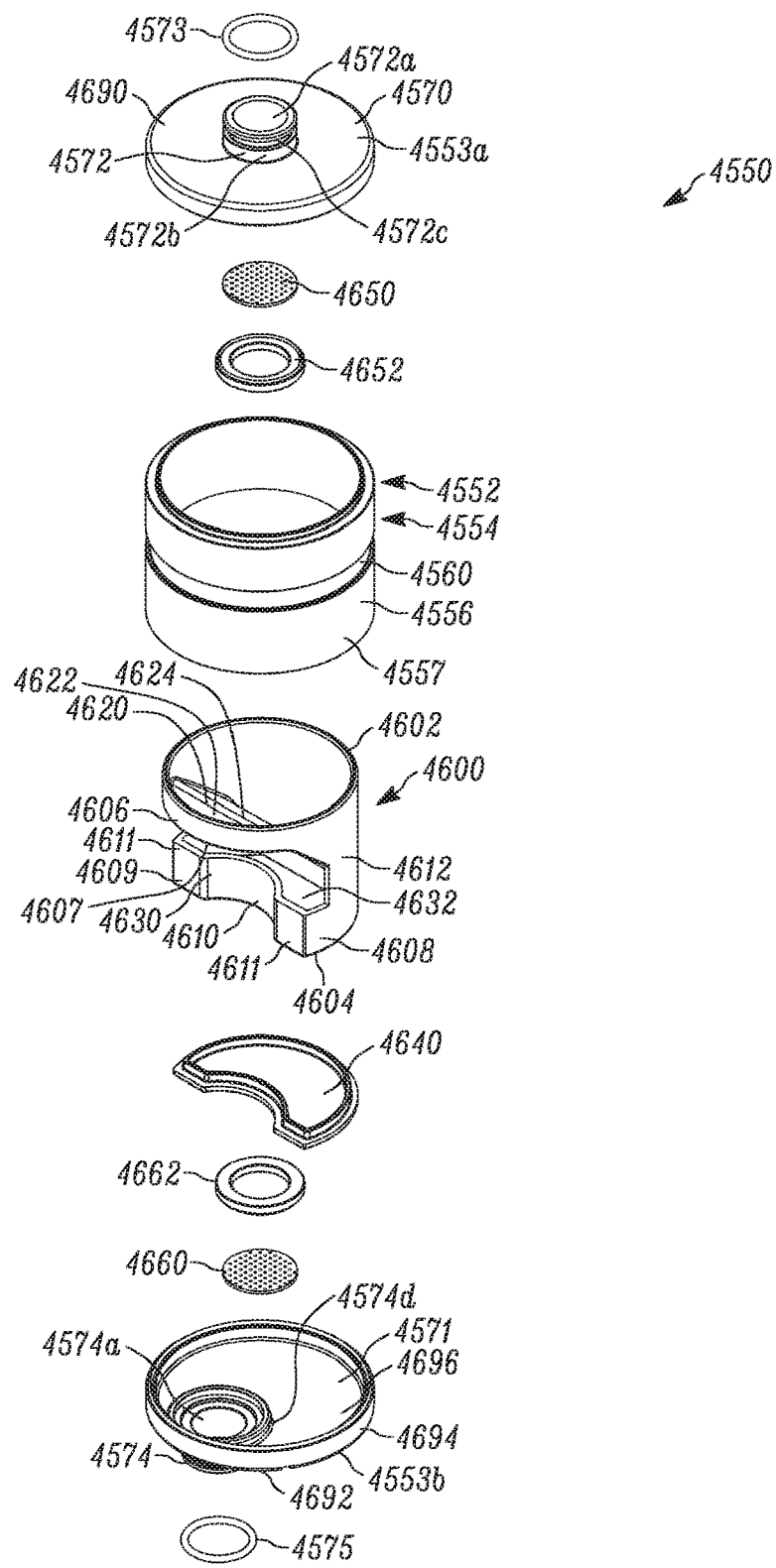
FIG. 33 is a schematic exploded perspective view of the filter cartridge of FIG. 29.

As discussed previously, the first end wall 4553a of the first end cap 4570 includes the first or inlet connector 4572, which, as can be seen in FIG. 32, extends through the wall 4553a. The first connector 4572 defines the first or inlet port 4572a which is a cylindrical passageway in fluid communication with the interior region 4555 of the filter cartridge 4550. The first connector 4572 and the first port 4572a are centered about and define the inlet central axis ICA. In one exemplary embodiment, the inlet central axis ICA is coincident with the filter cartridge central longitudinal axis CA and, when the filter cartridge 4550 is installed in the filter cartridge housing 4510, is coincident with the showerhead longitudinal axis LA. The first connector 4572 includes the o-ring 4573 seated in the annular groove 4572c in the outer surface 4572b of the first connector 4572. The o-ring 4573 engages the central annular fitting 4523 of the end wall 4522 of the first body part 4520 of the filter cartridge housing 4510 to provide a water-tight seal between the first connector 4572 and the end wall 4522. The first end wall 4553a of the first end cap 4570 includes a generally planar outer or exterior surface 4690. As can be seen in FIG. 33, a mesh or screen 4650 is disposed in the first connector 4572 so as to span the first inlet port 4572a. The screen 4650 is held in place with a retaining ring 4652 that is received in a recessed lower portion of the first connector 4572. Among other functions, the screen 4650 prevents filter media 4578 from falling out of the filter cartridge interior region 4555.

The second end wall 4553b of the second end cap 4571 also includes a generally planar outer surface 4571a. The second end wall 4553b includes the second or outlet connector 4574, which extends through the wall 4553b. The second connector 4574 defines the second or outlet port 4574a which is a cylindrical passageway in fluid communication with the interior region 4555 of the filter cartridge 4550. The second connector 4574 and the second port 4574a are centered about and define the outlet central axis OCA (FIG. 30). In one exemplary embodiment, the outlet central axis OCA is parallel to and radially spaced apart from the filter cartridge central longitudinal axis CA and, when the filter cartridge 4550 is installed in the filter cartridge housing 4510, is parallel to and radially spaced apart from the showerhead longitudinal axis LA. Additionally, when viewed with respect to the longitudinal central axis CA of the filter cartridge 4550 or the showerhead longitudinal axis LA and as can be seen from the vertical dashed line extensions of the inlet and outlet ports 4572a, 4574a in FIG. 32, the outlet port 4574a of the second outlet connector 4574 is radially offset from, that is, does not axially overlap, the inlet port 4572a of the first inlet connector 4572, that is, a circumferential extent of the outlet port 4574a of the second outlet connector 4574 is radially offset from, that is, does not axially overlap, any portion of a circumferential extent of the inlet port 4572a of the first inlet connector 4572.

The second connector 4574 includes the o-ring 4575 seated in the annular groove 4574c in the outer surface 4574b of the second connector 4574. The o-ring 4575 engages the annular fitting 4586 of the end wall 4583 of the second face part 4580 of the filter cartridge housing 4510 to provide a water-tight seal between the second connector 4574 and the end wall 4583. The second end wall 4553b of the second end cap 4571, includes a generally planar outer or exterior surface 4692. A mesh or screen 4660 is disposed in the second connector 4575 so as to span the second inlet port 4574a. The screen 4660 is held in place with a retaining ring 4662 that is received in a recessed upper portion of the second connector 4574. Among other functions, the screen 4660 prevents filter media 4578 from falling out of the filter cartridge interior region 4555.

Figure 31:
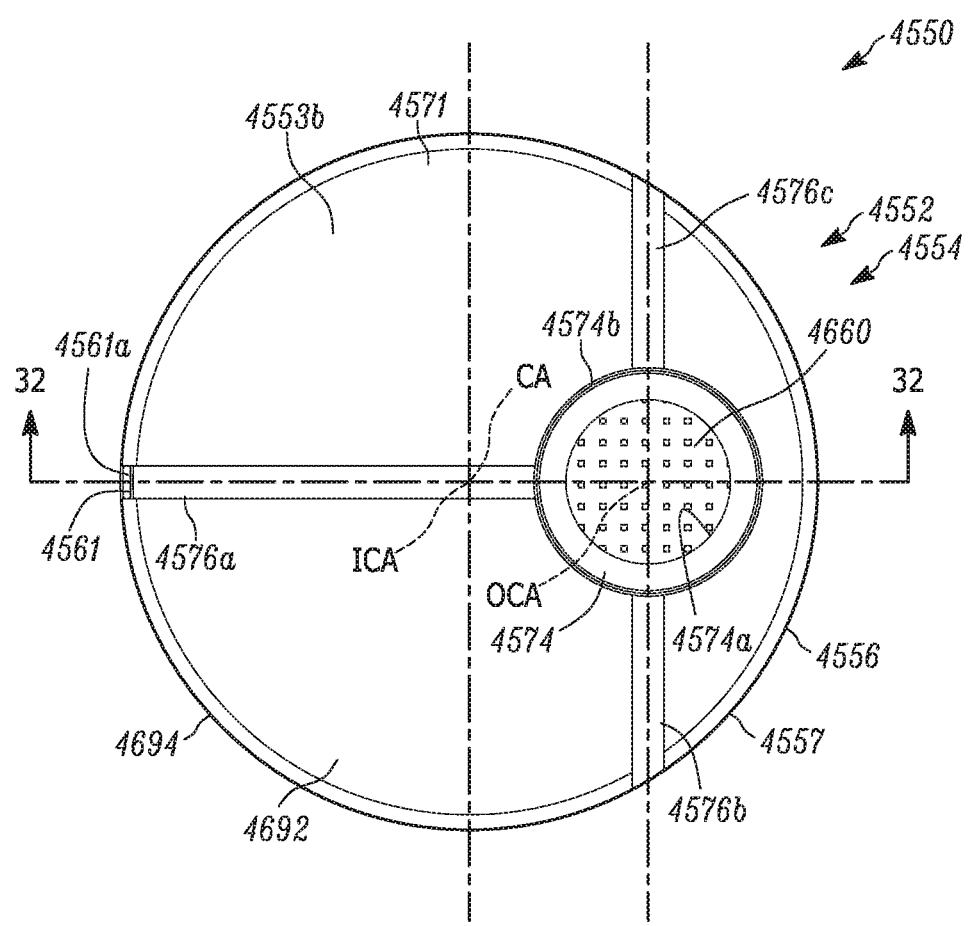
FIG. 31 is a schematic bottom plan view of the filter cartridge of FIG. 29.

As can best be seen in FIG. 31, the second end wall 4553b of the second end cap 4571 includes the first recess 4576a in the exterior surface 4692 of the second end wall 4553b. The first recess 4576a extends linearly between an outer periphery or outer edge 4694 of the second end wall 4553b and the outer surface 4574b of the second connector 4574 and passes through the filter cartridge central longitudinal axis CA. The second recess 4576b extends linearly between the outer edge 4694 of the second end wall 4553b and the outer surface 4574b of the second connector 4574 and the third recess 4576c extends linearly between the outer edge 4694 of the second end wall 4553b and the outer surface 4574b of the second connector 4574. In plan view, the first, second, and third recesses 4576a, 4576b, 4576c form a T-shaped recessed configuration in the exterior surface 4692 of the second end wall 4553b intersecting at the second connector 4574.

The outer wall or surface 4557 of the filter cartridge casing 4556 includes the first annular extraction groove 4560 in the outer surface 4557. The extraction groove 4560 is axially spaced from the first end wall 4553a and the second end wall 4553b and defines a plane that is substantially orthogonal to the filter cartridge central axis CA and substantially parallel to the first and second end walls 4553a, 4553b. In one exemplary embodiment, the extraction groove 4560 is axially closer to the first end wall 4553a than the second end wall 4553b. This axial offset of the extraction groove from a midplane MP (FIGS. 29 and 32) through the filter cartridge 4550 advantageously provides for non-reversibility of the filter cartridge 4550 within the filter cartridge housing 4510. The midplane MP cuts radially or horizontally through an axial center point of the filter cartridge 4550 as measured along the center axis CA of the cartridge 4550 and is parallel to the planar outer surfaces 4690, 4692 of the first and second end walls 4553a, 4553b of the filter cartridge 4550. The casing outer surface 4557 also includes the first axial alignment groove 4561 in the outer surface 4557. The axial alignment groove 4561 of the casing 4556 extends between and intersects the second end wall 4553b and the first circumferential extraction groove 4560. As explained above, the axially extending alignment rib 4593a of the inner surface 4593 of the side wall 4590 of the face part 4580 of the filter cartridge housing 4610 is received in the axial alignment groove 4561 to provide a visual alignment aid for insertion of the filter cartridge 4550 into the face part 4580 of the filter cartridge housing 4610 by the user. In one exemplary embodiment, the first recess 4574a in the exterior surface 4692 of the second end wall 4553b extends linearly between an end 4561a of the axial alignment groove 4561 at the second end wall 4553b and the outer surface 4574b of the second connector 4574.

As can best be seen in FIGS. 32 and 33, disposed in the interior region 4555, along with the filter media 4578, is the water-directing baffle member 4600. The water-directing baffle member 4600 extends between a first upper end 4602, adjacent the first end wall 4553a, and a second lower end 4604, adjacent the second end wall 4553b. At its upper end 4602, the baffle member 4600 includes an axially extending upper cylindrical wall 4606 and at its lower end 4604, the baffle member 4600 includes an axially extending lower wall 4608 that forms substantially one half a cylinder. A central portion 4610 of the lower half cylinder wall 4608 is recessed to provide clearance for an outer periphery 4574d of the second connector 4574, as formed on an interior surface 4696 of the second end wall 4553b of the filter cartridge 4550. Extending between the upper cylindrical wall 4606 and the lower half cylinder wall 4608 is a middle arcuate wall portion 4612.

The baffle member 4600 defines two water-directing baffles 4620, 4630. The first upper baffle 4620 extends generally at an angle downwardly from a lower end 4607 of the upper cylindrical wall 4606. The first baffle 4620 directs water passing through the first inlet port 4572a in a radial direction generally away from the second outlet port 4574a, that is, in a radial direction away from the outlet central axis OCA of the second connector 4574 thereby advantageously providing a more circuitous and longer water flow path for enhanced filtering/purification for unfiltered water entering the filter cartridge 4550 through the first inlet port 4572a and flowing through the filter media 4578 and exiting the filter cartridge 4550 as filtered water through the second outlet port 4574a.

Figure 34:
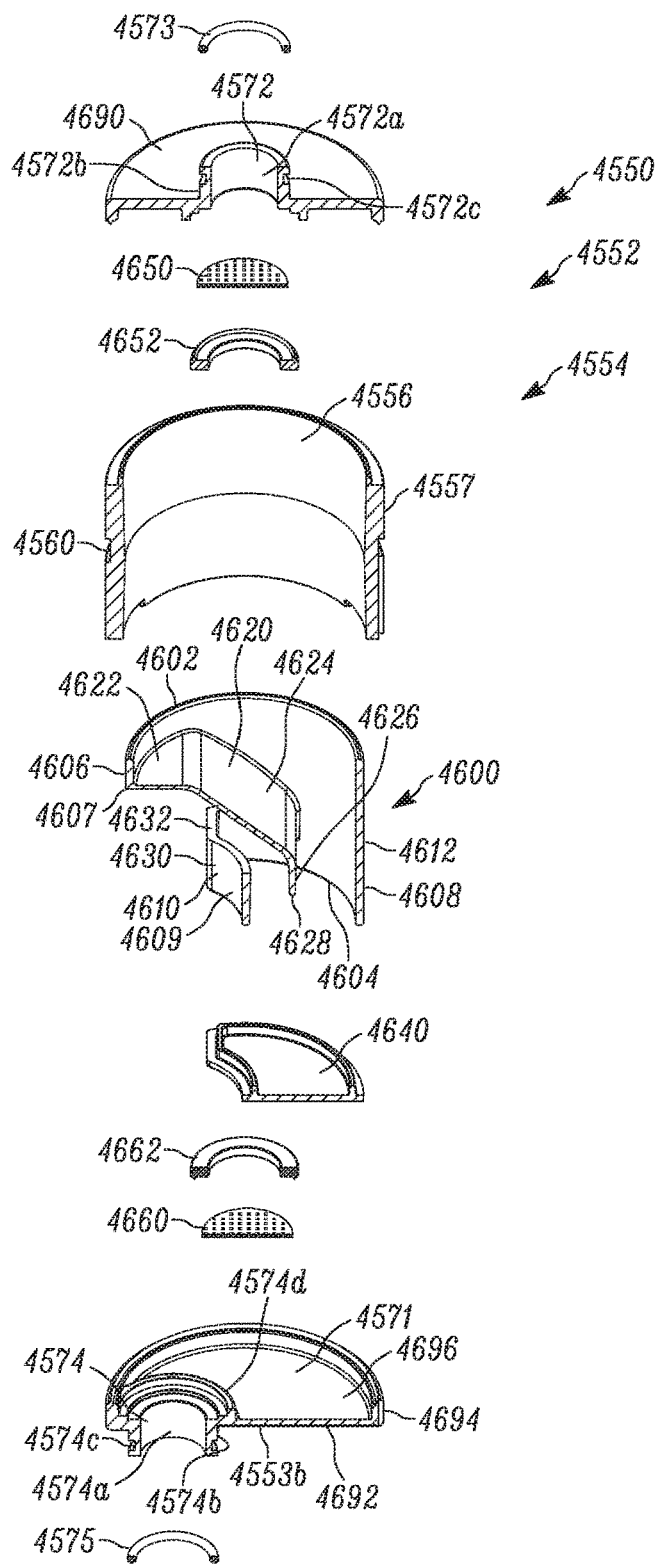
FIG. 34 is a schematic exploded longitudinal section view of the filter cartridge of FIG. 29.

As is best seen in FIG. 34, the first baffle 4620 include a first flat or horizontal portion 4622 generally parallel with the upper end wall 4553a, a downwardly angled central portion 4624, angled in a direction away from the outlet central axis OCA, and a distal vertical portion 4626. The first baffle 4620 functions to route water entering the first inlet port 4572a in a direction radially away from the second outlet port 4574a, that is, the water is routed radially away from the outlet central axis OCA and toward the middle arcuate wall portion 4612. The second lower baffle 4630 (best seen in FIG. 33) is defined by an interior portion 4609 of the lower half cylindrical wall 4608, that is, a noncircumferential portion of the lower half cylindrical wall 4608 that extends away from an inner or interior surface 4558 of the casing 4556. The interior portion 4609 of the lower half cylindrical wall 4608 which comprises the second baffle 4620 includes the arcuate recessed central portion 4610 of the lower half cylindrical wall 4608 and two planar portions 4611 extending to either side of the central portion 4610.

Advantageously, as can be seen in FIG. 26, a lower edge 4628 of the first baffle 4620, when viewed with respect to the central axis CA of the filter cartridge 4550 is axially below, that is, is vertically lower than an upper edge 4632 of the second baffle 4630, when viewed along the filter cartridge central axis CA. The fact that the lower edge 4628 of the first baffle 4620 is axially spaced below a vertical level of the upper edge 4632 of the second baffle 4630 forces the water flow to flow axially upwardly as it passes or flows below the lower edge 4628 of the first baffle 4620 and is forced to pass or flow above the upper edge 4632 of the second baffle 4630 to ultimately flow to the second outlet port 4574a and exit the filter cartridge interior region 4555 as filtered/purified water. As can be seen the schematic depiction of the water flow path W in FIGS. 26 and 32, the water flow path W is generally N-shaped, traversing from the first inlet port 4572a through the first and second baffles 4620, 4630 of the baffle member 4600 and exiting through the second outlet port 4574a. The lower end 4604 of the baffle member 4600 is seated in an arcuate plate 4640, which is disposed on the interior surface 4696 of the second end wall 4553a. The plate 4640 advantageously provides a large opening so that the interior region 4555 is uniformly and completely filled with filter media 4578 during assembly of the filter cartridge 4550 prior to the second end cap 4571 being affixed to the lower end of the central casing 5556.

As can best be seen in FIG. 25, when the face portion 4300 is affixed to the body portion 4200 via the latching arrangement 4541, a lower annular surface 4349 (FIG. 27) of the exterior shell 4210 of the body portion 4200 seats against a seal 4321 disposed between the intermediate plate 4320 and the faceplate 4310 for a water resistant seal between the body portion 4200 and the face portion 4300.

The materials used for the various components of the showerhead 4100 may be durable, waterproof plastic and/or rubber materials or materials having similar durability and waterproof characteristics.

Fourth Exemplary Embodiment—Showerhead Assembly 5990

Figure 35:
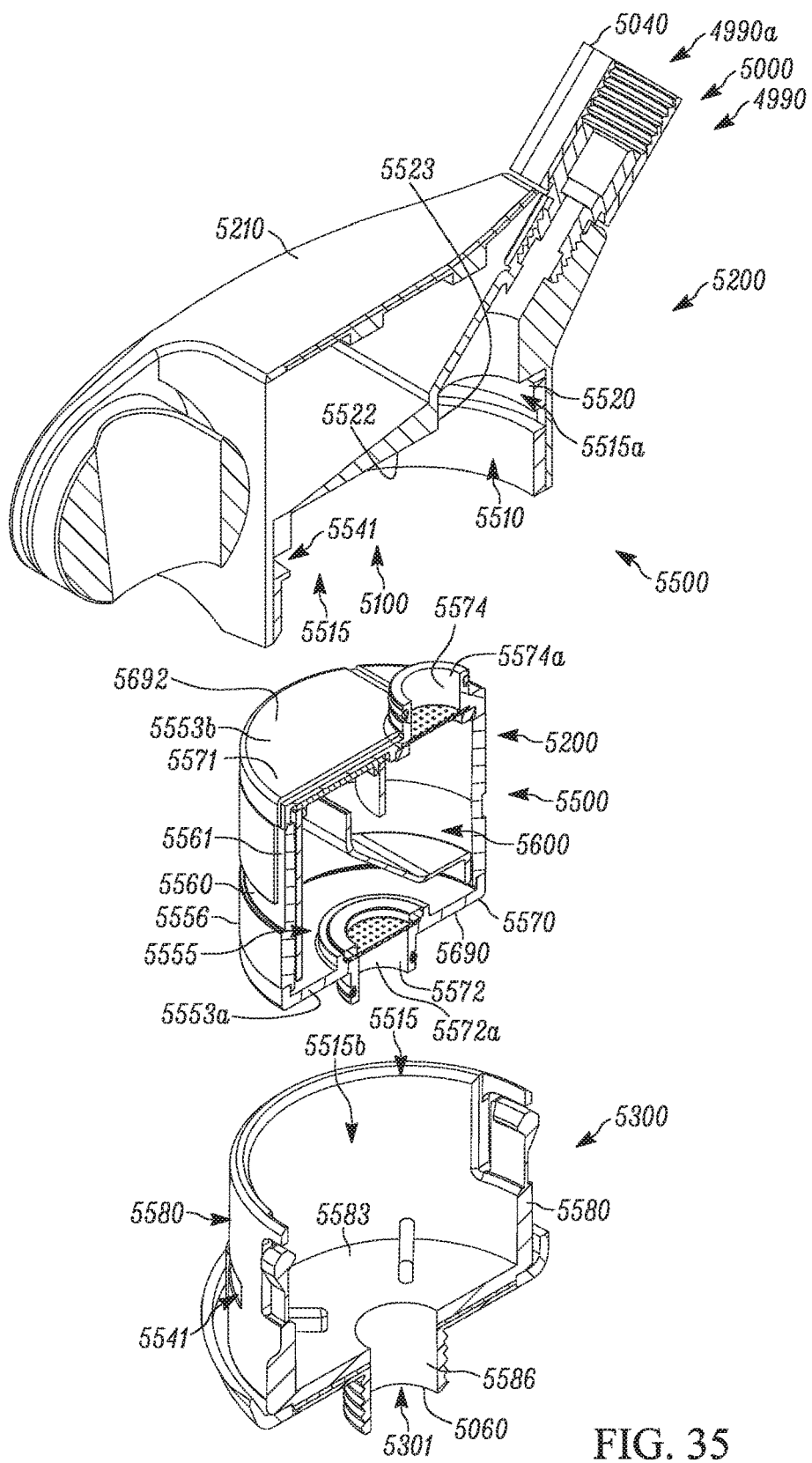
FIG. 35 is a schematic top, side exploded perspective section view of a showerhead bracket of a water-directing and filtering assembly of an exemplary embodiment of a hand-held showerhead assembly of the present disclosure, including a filter cartridge assembly with a non-reversible filter cartridge.
Figure 36:
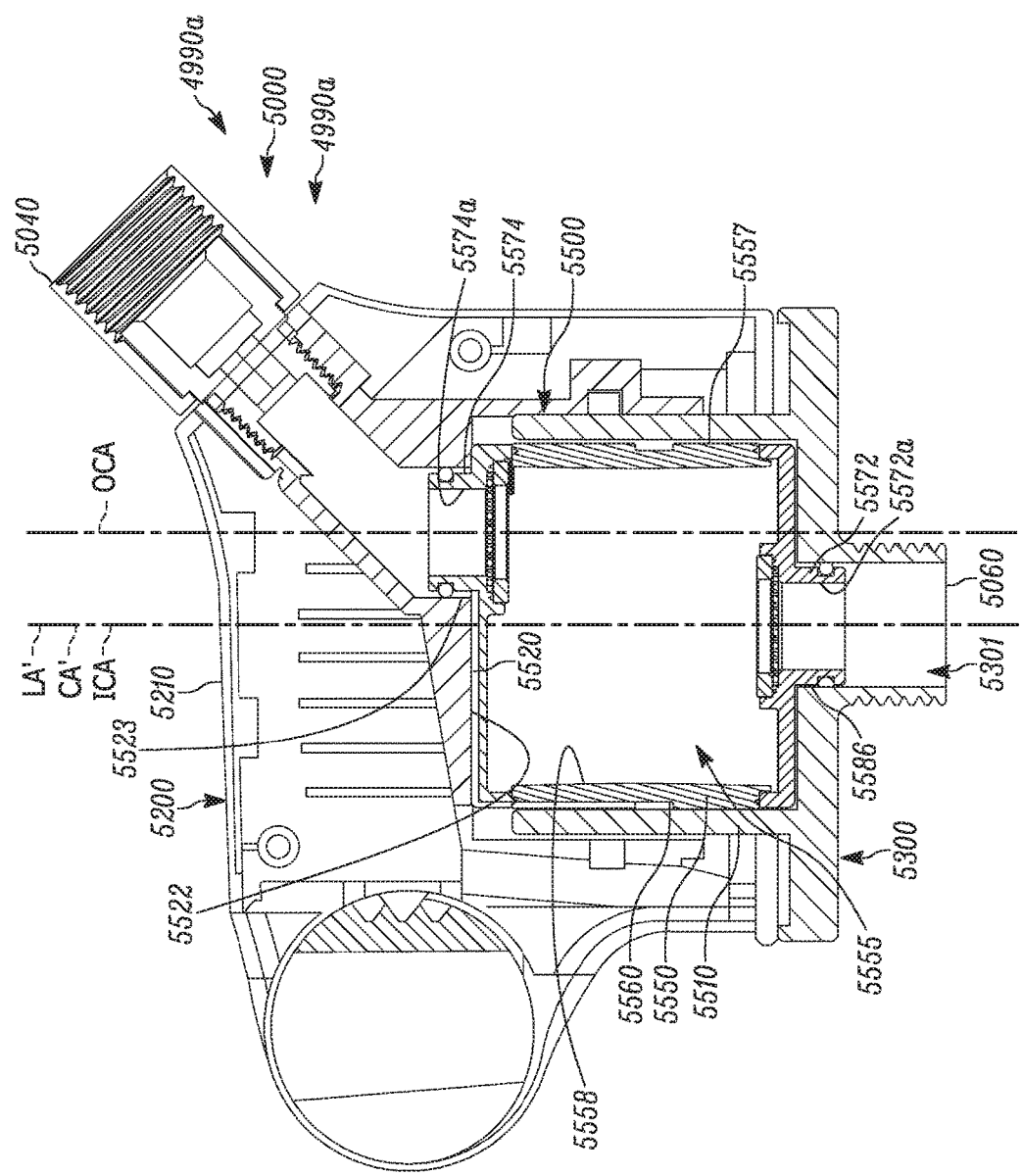
FIG. 36 is a schematic longitudinal section view of the showerhead bracket of FIG. 35.

A fourth exemplary embodiment of a showerhead assembly of the present disclosure is shown generally at 4990 in FIGS. 35 and 36. The showerhead assembly 4990 includes a water-directing and filtering assembly 4990a, which extends along a longitudinal or central axis LA' (FIG. 36). The water-directing and filtering assembly 4990a both directs or routes the flow of water emanating from a water supply line (similar to the water supply line 90 of the first exemplary embodiment of the showerhead assembly 99) and further includes a filter cartridge assembly 5500 for filtration of the water from the supply line prior to the water being sprayed upon the user during a shower.

The showerhead assembly 4990 comprises a hand-held showerhead assembly including a hand sprayer (not shown but similar in structure and function to the hand sprayer 2000 of the second exemplary embodiment hand-held showerhead assembly 990), a flexible hose assembly (not shown but similar to the flexible hose assembly 3000 of the second exemplary embodiment hand-held showerhead assembly 990), and the water-directing and filtering assembly 4990a, including the showerhead bracket 5000, which are generally similar to the water-directing and filtering assembly 990a and the showerhead bracket 1000, respectively, of the showerhead assembly 990 of the second exemplary embodiment.

As best seen in FIG. 35, the showerhead bracket 5000 of the showerhead assembly 4990, like the showerhead bracket 1000 of the second exemplary embodiment, includes a body portion 5200 and a face portion 5300 releasably secured by a latching assembly or arrangement 5541, similar in structure and function to the body portion 1200, face portion 1300 and latching assembly 1541 of the showerhead bracket 1000 of the second exemplary embodiment. The showerhead bracket 5000 extends along a central longitudinal axis LA' and further includes a two-part filter cartridge housing 5510 including a first body part 5520 disposed in the body 5200 of the showerhead bracket 5000 and a second face part 5580 supported by a face portion 5300 of the showerhead bracket 5000, similar in structure and function to the two-part filter cartridge housing 1510 of the showerhead bracket 1000 of the second exemplary embodiment.

Various components and assemblies of the showerhead assembly 4990 of the third exemplary embodiment are similar in structure and/or function to corresponding components and assemblies of the showerhead assembly 990, as previously described. In the interest of brevity, components and assemblies of the showerhead assembly 4990 that are similar to the corresponding components and assemblies of the showerhead assembly 990 of the second exemplary embodiment in structure and/or function will not be fully described herein. Instead, reference is made to the description of such components and assemblies set forth above in connection with the showerhead assembly 990, as set forth above. Materials/fabrication of components and assemblies of the showerhead assembly 4990 are similar to materials/fabrication of corresponding components and assemblies of the showerhead assembly 99, as described above. Such descriptions of components and assemblies of the showerhead assembly 990 of the second exemplary embodiment are hereby incorporated by reference in the following description of the showerhead assembly 4990 of the fourth exemplary embodiment. Identification of axes, lines, planes and directions for the showerhead assembly 4990, as set forth herein, will be the same as used for the description of the showerhead assembly 990 of the second exemplary embodiment.

In contrast to the water-directed and filtering assembly 990a of the showerhead assembly 990 of the second exemplary embodiment, the water-directing and filtering assembly 4990a of the showerhead assembly 4990 of the fourth exemplary embodiment includes a filter cartridge assembly 5500 that utilizes a single direction or non-reversible filter cartridge 5550, similar in construction and function to the single direction, non-reversible filter cartridge 4550 of the water-directing and filtering assembly 3990a of the third exemplary embodiment. Details of the structure and function of the filter cartridge 4550 of the third exemplary embodiment is hereby incorporated by reference with respect to the description of the fourth exemplary embodiment.

As best seen in FIG. 35, the filter cartridge 5550 is releasably housing in a two-part filter cartridge housing 5510 including a first body part 5520 and a second face part 5580, similar to the filter cartridge 1550 of the second exemplary embodiment. However, the direction or orientation of the filter cartridge 5550 within the filter cartridge housing 5510 is reversed with respect to the filter cartridge 4550 of the showerhead assembly 3990 of the third exemplary embodiment. That is, with the filter cartridge 5550, a second connector 5574, which is offset from a central or longitudinal axis CA' of the filter cartridge 5550 defines a second port 5574a, which functions as the water inlet port for the entry of unfiltered water from a supply line into an interior region 5555 of the filter cartridge 5550 where the water flows through filter media. The central longitudinal axis CA of the filter cartridge 5550 is collinear with the longitudinal axis LA' of the showerhead bracket 5000. The filter media of the filter cartridge 5550 is not shown, but is similar to the filter media 578 and 4578 of the first and third exemplary embodiments. Similarly, because of the reversal of direction of the filter cartridge 5550 in the filter cartridge housing 5510, a first connector 5572, which is centered about the central axis CA' of the filter cartridge 5550 defines a first port 5572a, which functions as the water outlet port for exit of filtered water from the interior region 5555 of the filter cartridge 5550. The filter cartridge 5550, like the filter cartridge 4550 of the third exemplary embodiment, advantageously provides for improved filtering and/or conversion of contaminants due, at least in part, to a longer flow path for water W flowing through filter media resulting from a water-directing baffle member 5600, similar to the baffle member 4600, disposed in the interior region 5555 of the filter cartridge 5550.

The showerhead bracket 5000 extends between upper and lower ends 5040, 5060 and includes a body portion 5200 and a face portion 5300, which is releasably attached to the body portion 5200 by a latching arrangement 5541. The body and face portions 5200, 5300 of the showerhead bracket 5000 define an interior region 5100 of the showerhead bracket 5000. The body portion 5200 includes an exterior shell 5210, while the face portion 5300 includes a water exit opening 5301. The filter cartridge housing 5510 defines an interior region 5515, a portion 5515a of the interior region 5515 is defined by the first body part 5520 of the filter cartridge housing 5510, while a portion 5515b of the interior region 5515 is defined by the second face part 5580 of the filter cartridge housing 5510. As best seen in FIG. 36, an end wall 5522 of the first body part 5520 of the filter cartridge housing 5510 defines an annular fitting 5523 that receives the second inlet connector 5574 of the filter cartridge 5550 in a water tight o-ring sealing arrangement (similar to the first connector 4572—annular fitting 4523 sealing arrangement of the third exemplary embodiment). Similarly an end wall 5583 of the second face part 5580 of the filter cartridge housing 5510 defines an annular fitting 5586 that receives the first outlet connector 5572 of the filter cartridge 5550 in a water tight arrangement (similar to the second connector 4574—annular fitting 4586 sealing arrangement of the third exemplary embodiment).

The filter cartridge 5550 of the filter cartridge assembly 5500 of the showerhead bracket 5000, similar to the filter cartridge 4550 of the showerhead assembly 3990 of the third exemplary embodiment, when positioned in the split filter cartridge housing 5510, a longitudinal or central axis CA' of the generally cylindrical cartridge 5550 extends along and is generally is concentric or collinear with the longitudinal axis LA' of the showerhead bracket 5000. The filter cartridge 5550 includes a filter shell 5552 defining the interior region 5555 containing filter media (not shown) for filtering out contaminants from water flowing through the cartridge 5550. The filter shell 5552 is generally in the shape of a cylindrical drum 5554 that is defined by the hollow central cylindrical casing 5556 extending along and centered about the central axis CA' of the filter cartridge 5550 and axially spaced apart first and second end walls 5553a, 5553b defining opposite ends of the drum 5554. In one exemplary embodiment, the end walls 5553a, 5553b are defined by the first and second end caps 5570, 5571 are affixed to opposite ends of the casing 5556 by, for example, ultrasonic welding. The end walls 5553a, 5553b of the end caps 5570, 5571 and are generally planar and orthogonal to the central axis CA' of the filter cartridge 5550.

As discussed previously, the first end wall 5553a of the first end cap 5570 includes the first or outlet connector 5572, which extends through the wall 5553a. The first connector 5572 defines the first or outlet port 5572a which is a cylindrical passageway in fluid communication with the interior region 5555 of the filter cartridge 5550. The first connector 5572 and the first port 5572a are centered about and define a first connector central axis ICA. In one exemplary embodiment, the first connector central axis ICA is coincident with the filter cartridge central longitudinal axis CA' and, when the filter cartridge 5550 is installed in the filter cartridge housing 5510, is coincident with the showerhead bracket longitudinal axis LA'. The first connector 5572 includes an o-ring seated in an annular groove in an outer surface of the first connector 5572.

The second end wall 5553b of the second end cap 5571 also includes a generally planar outer surface. The second end wall 5553b includes the second or inlet connector 5574, which extends through the wall 5553b. The second connector 5574 defines the second or inlet port 5574a which is a cylindrical passageway in fluid communication with the interior region 5555 of the filter cartridge 5550. The second connector 5574 and the second port 5574a are centered about and define a second connector central axis OCA. In one exemplary embodiment, the second connector central axis OCA is parallel to and radially spaced apart from the filter cartridge central longitudinal axis CA' and, when the filter cartridge 5550 is installed in the filter cartridge housing 4510, is parallel to and radially spaced apart from the showerhead bracket longitudinal axis LA'. The second connector 5574 includes an o-ring seated in an annular groove in the outer surface of the second connector 5574. When viewed with respect to the longitudinal central axis CA' of the filter cartridge 5550 or the showerhead bracket longitudinal axis LA', the inlet port 5574a of the second connector 5574 is radially offset from, that is, does not axially overlap, the outlet port 5572a of the first connector 5572, that is, a circumferential extent of the inlet port 5574a of the second connector 5574 is radially offset from, that is, does not axially overlap, any portion of a circumferential extent of the outlet port 5572a of the first inlet connector 5572.

The second end wall 5553b of the second end cap 5571 includes a first recess 5576a in an exterior surface 5692 of the second end wall 4553b. The first recess 4576a extends linearly between an outer periphery or outer edge 5694 of the second end wall 5553b and the outer surface of the second connector 5574 and passes through the filter cartridge central longitudinal axis CA'. A second recess 5576b extends linearly between the outer edge 5694 of the second end wall 5553b and the outer surface of the second connector 5574 and a third recess 5576c extends linearly between the outer edge 5694 of the second end wall 5553b and the outer surface 5574b of the second connector 5574. In plan view, the first, second, and third recesses 5576a, 5576b, 5576c form a T-shaped recessed configuration in the exterior surface 5692 of the second end wall 5553b intersecting at the second connector 5574.

The outer wall or surface 5557 of the filter cartridge casing 5556 includes a first annular extraction groove 5560 in an outer surface 5557. The extraction groove 5560 is axially spaced from the first end wall 5553*a* and the second end wall 5553*b* and defines a plane that is substantially orthogonal to the filter cartridge central axis CA' and substantially parallel to the first and second end walls 5553*a*, 5553*b*. In one exemplary embodiment, the extraction groove 5560 is axially closer to the first end wall 5553*a* than the second end wall 5553*b*. This axial offset of the extraction groove from a midplane through the filter cartridge 5550 advantageously provides for non-reversibility of the filter cartridge 5550 within the filter cartridge housing 5510. The midplane cuts radially or horizontally through an axial center point of the filter cartridge 5550 as measured along the center axis CA' of the cartridge 5550 and is parallel to the planar outer surfaces 5690, 5692 of the first and second end walls 5553*a*, 5553*b* of the filter cartridge 5550. The casing outer surface 5557 also includes the first axial alignment groove 5561 in the outer surface 5557. The axial alignment groove 5561 of the casing 5556 extends between and intersects the second end wall 5553*b* and the first circumferential extraction groove 5560. In one exemplary embodiment, the first recess 5574*a* in the exterior surface 4692 of the second end wall 5553*b* extends linearly between an end of the axial alignment groove 5561 at the second end wall 5553*b* and the outer surface 5574*b* of the second connector 5574.

As is best seen in FIG. 35, disposed in the interior region 5555 of the filter cartridge 5550, along with the filter media, is the water-directing baffle member 5600. The baffle member 5600 is similar in structure and function to the baffle member 4600 of the filter cartridge 4550 of the third exemplary embodiment. Although the water flows in the reverse direction of the water flow direction W through the baffle member 4600 shown, for example in FIG. 26 of the third exemplary embodiment, the baffle member 5600 advantageously serves the same function of providing a more circuitous and longer water flow path for enhanced filtering/purification. That is, a longer water flow path is provided by the baffle member 5600 for unfiltered water entering the filter cartridge 5550 through the second inlet port 5574*a* and flowing through the filter media and exiting the filter cartridge 5550 as filtered water through the first outlet port 5572*a*.

The materials used for the various components of the showerhead bracket 5000 may be durable, waterproof plastic and/or rubber materials or materials having similar durability and waterproof characteristics.

As used herein, terms of orientation and/or direction such as front, rear, forward, rearward, distal, proximal, distally, proximally, upper, lower, inward, outward, inwardly, outwardly, horizontal, horizontally, vertical, vertically, axial, radial, longitudinal, axially, radially, longitudinally, etc., are provided for convenience purposes and relate generally to the orientation shown in the Figures and/or discussed in the Detailed Description. Such orientation/direction terms are not intended to limit the scope of the present disclosure, this application, and/or the invention or inventions described therein, and/or any of the claims appended hereto. Further, as used herein, the terms comprise, comprises, and comprising are taken to specify the presence of stated features, elements, integers, steps or components, but do not preclude the presence or addition of one or more other features, elements, integers, steps or components.

What have been described above are examples of the present invention. It is, of course, not possible to describe every conceivable combination of components, parts, elements, assemblies, or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A showerhead assembly including a filter cartridge assembly for filtering water flowing through the showerhead assembly, the showerhead assembly comprising:
   a) a body portion including an exterior shell;
   b) a face portion including at least one water exit opening through which filtered water exits, the face portion releasably affixed to the body portion; and
   c) the filter cartridge assembly including:
   i) a filter cartridge housing, a first part of the filter cartridge housing disposed in the body portion and including a first end wall and a first cylindrical side wall extending axially from the first end wall, the first side wall including a retainer wall adjacent the first end wall and an upper wall spaced radially outwardly from the retainer wall, the retainer wall having an axial height, a second part of the filter cartridge housing disposed in the face portion, the second part of the filter cartridge housing defined by a second end wall and a second cylindrical side wall extending from the second end wall, an upper portion of the second cylindrical side wall of the second part of the filter cartridge housing being received within the upper wall of the first part of the filter cartridge housing; and
   ii) a filter cartridge removably disposed in the filter cartridge housing, the filter cartridge being generally cylindrical and centered about a central longitudinal axis of the filter cartridge and including a casing, a first end wall at one end of the casing, a second end wall at a second end of the casing, the casing and the first and second end walls defining an interior region of the filter cartridge, the casing including an outer surface and an inner surface, the first end wall including a first connector defining a first port in fluid communication with the interior region, the first connector extending axially through the first end wall and centered about a first connector central axis, the second end wall including a second connector defining a second port in fluid communication with the interior region, the second connector extending axially through the second end wall and centered about a second connector central axis, the first connector axis being radially offset from the second connector central axis, the second connector including an outer surface, the second end wall including a first recess in an exterior surface of the second end wall, the first recess extending from a peripheral edge of the second end wall in a direction toward the second connector, a first circumferential groove in the outer surface of the casing axially spaced from the first end wall and the second end wall.

2. The showerhead assembly of claim 1 wherein the first connector central axis is coincident with the filter cartridge central longitudinal axis and the second connector central axis is parallel to and spaced radially from the filter cartridge central longitudinal axis and further wherein a filter media is disposed in the interior region of the filter cartridge, the first end wall and the second end wall of the casing extend orthogonal to the central longitudinal axis of the filter cartridge, the first recess extends linearly from a peripheral edge of the second end wall toward the second connector, the first circumferential groove is parallel to the first and second end walls, and a first axial groove in the outer surface of the casing extends between the second end wall and the first circumferential groove.

3. The showerhead assembly of claim 2 wherein the showerhead assembly is a showerhead of a fixed-position showerhead assembly and the first port of the first connector is a water inlet port directing water from a water supply to the filter cartridge interior region.

4. The showerhead assembly of claim 1 wherein the second part of the filter cartridge housing extends from a base rotatably supported on a backing plate of the face portion.

5. The showerhead assembly of claim 2 wherein the face portion of the showerhead assembly includes a distal faceplate having a plurality of water outlet nozzles and the showerhead assembly includes a showerhead engine extending along a longitudinal axis of the showerhead assembly and providing a water flow path extending between a proximal region of the body portion and the plurality of water outlet nozzles of the distal faceplate, the water flow path through the showerhead engine including a water flow path through the filter cartridge including water flow through the first port, the filter media disposed in the interior region of the filter cartridge, and the second port.

6. The showerhead assembly of claim 1 wherein the circumferential groove in the outer surface of the filter cartridge casing is axially closer to the first end wall than the second end wall.

7. The showerhead assembly of claim 1 wherein the side wall of the second part of the filter cartridge housing defines a flexible extraction finger having a head protruding radially inwardly from the side wall, the head of the flexible extraction finger interfitting into the first circumferential groove of the filter cartridge to extract the filter cartridge from the first part of the filter cartridge housing upon removal of the face portion from the body portion of the showerhead assembly.

8. The showerhead assembly of claim 1 wherein the first part of the filter cartridge housing is defined by an inner frame of the body portion disposed within the exterior shell of the body portion.

9. The showerhead assembly of claim 8 wherein a latching arrangement releasably affixes the face portion to the body portion, the latching arrangement including a latching slot in the side wall of the second part of the filter cartridge housing of the face portion and a latch slidingly supported by the inner frame of the body portion.

10. The showerhead assembly of claim 1 wherein the first port of the first connector and the second port of the second connector of the filter cartridge are radially spaced apart when viewed along the central longitudinal axis of the filter cartridge.

11. The showerhead assembly of claim 1 wherein the second end wall of the filter cartridge includes a second recess in the exterior surface of the second end wall extending linearly between the peripheral edge of the second end wall and the outer surface of the second connector.

12. The showerhead assembly of claim 2 wherein the first recess in the exterior surface of the second end wall extends linearly between an end of the first axial groove in the outer surface of the casing and the outer surface of the second connector.

13. The showerhead assembly of claim 1 wherein the end wall of the second part of the filter cartridge housing includes a first locating rib which is received in the first recess in the exterior surface of the second end wall of the filter cartridge.

14. The showerhead assembly of claim 1 wherein the first recess of the second end wall extends linearly from the peripheral edge of the second end wall to the outer surface of the second connector.

15. The showerhead assembly of claim 1 wherein the showerhead assembly is a showerhead bracket of a handheld showerhead assembly and the second port of the second connector is a water inlet port directing water from a water supply to the filter cartridge interior region.

16. The showerhead assembly of claim 15 wherein the hand-held showerhead assembly further includes a hand sprayer and a flexible hose routing water from the at least one water exit opening of the showerhead bracket to the hand sprayer.

17. A filter cartridge for use in a showerhead assembly for filtering water flowing through the showerhead assembly, the filter cartridge comprising:
  a) a cylindrical filter shell centered about a central longitudinal axis of the filter cartridge and including a casing extending along the central longitudinal axis, a first end wall at one end of the casing, a second end wall at a second end of the casing, the casing and the first and second end walls defining an interior region of the filter cartridge, the casing including an outer surface and an inner surface, the first end wall including a first connector defining a first port in fluid communication with the interior region, the first connector extending axially through the first end wall and centered about a first connector central axis, the second end wall including a second connector defining a second port in fluid communication with the interior region, the second connector extending axially through the second end wall and centered about a second connector central axis, the first connector axis being radially offset from the second connector central axis, the second connector including an outer surface, the second end wall including a first recess and a second recess in an exterior surface of the second end wall, the first recess extending from a peripheral edge of the second end wall in a direction toward the second connector and the second recess extending from the peripheral edge of the second end wall in a direction toward the second connector, the first and second recesses being transverse, a first circumferential groove in the outer surface of the casing axially spaced from the first end wall and the second end wall, a first axial groove in the outer surface of the casing extending from the second end wall in a direction toward the first circumferential groove; and
  b) filter media disposed in the interior region of the filter cartridge.

18. The filter cartridge of claim 17 wherein the first connector central axis is coincident with the filter cartridge central longitudinal axis and the second connector central axis is parallel to and spaced radially from the filter cartridge central longitudinal axis and further wherein the first end wall and the second end wall of the casing extend orthogonal to the central longitudinal axis of the filter cartridge, the first recess extends linearly from a peripheral edge of the second end wall toward the second connector, the first circumferential groove is parallel to the first and second end walls, and the first axial groove in the outer surface of the casing extends between the second end wall and the first circumferential groove.

19. The filter cartridge of claim 17 wherein the circumferential groove in the outer surface of the casing is axially closer to the first end wall than the second end wall.

20. The filter cartridge of claim 17 wherein the second recess in the exterior planar surface of the second end wall extends linearly between the peripheral edge of the second end wall and the outer surface of the second connector.

21. The filter cartridge of claim 17 wherein the first recess in the exterior planar surface of the second end wall extends linearly between an end of the first axial groove in the outer surface of the casing and the outer surface of the second connector.

22. The filter cartridge of claim 17 wherein the first recess of the second end wall extends linearly from the peripheral edge of the second end wall to the outer surface of the second connector.

23. A filter cartridge for use in a showerhead assembly for filtering water flowing through the showerhead assembly, the filter cartridge comprising:
a cylindrical filter shell centered about a central longitudinal axis of the filter cartridge and including a casing extending along the central longitudinal axis, a first end wall at one end of the casing, a second end wall at a second end of the casing, the casing and the first and second end walls defining an interior region of the filter cartridge, the casing including an outer surface and an inner surface, the first end wall including a first connector defining a first port in fluid communication with the interior region, the first connector extending axially through the first end wall and centered about a first connector central axis, the second end wall including a second connector defining a second port in fluid communication with the interior region, the second connector extending axially through the second end wall and centered about a second connector central axis, the first connector axis being radially offset from the second connector central axis, the second connector including an outer surface, the second end wall including a first recess and a second recess in an exterior surface of the second end wall, the first recess extending from a peripheral edge of the second end wall toward the second connector and passing through the filter cartridge central longitudinal axis and the second recess extending from the peripheral edge of the second end wall in a direction toward the second connector, the first and second recesses being transverse, a first circumferential groove in the outer surface of the casing axially spaced from the first end wall and the second end wall.

24. The filter cartridge of claim 23 further including a filter media disposed in the interior region and wherein the first end wall and the second end wall of the casing extend orthogonal to the central longitudinal axis of the filter cartridge, the first recess extends linearly from a peripheral edge of the second end wall toward the second connector, the first circumferential groove is parallel to the first and second end walls, and a first axial groove in the outer surface of the casing extends between the second end wall and the first circumferential groove.

* * * * *